US012750825B2

(12) United States Patent
Yi et al.

(10) Patent No.: US 12,750,825 B2
(45) Date of Patent: Sep. 29, 2026

(54) METHOD AND DEVICE FOR UPLINK CHANNEL TRANSMISSION IN WIRELESS COMMUNICATION SYSTEM

(71) Applicant: Samsung Electronics Co., Ltd., Suwon-si (KR)

(72) Inventors: Junyung Yi, Suwon-si (KR); Youngrok Jang, Suwon-si (KR); Youngbum Kim, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/569,837

(22) PCT Filed: Jul. 18, 2022

(86) PCT No.: PCT/KR2022/010430
§ 371 (c)(1),
(2) Date: Dec. 13, 2023

(87) PCT Pub. No.: WO2023/287264
PCT Pub. Date: Jan. 19, 2023

(65) Prior Publication Data

US 2024/0284418 A1 Aug. 22, 2024

(30) Foreign Application Priority Data

Jul. 16, 2021 (KR) ........................ 10-2021-0093558
Sep. 3, 2021 (KR) ........................ 10-2021-0117493

(51) Int. Cl.
*G01R 31/08* (2020.01)
*H04L 5/14* (2006.01)
*H04W 72/0446* (2023.01)

(52) U.S. Cl.
CPC ........... *H04W 72/0446* (2013.01); *H04L 5/14* (2013.01)

(58) Field of Classification Search
CPC ........... H04W 72/0446; H04W 72/115; H04W 72/23; H04W 72/1268; H04L 1/08; H04L 5/0048; H04L 5/0051; H04L 5/0094
See application file for complete search history.

(56) References Cited

U.S. PATENT DOCUMENTS

2020/0052827 A1 2/2020 Vilaipornsawai et al.
2020/0367208 A1 11/2020 Khoshnevisan et al.
(Continued)

FOREIGN PATENT DOCUMENTS

KR 10-2022-0129270 9/2022
KR 10-2022-0135577 10/2022
WO WO-2022000455 A1 * 1/2022 ........... H04L 1/0073

OTHER PUBLICATIONS

Lenovo et al., Enhancements on PUSCH repetition type A, R1-2105773, 3GPP TSG RAN WG1 #105-e, May 12, 2021.
(Continued)

*Primary Examiner* — Shantell L Heiber
(74) *Attorney, Agent, or Firm* — Jefferson IP Law, LLP

(57) ABSTRACT

The present disclosure relates to: a communication technique merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and
(Continued)

IoT-related technology. The disclosure provides a method for improving the coverage of an uplink channel for uplink transmission.

16 Claims, 30 Drawing Sheets

(56) References Cited

U.S. PATENT DOCUMENTS

| | | | | |
|---|---|---|---|---|
| 2022/0303988 | A1 | 9/2022 | Yi et al. | |
| 2022/0329353 | A1 | 10/2022 | Yi et al. | |
| 2023/0014238 | A1* | 1/2023 | Pocovi | H04W 72/1263 |

OTHER PUBLICATIONS

Nokia et al., Enhancements on PUSCH repetition type A, R1-2105901, 3GPP TSG RAN WG1 Meeting #105-e, May 11, 2021.

Catt, Discussion on enhancements on PUSCH repetition type A, R1-2104537, 3GPP TSG RAN WG1 Meeting #105-e, May 12, 2021.

International Search Report dated Oct. 12, 2022, issued in International Application No. PCT/KR2022/010430.

European Search Report dated Sep. 24, 2024, issued in European Application No. 22842526.0.

* cited by examiner

METHOD AND DEVICE FOR UPLINK CHANNEL TRANSMISSION IN WIRELESS COMMUNICATION SYSTEM

TECHNICAL FIELD

This disclosure relates to a method and device for transmitting and receiving an uplink channel by a base station or terminal in a wireless communication system.

BACKGROUND ART

To meet the increased demand for wireless data traffic since the deployment of 4G communication systems, efforts have been made to develop an improved 5G or pre-5G communication system. For this reason, a 5G communication system or pre-5G communication system is called a Beyond 4G Network communication system or a post long term evolution (LTE) system. The 5G communication system defined by the 3rd generation Partnership Project (3GPP) is called a new radio (NR) system. To achieve a high data transmission rate, the implementation of 5G communication systems in an ultra-high-frequency (mm Wave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, technologies, such as evolved small cell, advanced small cell, cloud radio access network (cloud RAN), ultra-dense networks, device to device communication (D2D), wireless backhaul, moving networks, cooperative communication, coordinated multi-points (CoMP), and interference cancellation, have been developed for 5G communication systems. In addition, other technologies, such as hybrid frequency-shift keying (FSK) and quadrature amplitude modulation (QAM) modulation (FQAM) and sliding window superposition coding (SWSC) based on advanced coding modulation (ACM), and filter bank multi carrier (FBMC), non-orthogonal multiple access (NOMA), and sparse code multiple access (SCMA) based on enhanced access technology have been developed for 5G communication systems.

Meanwhile, the Internet is evolving from a human-centered network in which humans generate and consume information to an Internet of Things (IoT) network in which distributed components such as objects transmit, receive, and process information. Internet of Everything (IoE) technology resulting from combining IoT technology with big data processing technology, etc. through a connection to a cloud server or the like is on the rise. To implement the IoT, technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to fields, such as smart homes, smart buildings, smart cities, smart cars or connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying a cloud radio access network (CRAN) as big data processing technology is also an example of the convergence of 5G technology and IoT technology.

With the recent development of 5G communication systems, a need for a method of repeatedly transmitting uplink to expand cell coverage in an ultra-high-frequency (mm Wave) band is emerging.

DISCLOSURE OF INVENTION

Technical Problem

This disclosure proposes a PUSCH transmission method and device in multiple slots to improve coverage of an uplink channel in a wireless communication system.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In order to solve the above problems, a method of a terminal in a communication system according to an embodiment of the disclosure may include receiving uplink-downlink resource configuration information related to cross division duplex (XDD) from a base station; receiving configuration information for physical uplink shared channel (PUSCH) repetitive transmission from the base station; determining a slot in which the PUSCH repetitive transmission is possible based on the uplink-downlink resource configuration information and the configuration information for the PUSCH repetitive transmission; identifying a slot in which a number of uplink resource elements (RE) is greater than or equal to a preconfigured number, among slots excluding a slot capable of the PUSCH repetitive transmission; and transmitting the PUSCH to the base station in the slot where the number of uplink REs is greater than or equal to the preconfigured number.

A method of a base station in a communication system according to an embodiment of the disclosure may include transmitting uplink-downlink resource configuration information related to cross division duplex (XDD) to a terminal; transmitting configuration information for physical uplink shared channel (PUSCH) repetitive transmission to the terminal; determining a slot in which the PUSCH repetitive transmission is possible based on the uplink-downlink resource configuration information and the configuration information for the PUSCH repetitive transmission; identifying a slot in which a number of uplink resource elements (RE) is greater than or equal to a preconfigured number, among slots excluding a slot capable of the PUSCH repetitive transmission; and receiving the PUSCH from the terminal in the slot where the number of uplink REs is greater than or equal to the preconfigured number.

A terminal in a communication system according to an embodiment of the disclosure may include a transceiver; and a controller configured to receive uplink-downlink resource configuration information related to cross division duplex (XDD) from a base station, receive configuration information for physical uplink shared channel (PUSCH) repetitive transmission from the base station, determine a slot in which the PUSCH repetitive transmission is possible based on the uplink-downlink resource configuration information and the configuration information for the PUSCH repetitive transmission, identify a slot in which a number of uplink resource elements (RE) is greater than or equal to a preconfigured number, among slots excluding a slot capable of the PUSCH repetitive transmission, and transmit the PUSCH to the base station in the slot where the number of uplink REs is greater than or equal to the preconfigured number.

A base station in a communication system according to an embodiment of the disclosure may include a transceiver; and a controller configured to transmit uplink-downlink resource configuration information related to cross division duplex (XDD) to a terminal, transmit configuration information for physical uplink shared channel (PUSCH) repetitive transmission to the terminal, determine a slot in which the PUSCH repetitive transmission is possible based on the uplink-downlink resource configuration information and the configuration information for the PUSCH repetitive transmission, identify a slot in which a number of uplink resource elements (RE) is greater than or equal to a preconfigured number, among slots excluding a slot capable of the PUSCH repetitive transmission, and receive the PUSCH from the terminal in the slot where the number of uplink REs is greater than or identical to the preconfigured number.

Advantageous Effects of Invention

An embodiment of the disclosure provides a method for determining an available slot that can be transmitted when performing PUSCH repetitive transmission and uplink transmission in which one transport block (TB) is mapped to multiple slots, and a method for performing simultaneous channel estimation for multiple PUSCH transmissions including different TBs.

Through the method of the disclosure, resources can be efficiently utilized and coverage of the uplink channel can be improved by improving the performance of simultaneous channel estimation.

Advantageous effects obtainable from the disclosure may not be limited to the above mentioned effects, and other effects which are not mentioned may be clearly understood, through the following descriptions, by those skilled in the art to which the disclosure pertains.

MODE FOR THE INVENTION

Figure 1:
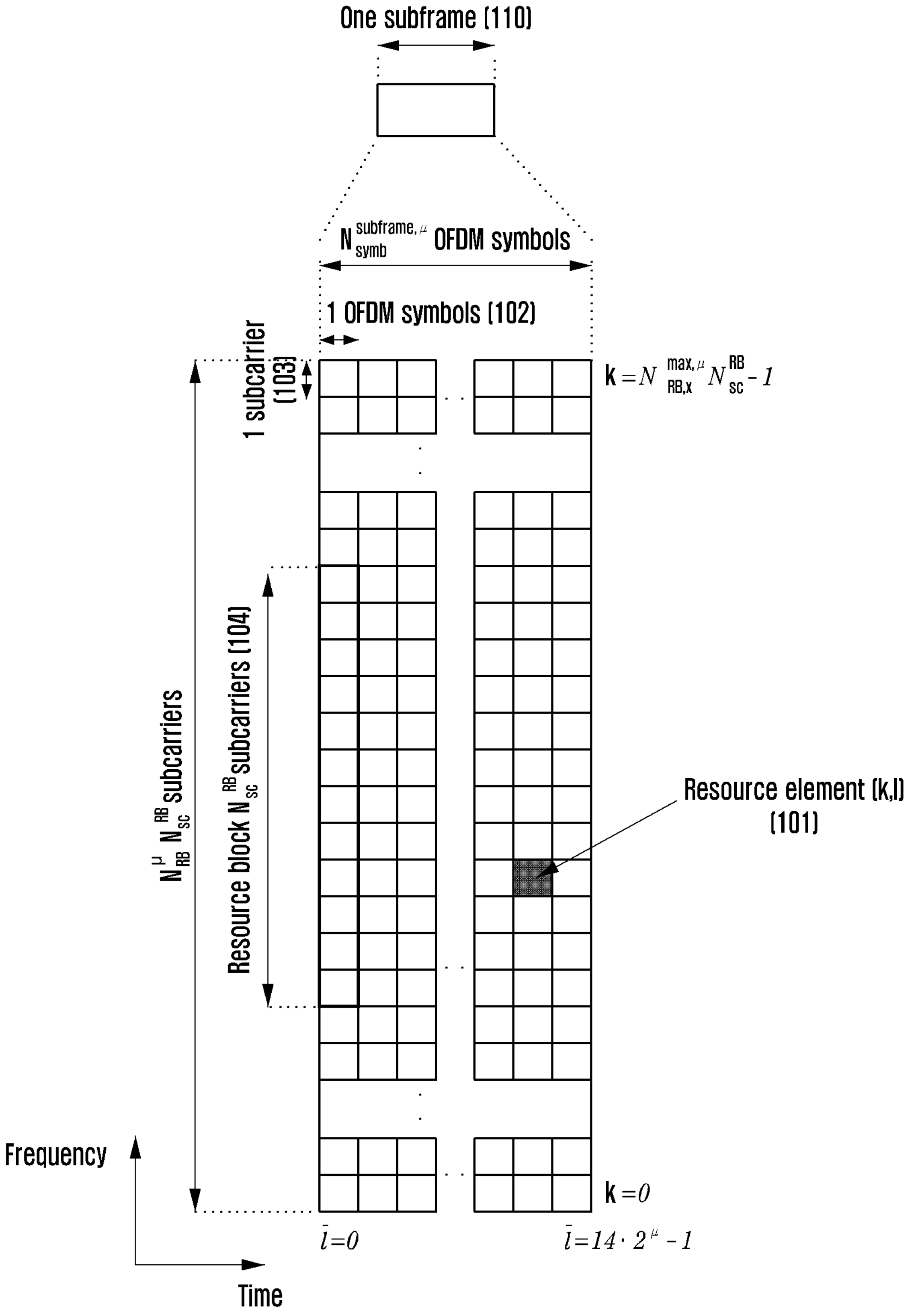
FIG. 1 is a diagram illustrating a basic structure of a time-frequency domain, which is a radio resource domain in which data or a control channel is transmitted in a 5G system.

Hereinafter, embodiments of the disclosure will be described in detail with reference to the accompanying drawings. In the following, in describing the embodiments, a description of techniques known to those skilled in the art and not directly related to the disclosure may be omitted. Such unnecessary omission of description is intended to prevent obscuring the main concepts of the disclosure and to more clearly convey the main concepts.

For the same reason, in the accompanying drawings, some components may be exaggerated, omitted, or schematically illustrated. Further, the size of each component does not entirely reflect the actual size. In the drawings, identical or corresponding components are provided with identical reference numerals.

Advantages and features of the disclosure and the manner of attaining them will become apparent by reference to the following detailed description of embodiments when taken in conjunction with the accompanying drawings. However, the disclosure is not limited to the embodiments described below, but may be implemented in various different forms. The embodiments are provided solely to complete the disclosure and to inform those skilled in the art to which the disclosure pertains of the full technical scope of the disclosure. The disclosure is to be limited only by the scope of the following claims. Throughout the specification, the same or similar reference numerals denote the same or similar components. Further, in describing the disclosure, a detailed description of related functions or constitutions will be omitted when it is determined that the description may make the subject matter of the disclosure unnecessarily unclear. The terms which will be described below are terms defined in consideration of the functions in the disclosure, and may be different according to users, intentions of operators, or customs. Therefore, the definitions of the terms should be made based on the contents throughout the specification.

Hereinafter, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a downlink (DL) refers to a radio transmission path via which a base station transmits a signal to a terminal, and an uplink (UL) refers to a radio transmission path via which a terminal transmits a signal to a base station. Further, hereinafter, long-term evolution (LTE) or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and hereinafter, the 5G may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Here, it will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block(s). These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable data processing apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that, in some alternative implementations, the functions noted in the blocks may occur out of the order. For example, two blocks shown in succession may, in fact, be executed substantially concurrently, or the blocks may sometimes be executed in the reverse order, depending upon the functionality involved.

As used herein, the term 'unit' refers to a software element or a hardware element, such as a Field Programmable Gate Array (FPGA) or an Application Specific Integrated Circuit (ASIC), which performs a predetermined function. However, the 'unit' does not always have a meaning limited to software or hardware. The 'unit' may be constructed either to be stored in an addressable storage medium or to execute one or more processors. Therefore, the 'unit' includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the 'unit' may be either combined into a smaller number of elements, or a 'unit', or divided into additional elements, or a "unit". Moreover, the elements and 'units' may be implemented to reproduce one or more central processing units (CPUs) within a device or a security multimedia card. Further, the 'unit' in the embodiments may include one or more processors.

Hereinafter, embodiments of the disclosure will be described in detail with reference to the accompanying drawings. Hereinafter, a method and a device proposed in the embodiment of the disclosure describe the embodiment of the disclosure as an example for improving PUSCH coverage, are not limited to each embodiment, and can be utilized for a frequency resource configuration method corresponding to another channel by using all of one or more embodiments proposed in the disclosure or a combination of some embodiments. Accordingly, the embodiments of the disclosure may be applied through some modifications within a range that does not significantly deviate from the scope of the disclosure as determined by those skilled in the art.

Further, in describing the disclosure, a detailed description of related functions or constitutions will be omitted when it is determined that the description may make the subject matter of the disclosure unnecessarily unclear. The terms which will be described below are terms defined in consideration of the functions in the disclosure, and may be different according to users, intentions of operators, or customs. Therefore, the definitions of the terms should be made based on the contents throughout the specification.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.17e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (eNodeB (eNB) or BS), and the DL refers to a wireless link through which a base station transmits data or a control signal to a terminal. Also, the multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a communication system after the LTE system, a 5G communication system should support services satisfying various requirements at the same time, so as to freely reflect various requirements of a user and a service provider. The services considered for the 5G communication system include enhanced mobile broadband (eMBB), massive machine-type communication (mMTC), ultra-reliability low latency communication (URLLC), and the like.

eMBB aims to provide a further enhanced data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE system, but the 5G communication system uses a bandwidth wider than 20 MHz in a frequency band of 3 to 6 GHz or more than 6 GHZ, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and devices to provide communication functions. In addition, since the terminals supporting mMTC are more likely to be positioned in shaded areas not covered by a cell, such as a basement of a building due to nature of services, the terminals require a wider coverage than other services provided by the 5G communication system. The terminals that support mMTC should be constituted as inexpensive terminals and require very long battery life-time, such as 10 to 16 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC should provide very low latency and very high reliability. For example, URLLC-supportive services need to meet an air interface latency of less than 0.5 milliseconds and simultaneously include requirements of a packet error rate of $10^{-5}$ or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the 5G communication system (hereinafter, interchangeably used with 5G system) may be multiplexed in one system and may be transmitted. In this case, the services may use different transmission/reception techniques and transmission/reception parameters in order to satisfy different requirements.

Hereinafter, the frame structure of a 5G system will be described in more detail with reference to the drawings.

FIG. 1 is a diagram illustrating a basic structure of a time-frequency domain, which is a radio resource domain of a 5G system.

In FIG. 1, the horizontal axis represents a time domain, and the vertical axis represents a frequency domain. A basic unit of resources in the time-frequency domain may be a resource element (RE) 101. The resource element 101 may be defined by one OFDM symbol (or discrete Fourier transform spread OFDM (DFT-s-OFDM) symbol 102 in a time domain and one subcarrier 103 in a frequency domain. In the frequency domain, $$N_{sc}^{RB}$$

(for example, 12) consecutive REs may constitute one resource block (RB) 104. In addition, $$N_{symb}^{subframe}$$

consecutive OFDM symbols in the time domain may constitute one subframe 110.

Figure 2:
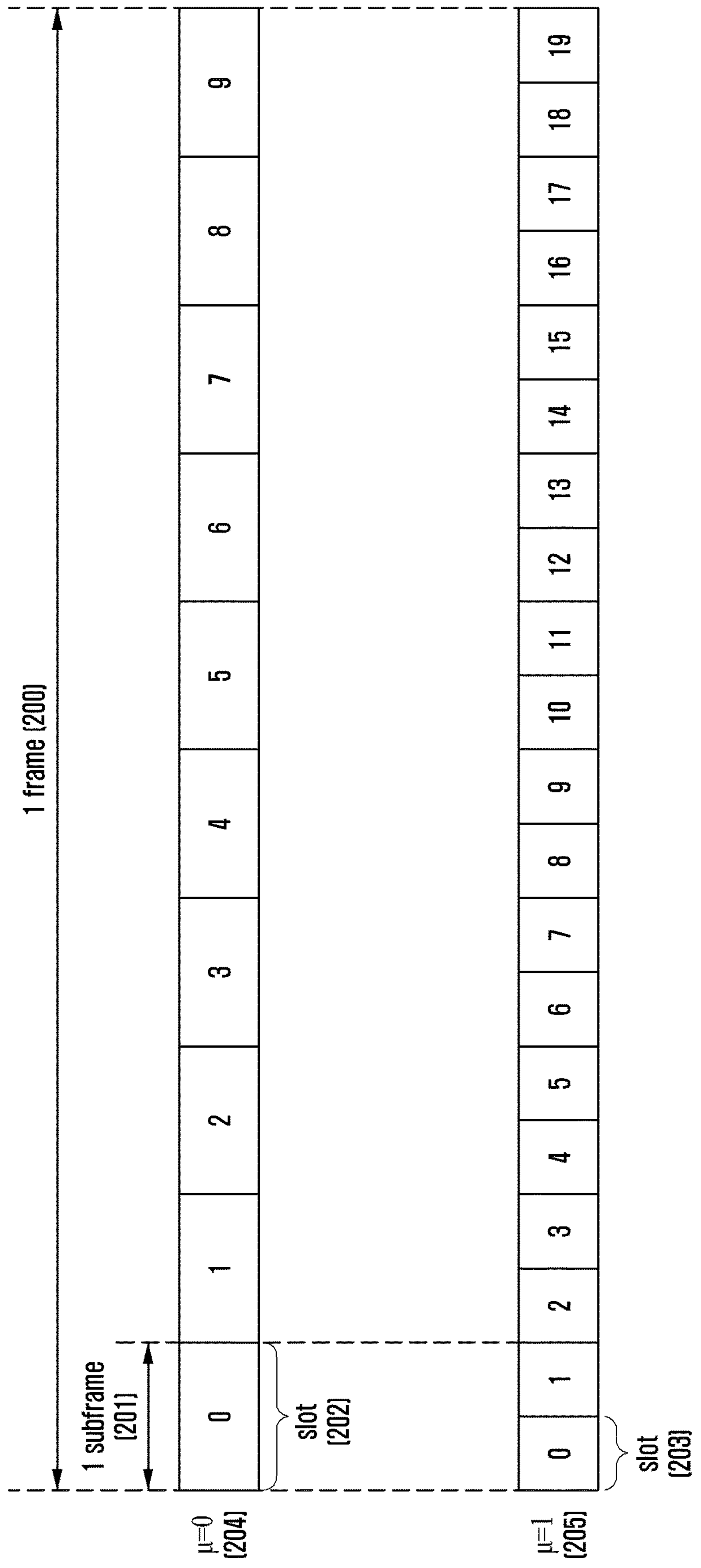
FIG. 2 is a diagram illustrating a slot structure considered in a 5G system.

FIG. 2 is a diagram illustrating a slot structure considered in a 5G system.

In FIG. 2, an example of a structure of a frame 200, a subframe 201, and a slot 202 is illustrated. One frame 200 may be defined as 10 ms. One subframe 201 may be defined as 1 ms, and thus one frame 200 may include a total of 10 subframes 201. Therefore, one slot 202 or 203 may be defined as 14 OFDM symbols (i.e., the number of symbols for one slot $$\left(N_{symb}^{slot}\right) = 14).$$

One subframe 201 may include one or multiple slots 202 and 203, and the number of slots 202 and 203 per one subframe 201 may differ according to configuration value μ 204 or 205 for a subcarrier spacing.

In an example of FIG. 2, a case in which the subcarrier spacing configuration value is μ=0 (204) and μ=1 (205) is illustrated. In case that μ=0 (204), one subframe 201 may include one slot 202, and in case that μ=1 (205), one subframe 201 may include two slots 203. That is, the number of slots per one subframe $$\left(N_{slot}^{subframe,\mu}\right)$$

may differ according to a subcarrier spacing configuration value μ, and accordingly, the number of slots per one frame $$\left(N_{slot}^{frame,\mu}\right)$$

may differ. According to each subcarrier spacing configuration μ, $$N_{slot}^{subframe,\mu} \text{ and } N_{slot}^{fraem,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS), which is one of reference signals in the 5G system, will be described in detail.

The DMRS may include several DMRS ports, and each port maintains orthogonality by using code division multiplexing (CDM) or frequency division multiplexing (FDM) so as not to generate interference. However, the term DMRS may be expressed in other terms depending on a user's intention and the purpose of using the reference signal. More specifically, the term DMRS is merely provided for specific examples to easily explain the technical content of the disclosure and to help the understanding of the disclosure, and is not intended to limit the scope of the disclosure. That is, it is obvious to those skilled in the art to which the disclosure belongs that it can be implemented even with any reference signal based on the technical idea of the disclosure.

Figure 3:
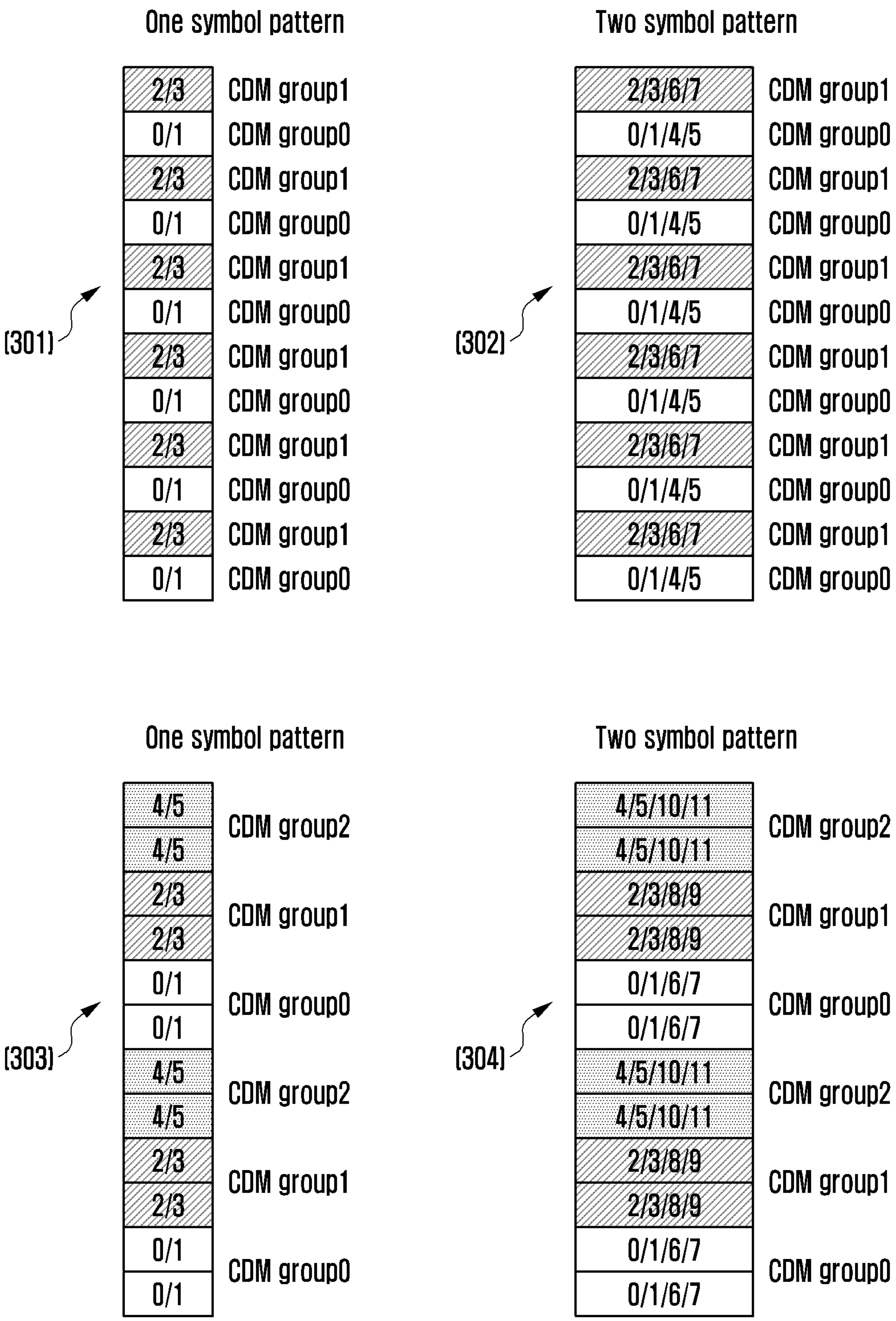
FIG. 3 is a diagram illustrating DMRS patterns (type1 and type2) used for communication between a base station and a terminal in a 5G system.

FIG. 3 is a diagram illustrating DMRS patterns (type1 and type2) used for communication between a base station and a terminal in a 5G system.

In a 5G system, two DMRS patterns may be supported. Two DMRS patterns are illustrated in detail in FIG. 3. With reference to FIG. 3, reference numerals 301 and 302 represent DMRS type 1, where 301 represents a one-symbol pattern and 302 represents a two-symbol pattern. DMRS type 1 of 301 or 302 of FIG. 3 is a DMRS pattern of a comb 2 structure and may include two CDM groups, and different CDM groups may be FDMed.

In the one-symbol pattern of 301 of FIG. 3, two DMRS ports may be distinguished by applying CDM in a frequency to the same CDM group, and thus a total of four orthogonal DMRS ports may be configured. DMRS port IDs respectively mapped to the CDM groups are illustrated in reference numeral 301 of FIG. 3 (in a case of downlink, the DMRS port ID is indicated by being +1000 to the illustrated number). In the two-symbol pattern of reference numeral 302 of FIG. 3, four DMRS ports may be distinguished by applying CDM in time/frequency to the same CDM group, and thus a total of eight orthogonal DMRS ports may be configured. DMRS port IDs respectively mapped to the CDM groups are illustrated in reference numeral 302 of FIG. 3 (in a case of downlink, the DMRS port ID is indicated by being +1000 to the illustrated number).

DMRS type 2 of reference numeral 303 or 304 of FIG. 3 is a DMRS pattern of a structure in which frequency domain orthogonal cover code (FD-OCC) is applied to adjacent subcarriers in a frequency and may include three CDM groups, and different CDM groups may be FDMed.

In the one-symbol pattern of 303 of FIG. 3, two DMRS ports may be distinguished by applying CDM in a frequency to the same CDM group, and thus a total of six orthogonal DMRS ports may be configured. DMRS port IDs respectively mapped to the CDM groups are illustrated in reference numeral 303 of FIG. 3 (in a case of downlink, the DMRS port ID is indicated by being +1000 to the illustrated number). In the two-symbol pattern of 304 of FIG. 3, four DMRS ports may be distinguished by applying CDM in time/frequency to the same CDM group, and thus a total of 12 orthogonal DMRS ports may be configured. DMRS port IDs respectively mapped to the CDM groups are illustrated in reference numeral 304 of FIG. 3 (in a case of downlink, the DMRS port ID is indicated by being +1000 to the illustrated number).

As described above, in an NR system, two different DMRS patterns (301 and 302 or 303 and 304 of FIG. 3) may be configured, and whether the DMRS pattern is the one-symbol pattern (301 and 303) or the adjacent two-symbol pattern (302 and 304) may also be configured. In addition, in the NR system, not only a DMRS port number may be scheduled but also the number of CDM groups scheduled together for physical downlink shared channel (PDSCH) rate matching may be configured and signaled. Further, in case of cyclic prefix based orthogonal frequency division multiplex (CP-OFDM), both the above-described two DMRS patterns may be supported in DL and UL, and in case of discrete Fourier transform spread OFDM (DFT-S-OFDM), only DMRS type 1 is supported among the above-described DMRS patterns in UL. Further, an additional DMRS may be supported to be configurable. A front-loaded DMRS refers to a first DMRS that is transmitted and received at the frontmost symbol in the time domain among DMRSs, and the additional DMRS refers to a DMRS that is transmitted and received in a symbol after the front-loaded DMRS in the time domain. In the NR system, the number of additional DMRSs may be configured from a minimum of zero to a maximum of three. In addition, the same pattern as that of the front-loaded DMRS may be assumed in case where the additional DMRS is configured. More specifically, when information indicating whether the front-loaded DMRS is the above-described DMRS pattern type 1 or type 2, information indicating whether the DMRS pattern is the one-symbol pattern or the adjacent two-symbol pattern, and information on the number of CDM groups used with the DMRS port are indicated, in case that the additional DMRS is additionally configured, it may be assumed that the additional DMRS is configured with the same DMRS information as that of the front-loaded DMRS.

More specifically, the downlink DMRS configuration described above may be configured through RRC signaling as shown in Table 2 below.

Figure 4:
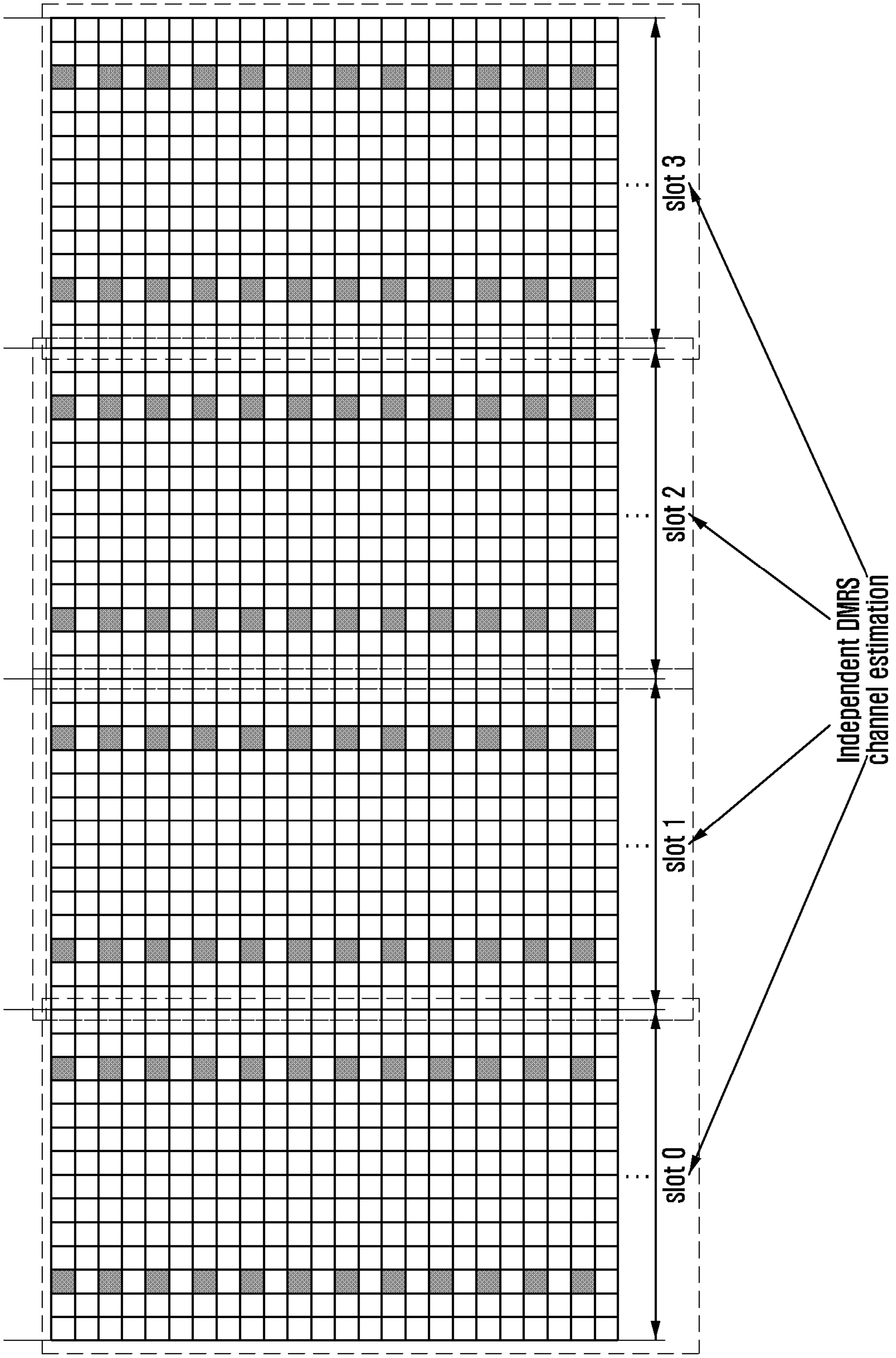
FIG. 4 is a diagram illustrating an example of channel estimation using DMRS received through one PUSCH in a time band in a 5G system.

FIG. 4 is a diagram illustrating an example of channel estimation using DMRS received through one PUSCH in a time band in a 5G system.

In connection with performing channel estimation for data decoding using the above-described DMRS, in a frequency band, channel estimation may be performed within a precoding resource block group (PRG), which is a corresponding bundling unit, by using bundling of physical resource blocks (PRBs) interlocking with a system band. In addition, in a time unit, channel estimation may be performed under an assumption that only DMRS received through a single PUSCH has the same precoding.

Figure 5:
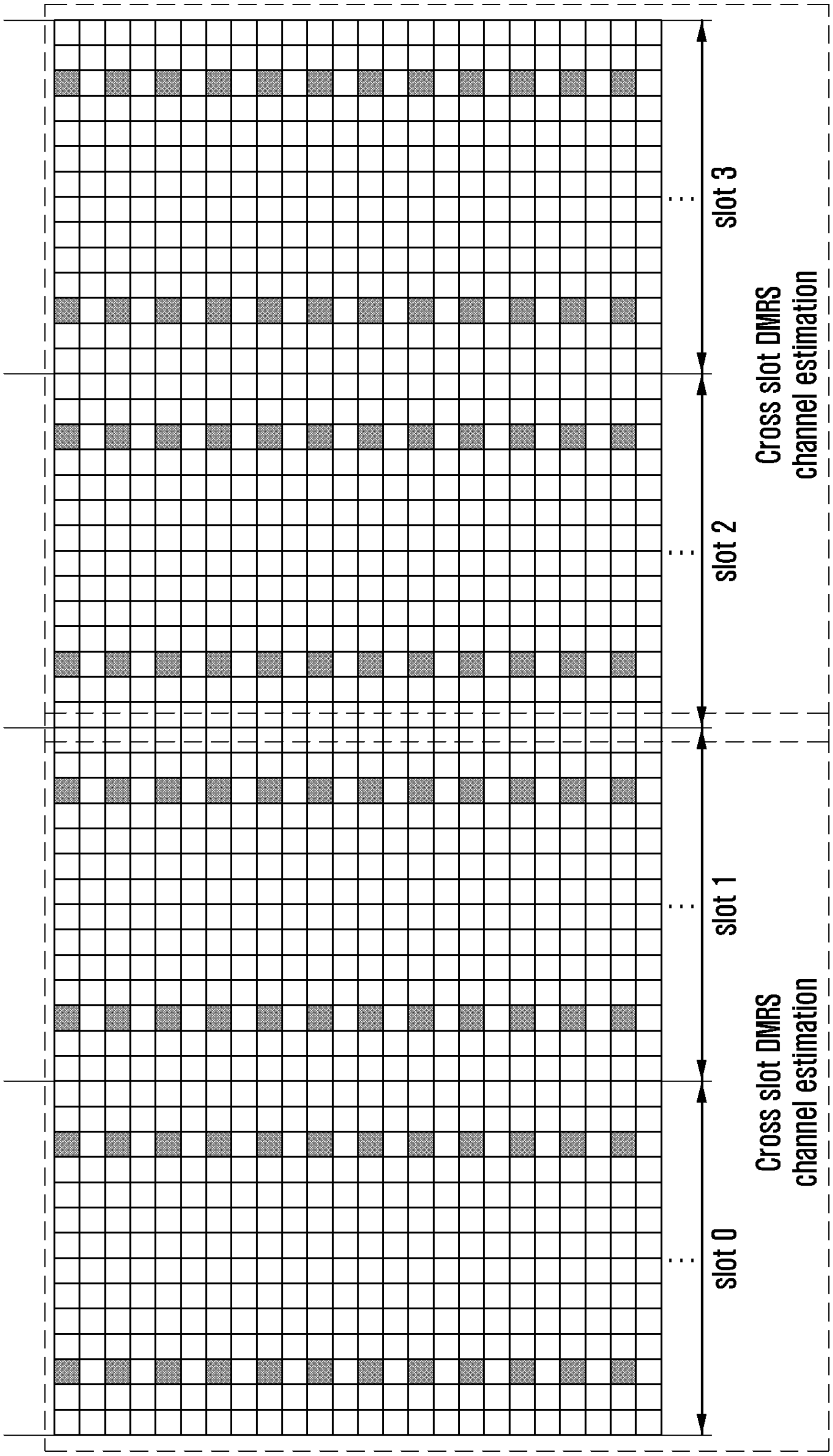
FIG. 5 is a diagram illustrating an example of simultaneous channel estimation using DMRS received from a plurality of PUSCHs in a time band in a 5G system.

FIG. 5 is a diagram illustrating an example of simultaneous channel estimation using DMRS received from a plurality of PUSCHs in a time band in a 5G system.

A base station may indicate whether a terminal uses the same precoding through a configuration, and, based on this indication, the base station may perform channel estimation by using DMRS transmissions using the same precoding, thereby enhancing DMRS channel estimation performance.

TABLE 2

```
DMRS-DownlinkConfig ::=                 SEQUENCE {
dmrs-Type               ENUMERATED {type2}              OPTIONAL,
  -- Need S
dmrs-AdditionalPosition                     ENUMERATED {pos0, pos1, pos3}
  OPTIONAL,             -- Need S
maxLength               ENUMERATED {len2}               OPTIONAL,
  -- Need S
scramblingID0               INTEGER (0..65535)          OPTIONAL,
  -- Need S
scramblingID1               INTEGER (0..65535)          OPTIONAL,
  -- Need S
phase TrackingRS                      SetupRelease { PTRS-DownlinkConfig }
  OPTIONAL,                 -- Need M
...
}
```

In addition, the uplink DMRS configuration described above may be configured through RRC signaling as shown in Table 3 below.

TABLE 3

```
DMRS-UplinkConfig ::=               SEQUENCE {
dmrs-Type               ENUMERATED {type2}              OPTIONAL,
  -- Need S
dmrs-AdditionalPosition               ENUMERATED {pos0, pos1, pos3}
  OPTIONAL,             -- Need S
phaseTrackingRS                       SetupRelease { PTRS-UplinkConfig }
  OPTIONAL,             -- Need M
maxLength               ENUMERATED {len2}               OPTIONAL,
  -- Need S
transformPrecodingDisabled          SEQUENCE {
scramblingID0               INTEGER (0..65535)          OPTIONAL,
  -- Need S
scramblingID1               INTEGER (0..65535)          OPTIONAL,
  -- Need S
...
}                                                   OPTIONAL,   -- Need R
transformPrecodingEnabled           SEQUENCE {
nPUSCH-Identity               INTEGER(0..1007)          OPTIONAL,
  -- Need S
sequenceGroupHopping                  ENUMERATED {disabled}
  OPTIONAL,             -- Need S
sequenceHopping             ENUMERATED {enabled}        OPTIONAL,
  -- Need S
...
}                                                   OPTIONAL,   -- Need R
...
}
```

In this case, in order to perform simultaneous channel estimation, transmission power consistency and phase continuity should be maintained. In order to maintain transmission power consistency and phase continuity, the same transmission power configuration, the same RB configuration, and the same MCS configuration are required, and DL transmission, reception, and monitoring should not occur between PUSCH/PUCCH where simultaneous channel estimation is performed. Through the above configurations, simultaneous channel estimation using DMRS of multiple PUSCHs may be performed when transmission power consistency and phase continuity are maintained.

In the same way as in FIG. 4, in performing channel estimation for decoding data by using the above DMRS in FIG. 5, PRB bundling interlocking with a system band may be used in a frequency band, and channel estimation may be performed within a precoding resource block group (PRG) which is a corresponding bundling unit. In addition, channel estimation may be performed on a time basis on the assumption that only the DMRS received through one or more PUSCHs undergoes the same precoding. Through this, since it is possible to perform channel estimation based on various DMRSs in the time band, channel estimation performance may be enhanced. In particular, even when data decoding performance is good, channel estimation performance may encounter a bottleneck in enhancing a coverage, and therefore, channel estimation performance may be very important.

Hereinafter, a time domain resource allocation method for a data channel in a 5G communication system will be described. A base station may configure a table regarding time domain resource allocation information for a downlink data channel (physical downlink shared channel (PDSCH)) and an uplink data channel (physical uplink shared channel (PUSCH)) for a terminal through higher layer signaling (e.g., RRC signaling).

The base station may configure a table that is formed of at most 17 (=maxNrofDL-Allocations) entries for the PDSCH, and may configure a table that is formed of at most 17 (=maxNrofUL-Allocations) entries for the PUSCH. The time domain resource allocation information may include, for example, a PDCCH-to-PDSCH slot timing (corresponding to a time interval in a slot unit between a time at which a PDCCH is received and a time at which a PDSCH scheduled by the received PDCCH is transmitted, represented by KO), or a PDCCH-to-PUSCH slot timing (corresponding to a time interval in a slot unit between a time at which a PDCCH is received and a time at which a PUSCH scheduled by the received PDCCH is transmitted, represented by K2), information regarding a position and length of a start symbol in which the PDSCH or PUSCH is scheduled within a slot, a mapping type of the PDSCH or PUSCH, and the like. For example, time domain resource allocation information regarding the PDSCH may be configured for the terminal through RRC signaling as shown in Table 4 below.

TABLE 4

| PDSCH-TimeDomainResourceAllocationList information element |
|---|
| PDSCH-TimeDomainResourceAllocationList ::= SEQUENCE<br>(SIZE(1..maxNrofDL-Allocations)) OF<br>PDSCH-TimeDomainResourceAllocation<br>PDSCH-TimeDomainResourceAllocation ::= SEQUENCE {<br>k0 INTEGER(0..32) OPTIONAL, -- Need S<br>(PDCCH-to-PDSCH timing, slot unit)<br>mappingType ENUMERATED {typeA, typeB},<br>(PDSCH mapping type)<br>startSymbolAndLength INTEGER (0..127)<br>(position and length of a start symbol of PDSCH)<br>} |

In addition, for example, time domain resource allocation information regarding the PUSCH may be configured for the terminal through RRC signaling as shown in Table 5 below.

TABLE 5

| PUSCH-TimeDomainResourceAllocation information element |
|---|
| PUSCH-TimeDomainResourceAllocationList ::= SEQUENCE<br>(SIZE(1..maxNrofUL-Allocations)) OF<br>PUSCH-TimeDomainResourceAllocation<br>PUSCH-TimeDomainResourceAllocation ::= SEQUENCE {<br>k2 INTEGER(0..32) OPTIONAL, -- Need S<br>(PDCCH-to-PUSCH timing, slot unit)<br>mappingType ENUMERATED {typeA, typeB},<br>(PUSCH mapping type)<br>startSymbolAndLength INTEGER (0..127)<br>(start symbol and length of PUSCH)<br>} |

The base station may transmit one of the entries of the table regarding the time domain resource allocation information to the terminal through L1 signaling (e.g., downlink control information (DCI)) (e.g., the base station may indicate the time domain resource allocation information with a 'time domain resource allocation' field in the DCI). The terminal may acquire the time domain resource allocation information regarding the PDSCH or the PUSCH, based on the DCI received from the base station.

Hereinafter, transmission of uplink data channel (physical uplink shared channel (PUSCH)) in a 5G system will be described in detail. The PUSCH transmission may be dynamically scheduled by a UL grant within DCI, or may be operated by configured grant type 1 or configured grant type 2. Dynamic scheduling for the PUSCH transmission may be indicated by DCI format 0_0 or 0_1.

The PUSCH transmission of configured grant type 1 may be configured semi-statically through reception of configuredGrantConfig including rrc-ConfiguredUplinkGrant of Table 6 through higher signaling, without receiving a UL grant within DCI. The PUSCH transmission of configured grant type 2 may be scheduled semi-continuously by a UL grant in DCI, after reception of configuredGrantConfig that does not include rrc-ConfiguredUplinkGrant of Table 6 through higher signaling. In case where PUSCH transmission is operated by a configured grant, parameters applied to the PUSCH transmission may be applied through configuredGrantConfig which is higher signaling of Table 6, except for specific parameters provided in pusch-Config of Table 7, which is higher signaling (e.g., dataScramblingIdentityPUSCH, txConfig, codebookSubset, maxRank, scaling of UCI-OnPUSCH, etc.). For example, if the terminal receives transformPrecoder in configuredGrantConfig which is higher signaling of Table 6, the terminal may apply tp-pi2BPSK in pusch-Config of Table 7 to PUSCH transmission operating by a configured grant.

TABLE 6

ConfiguredGrantConfig

```
ConfiguredGrantConfig ::=          SEQUENCE {
frequencyHopping                        ENUMERATED {intraSlot, interSlot}
  OPTIONAL,          -- Need S
cg-DMRS-Configuration          DMRS-UplinkConfig,
mcs-Table                               ENUMERATED {qam256, qam64LowSE}
  OPTIONAL,          -- Need S
mcs-TableTransformPrecoder              ENUMERATED {qam256, qam64LowSE}
  OPTIONAL,          -- Need S
uci-OnPUSCH                             SetupRelease { CG-UCI-OnPUSCH }
  OPTIONAL,          -- Need M
resourceAllocation                      ENUMERATED { resourceAllocationType0,
  resourceAllocationType1, dynamicSwitch },
rbg-Size          ENUMERATED {config2}          OPTIONAL,
  -- Need S
powerControlLoopToUse          ENUMERATED {n0, n1},
p0-PUSCH-Alpha          P0-PUSCH-AlphaSetId,
transformPrecoder                       ENUMERATED {enabled, disabled}
  OPTIONAL,          -- Need S
nrofHARQ-Processes          INTEGER(1..16),
repK          ENUMERATED {n1, n2, n4, n8},
repK-RV                                 ENUMERATED {s1-0231, s2-0303, s3-0000}
  OPTIONAL,          -- Need R
periodicity          ENUMERATED {
sym2, sym7, sym1x14, sym2x14, sym4x14, sym5x14, sym8x14, sym10x14, sym16x14,
  sym20x14,
sym32x14, sym40x14, sym64x14, sym80x14, sym128x14, sym160x14, sym256x14,
  sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12,
  sym20x12, sym32x12,
sym40x12, sym64x12, sym80x12, sym128x12, sym160x12, sym256x12, sym320x12,
  sym512x12, sym640x12,
sym1280x12, sym2560x12
},
configuredGrantTimer          INTEGER (1..64)          OPTIONAL,
  -- Need R
rrc-ConfiguredUplinkGrant          SEQUENCE {
timeDomainOffset          INTEGER (0..5119),
timeDomainAllocation          INTEGER (0..15),
frequencyDomainAllocation          BIT STRING (SIZE(18)),
antennaPort          INTEGER (0..31),
dmrs-SeqInitialization          INTEGER (0..1)          OPTIONAL,
  -- Need R
precodingAndNumberOfLayers          INTEGER (0..63),
srs-ResourceIndicator          INTEGER (0..15)          OPTIONAL,
  -- Need R
mcsAndTBS          INTEGER (0..31),
frequencyHoppingOffset          INTEGER (1..maxNrofPhysicalResourceBlocks-1)
  OPTIONAL,          -- Need R
pathlossReferenceIndex          INTEGER (0..maxNrofPUSCH-PathlossReferenceRSs-
  1),
...
}                                          OPTIONAL,   -- Need
  R
...
}
```

Next, a PUSCH transmission method will be described. A DMRS antenna port for PUSCH transmission may be the same as an antenna port for SRS transmission. The PUSCH transmission may follow a codebook-based transmission method and a non-codebook-based transmission method according to whether a value of txConfig in pusch-Config of Table 7, which is higher signaling, indicates a 'codebook' or a 'non-codebook'. As described above, PUSCH transmission may be dynamically scheduled through DCI format 0_0 or 0_1, and may be semi-statically configured by a configured grant.

If a terminal receives an indication of scheduling of PUSCH transmission through DCI format 0_0, the terminal may perform beam configuration for PUSCH transmission by using pucch-spatialRelationInfoID corresponding to a UE-specific, dedicated PUCCH resource having a lowest ID within an uplink bandwidth part (BWP) activated in a serving cell. In this case, the PUSCH transmission may be performed based on a single antenna port. The terminal may not expect scheduling for PUSCH transmission through DCI format 0_0 within a BWP in which a PUCCH resource including pucch-spatialRelationInfo is not configured. If the terminal does not receive a configuration of txConfig in pusch-Config of Table 7, the terminal may not expect scheduling with DCI format 0_1.

TABLE 7

PUSCH-Config

```
PUSCH-Config ::=                SEQUENCE {
dataScramblingIdentityPUSCH                            INTEGER (0..1023)
  OPTIONAL,              -- Need S
txConfig                              ENUMERATED {codebook, nonCodebook}
  OPTIONAL,              -- Need S
dmrs-UplinkForPUSCH-MappingTypeA          SetupRelease { DMRS-UplinkConfig }
  OPTIONAL,              -- Need M
dmrs-UplinkForPUSCH-MappingTypeB          SetupRelease { DMRS-UplinkConfig }
  OPTIONAL,              -- Need M
pusch-PowerControl              PUSCH-PowerControl              OPTIONAL,
  -- Need M
frequency Hopping                         ENUMERATED {intraSlot, interSlot}
  OPTIONAL,              -- Need S
frequencyHoppingOffsetLists       SEQUENCE (SIZE (1..4)) OF INTEGER (1..
  maxNrofPhysicalResourceBlocks-1)
OPTIONAL,   -- Need M
resourceAllocation                ENUMERATED { resourceAllocationType0,
  resourceAllocationType1, dynamicSwitch},
pusch-TimeDomainAllocationList                      SetupRelease { PUSCH-
  TimeDomainResourceAllocationList }               OPTIONAL, -- Need M
pusch-AggregationFactor                        ENUMERATED { n2, n4, n8 }
  OPTIONAL,              -- Need S
mcs-Table                              ENUMERATED {qam256, qam64LowSE}
  OPTIONAL,              -- Need S
mcs-TableTransformPrecoder             ENUMERATED {qam256, qam64LowSE}
  OPTIONAL,              -- Need S
transformPrecoder                          ENUMERATED {enabled, disabled}
  OPTIONAL,              -- Need S
codebookSubset                 ENUMERATED {fullyAndPartialAndNonCoherent,
  partial AndNonCoherent,nonCoherent}
OPTIONAL, -- Cond codebookBased
maxRank                         INTEGER (1..4)               OPTIONAL, --
  Cond codebookBased
rbg-Size                    ENUMERATED { config2 }              OPTIONAL,
  -- Need S
uci-OnPUSCH                    SetupRelease { UCI-OnPUSCH}        OPTIONAL,
  --
Need M
tp-pi2BPSK                    ENUMERATED { enabled }              OPTIONAL,
  -- Need S
...
}
```

Next, codebook-based PUSCH transmission will be described. The codebook-based PUSCH transmission may be dynamically scheduled through DCI format 0_0 or 0_1, and may be semi-statically operated by a configured grant. When codebook-based PUSCH transmission is dynamically scheduled through DCI format 0_1 or is semi-statically configured by a configured grant, the terminal may determine a precoder for PUSCH transmission, based on an SRS resource indicator (SRI), a transmission precoding matrix indicator (TPMI), and a transmission rank (the number of PUSCH transmission layers).

In this case, the SRI may be given through a field SRS resource indicator within DCI or may be configured through srs-ResourceIndicator which is higher signaling. The terminal may receive a configuration of at least one SRS resource at the time of codebook-based PUSCH transmission, and for example, may receive a configuration of at most two SRS resources. In case where the terminal receives an SRI through DCI, an SRS resource indicated by the corresponding SRI may refer to an SRS resource corresponding to the SRI, among SRS resources transmitted earlier than a PDCCH including the corresponding SRI. In addition, the TPMI and the transmission rank may be given through field precoding information and the number of layers in DCI, or may be configured through precodingAndNumberOfLayers which is higher signaling. The TPMI may be used to indicate a precoder which is applied to PUSCH transmission.

The precoder to be used for PUSCH transmission may be selected from an uplink codebook that has the same number of antenna ports as an nrofSRS-Ports value in SRS-Config, which is higher signaling. In the codebook-based PUSCH transmission, the terminal may determine a codebook subset based on the TPMI and codebookSubset within pusch-Config which is higher signaling. In this case, codebookSubset in pusch-Config which is higher signaling may be configured to one of ‘fully AndPartialAndNonCoherent’, ‘partialAndNonCoherent’, or ‘nonCoherent’, based on a UE capability of the terminal to report to the base station.

If the terminal reports ‘partialAndNonCoherent’ with the UE capability, the terminal may not expect that the value of codebookSubset which is higher signaling is configured to ‘fullyAndPartialAndNonCoherent.’ If the terminal reports ‘nonCoherent’ with the UE capability, the terminal may not expect that the value of codebookSubset which is higher signaling is configured to ‘fully AndPartialAndNonCoherent’ or ‘partialAndNonCoherent.’ In case where nrofSRS-Ports in SRS-ResourceSet which is higher signaling indicates two SRS antenna ports, the terminal may not expect that the value of codebookSubset which is higher signaling is configured to ‘partialAndNonCoherent’.

The terminal may receive a configuration of one SRS resource set in which a value of usage within SRS-ResourceSet, which is higher signaling, is configured to ‘codebook’, and one SRS resource in the corresponding SRS resource set may be indicated through the SRI. If various SRS resources are configured within the SRS resource set in which the value of usage in SRS-ResourceSet which is higher signaling is configured to 'codebook', the terminal may expect that values of nrofSRS-Ports in SRS-Resource which is higher signaling are the same values for all SRS resources.

The terminal may transmit, to the base station, one or a plurality of SRS resources included in the SRS resource set in which the value of usage is configured to 'codebook' according to higher signaling, and the base station may select one of the SRS resources transmitted by the terminal, and may instruct the terminal to perform PUSCH transmission by using transmission beam information of the corresponding SRS resource. In this case, in the codebook-based PUSCH transmission, the SRI may be used as information for selecting an index of one SRS resource and may be included in DCI. Additionally, the base station may include information indicating the TPMI and the rank to be used by the terminal for PUSCH transmission in DCI, and may transmit the DCI. The terminal may perform PUSCH transmission by using an SRS resource indicated by the SRI, and applying a precoder indicated by the TPMI and the rank which are indicated based on a transmission beam of the corresponding SRS resource.

Next, non-codebook-based PUSCH transmission will be described. The non-codebook-based PUSCH transmission may be dynamically scheduled through DCI format 0_0 or 0_1, or may semi-statically operate by a configured grant. In case where at least one SRS resource is configured within an SRS resource set in which a value of usage within SRS-ResourceSet which is higher signaling is configured to 'nonCodeBook', the terminal may receive scheduling of non-codebook-based PUSCH transmission through DCI format 0_1.

With respect to the SRS resource set in which the value of usage within SRS-ResourceSet which is higher signaling is configured to 'nonCodebook', the terminal may receive a configuration of a non-zero power (NZP) CSI-RS resource associated with one SRS resource set. The terminal may perform calculation with respect to a precoder for SRS transmission, by measuring the NZP CSI-RS resource configured in association with the SRS resource set. In case where a difference between a last reception symbol of an aperiodic NZP CSI-RS resource associated with the SRS resource set, and a first symbol of aperiodic SRS transmission in the terminal is less than a specific symbol (e.g., 42 symbols), the terminal may not expect that information regarding the precoder for SRS transmission is updated.

When a value of resourceType in SRS-ResourceSet which is higher signaling is configured to 'aperiodic', the NZP CSI-RS associated with the SRS-ResourceSet may be indicated by an SRS request which is a field within DCI format 0_1 or 1_1. In this case, in case where the NZP CSI-RS resource associated with SRS-ResourceSet is an aperiodic NZP CSI-RS resource and a value of the field SRS request in DCI format 0_1 or 1_1 is not '00', it may be indicated that there exists NZP CSI-RS associated with SRS-ResourceSet. In this case, the corresponding DCI should not indicate cross carrier or cross BWP scheduling. In addition, in case where the value of the SRS request indicates existence of the NZP CSI-RS, the corresponding NZP CSI-RS may be positioned in a slot in which a PDCCH including the SRS request field is transmitted. In this case, TCI states configured in a scheduled subcarrier may not be configured to QCL-TypeD.

If a periodic or semi-static SRS resource set is configured, the NZP CSI-RS associated with the SRS resource set may be indicated through associatedCSI-RS in SRS-ResourceSet which is higher signaling. With respect to non-codebook-based transmission, the terminal may not expect that associatedCSI-RS in spatialRelationInfo which is higher signaling for the SRS resource and SRS-ResourceSet which is higher signaling is configured.

In case where the terminal receives a configuration of a plurality of SRS resources, the terminal may determine a precoder and a transmission rank to apply to PUSCH transmission, based on the SRI indicated by the base station. In this case, the SRI may be indicated through a field SRS resource indicator in DCI or may be configured through srs-ResourceIndicator which is higher signaling. Like in the above-described codebook-based PUSCH transmission, in case where the terminal receives an SRI through DCI, an SRS resource indicated by the corresponding SRI may refer to an SRS resource corresponding to the SRI, among SRS resources transmitted earlier than a PDCCH including the corresponding SRI. The terminal may use one or a plurality of SRS resources for SRS transmission, and the maximum number of SRS resources which may be transmitted simultaneously in the same symbol within one SRS resource set may be determined by the UE capability of the terminal to report to the base station. In this case, SRS resources that the terminal transmits simultaneously may occupy the same RB. The terminal may configure one SRS port for each SRS resource. Only one SRS resource set in which the value of usage in SRS-ResourceSet which is higher signaling is configured to 'nonCodebook' may be configured, and the number of SRS resources for non-codebook-based PUSCH transmission may be configured to 4 to the maximum.

The base station may transmit one NZP CSI-RS associated with the SRS resource set to the terminal, and the terminal may calculate a precoder to be used for transmission of one or a plurality of SRS resources within a corresponding SRS resource, based on a result of measuring when the corresponding NZP CSI-RS is received. The terminal may apply the calculated precoder when transmitting one or the plurality of SRS resources in the SRS resource set in which the usage is configured to 'nonCodebook' to the base station, and the base station may select one or a plurality of SRS resources from the received one or plurality of SRS resources. In this case, in the non-codebook-based PUSCH transmission, the SRI may indicate an index expressing a combination of one or a plurality of SRS resources, and the SRI may be included in DCI. In this case, the number of SRS resources indicated by the SRI transmitted by the base station may be the number of transmission layers of PUSCH, and the terminal may transmit the PUSCH by applying the precoder applied to SRS resource transmission to each layer.

Next, a PUSCH repetitive transmission will be described. When a terminal receives scheduling of PUSCH transmission in DCI format 0_1 within a PDCCH, which includes CRC scrambled into C-RNTI, MCS-C-RNTI, or CS-RNTI, if the terminal receives a configuration of higher layer signaling pusch-AggregationFactor, the same symbol allocation may be applied to as many continuous slots as pusch-AggregationFactor, and PUSCH transmission may be limited to single rank transmission. For example, the terminal should repeat the same transport block (TB) in as many continuous slots as pusch-AggregationFactor, and should apply the same symbol allocation to each slot. Table 8 shows a redundancy version applied to PUSCH repetitive transmission in each slot. If the terminal receives scheduling of PUSCH repetitive transmission in DCI format 0_1 in a plurality of slots, and at least one symbol of slots in which PUSCH repetitive transmission is performed is indicated as a downlink symbol according to information of higher layer signaling tdd-UL-DL-ConfigurationComma or tdd-UL-DL- ConfigurationDedicated, the terminal may not perform PUSCH transmission in a slot where the corresponding symbol is positioned.

TABLE 8

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. The 5G system supports two types of repetitive transmission of an uplink data channel, that is, a PUSCH repetitive transmission type A and a PUSCH repetitive transmission type B. The terminal may receive a configuration of one of the PUSCH repetitive transmission types A and B through higher layer signaling.

PUSCH repetitive transmission type A

As described above, a start symbol and length of an uplink data channel are determined in one slot according to the time domain resource allocation method, and a base station may transmit the number of repetitive transmissions to the terminal through higher layer signaling (e.g., RRC signaling) or L1 signaling (e.g., DCI).

The terminal may repeatedly transmit an uplink data channel that has the same start symbol and length as the configured uplink data channel in continuous slots, based on the received number of repetitive transmissions. In this case, in case where at least one symbol in a slot that the base station configures as a downlink for the terminal, or in a slot for repetitive transmission of an uplink data channel configured for the terminal is configured to a downlink, the terminal may omit the uplink data channel transmission in the corresponding slot. That is, the uplink data channel transmission may be included in the number of uplink data channel repetitive transmissions, but may not be performed. On the other hand, a terminal supporting Rel-17 uplink data repetition transmission may determine a slot, in which uplink data repetition transmission is possible, as an available slot, and count the number of transmissions at the time of uplink data channel repetition transmission in a slot determined as an available slot. In case where the uplink data channel repetition transmission in a slot determined as an available slot is skipped, the uplink data channel transmission may be repeatedly performed through a slot transmittable after postpone.

PUSCH repetitive transmission type B

As described above, a start symbol and length of an uplink data channel is determined in one slot according to the time domain resource allocation method, and a base station may transmit the number of repetitive transmissions numberofrepetitions to the terminal through higher signaling (e.g., RRC signaling) or L1 signaling (e.g., DCI).

Based on the start symbol and length of the uplink data channel configured as described above, a nominal repetition of the uplink data channel may be determined as follows. Herein, the nominal repetition may refer to a resource of a symbol which is configured by the base station for PUSCH repetitive transmission, and the terminal may determine a resource to be used for an uplink in the configured nominal repetition. In this case, a slot in which the n-th nominal repetition starts may be given by $$K_s + \left\lfloor \frac{S + n \cdot L}{N_{symb}^{slot}} \right\rfloor,$$

and a symbol in which the nominal repetition starts in the start slot may be given by $$\mathrm{mod}\left(S + n \cdot L,\ N_{symb}^{slot}\right).$$

A slot in which the n-th nominal repetition ends may be given by $$K_s + \left\lfloor \frac{S + (n+1) \cdot L - 1}{N_{symb}^{slot}} \right\rfloor,$$

and a symbol in which the nominal repetition ends in the last slot may be given by $$\mathrm{mod}\left(S + (n+1) \cdot L - 1,\ N_{symb}^{slot}\right).$$

Herein, n–0, . . . , numberofrepetition-1, S may indicate a start symbol of a configured uplink data channel, and L may indicate a symbol length of the configured uplink data channel. $K_s$ may indicate a slot in which PUSCH transmission starts, and $$N_{symb}^{slot}$$

may indicate the number of symbols per slot.

The terminal determines an invalid symbol for the PUSCH repetitive transmission type B. A symbol configured to a downlink by tdd-UL-DL-Configuration-Common or tdd-UL-DL-ConfigurationDedicated may be determined as an invalid symbol for the PUSCH repetitive transmission type B. Additionally, the invalid symbol may be configured based on a higher layer parameter (e.g., InvalidSymbolPattern). For example, the higher layer parameter (e.g., InvalidSymbolPattern) may configure an invalid symbol by providing a symbol level bitmap over one slot or two slots. In this case, 1 expressed on the bitmap may indicate an invalid symbol. Additionally, a cycle and pattern of the bitmap may be configured through the higher layer parameter (e.g., periodicity AndPattern). If the higher layer parameter (e.g., InvalidSymbolPattern) is configured and InvalidSymbolPatternIndicator-ForDCIFormat0_1 or InvalidSymbolPatternIndicator-ForDCIFormat0_2 parameter indicates 1, the terminal may apply the invalid symbol pattern, and, if InvalidSymbolPattern-Indicator-ForDCIFonnat0_1 or InvalidSymbolPattern-Indicator-ForDCIFormat0_2 parameter indicates 0, the terminal may not apply the invalid symbol pattern. Alternatively, if the higher layer parameter (e.g., InvalidSymbolPattern) is configured and InvalidSymbol-PatternIndicator-ForDCIFormat0_1 or InvalidSymbol-PatternIndicator-ForDCIFormat0_2 parameter is not configured, the terminal may apply the invalid symbol pattern.

After determining the invalid symbol in each nominal repetition, the terminal may consider symbols except for the determined invalid symbol as valid symbols. If one or more valid symbols are included in each nominal repetition, the nominal repetition may include one or more actual repetitions. Herein, each actual repetition may refer to a symbol that is actually used for PUSCH repetitive transmission among symbols configured to the configured nominal repetition, and may include a continuous set of valid symbols which are used for the PUSCH repetitive transmission type B in one slot. If actual repetition having one symbol is configured to be valid except for a case where a symbol length of the configured uplink data channel L is 1, the terminal may omit actual repetition transmission. A redundancy version is applied according to a redundancy version pattern which is configured for every n-th actual repetition.

Figure 6:
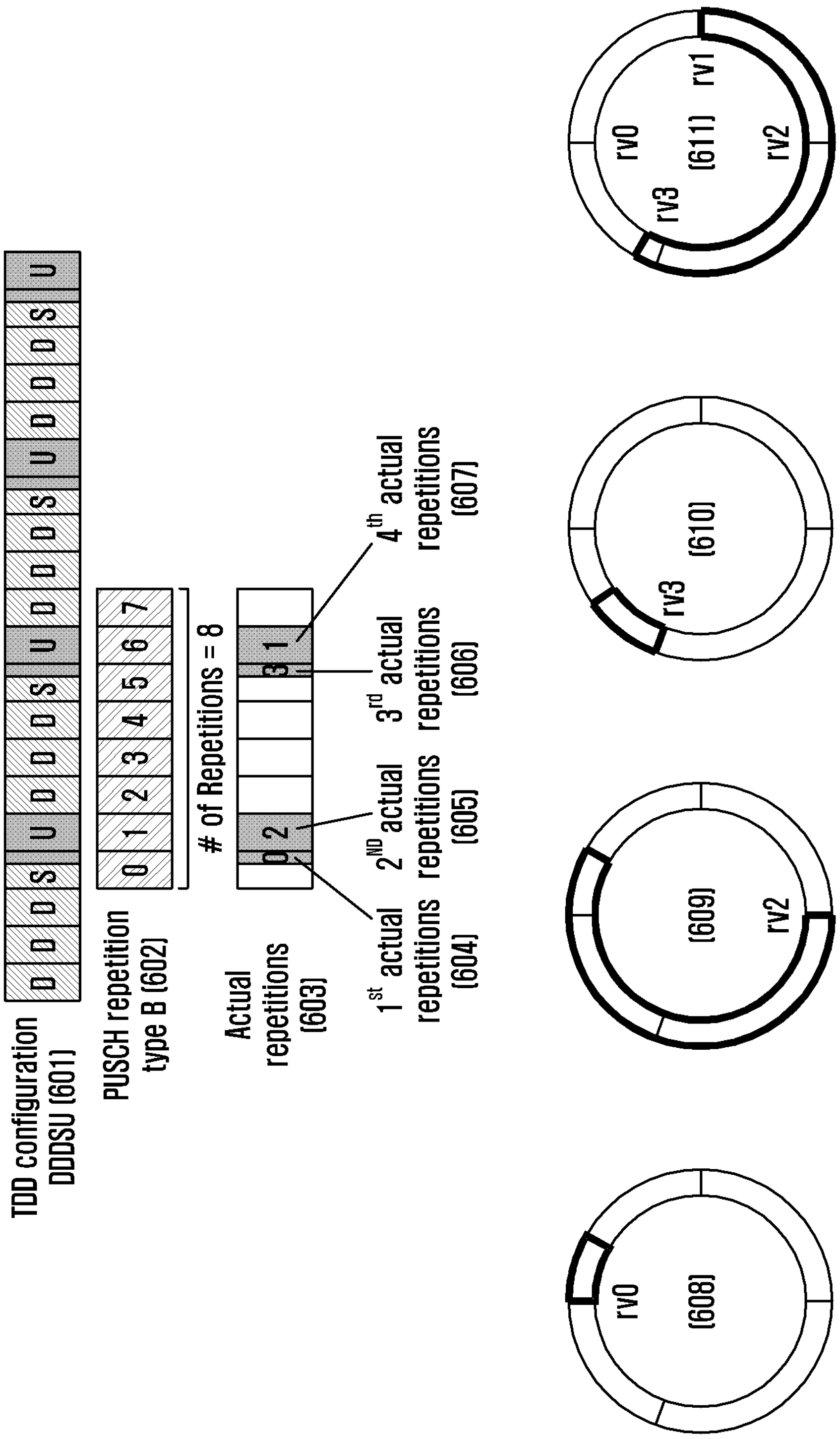
FIG. 6 is a diagram illustrating an example of PUSCH repetitive transmission type B in a 5G system.

FIG. 6 is a diagram illustrating an example of repetitive PUSCH transmission type B in a 5G system.

A terminal may configure a frame structure of time division duplexing (TDD) to include three downlink slots, one special/flexible slot, one uplink slot. Herein, when the special/flexible slot includes 11 downlink symbols and 3 uplink symbols, an initial transmission slot in a second uplink transmission may be in the third place, and, when the terminal receives a configuration indicating that an index of a start symbol of an uplink data channel is 0 and a length of the uplink data channel is 14, and the number of repetitive transmissions repK is 8, a nominal repetition may appear in 8 continuous slots from the initial transmission slot (602). Thereafter, the terminal may determine a symbol that is configured to a downlink symbol in the frame structure 601 of the TDD system in each nominal repetition, as an invalid symbol, and, in case where valid symbols include one or more continuous symbols in one slot, actual repetition may be configured and transmission may be performed (603). Accordingly, four (repK_actual=4) PUSCHs may be actually transmitted. In this case, in case where repK-RV is configured to 0-2-3-1, RV in the PUSCH of the first resource 604 actually transmitted is 0, RV in the PUSCH of the second resource 605 actually transmitted is 2, RV in the PUSCH of the third resource 606 actually transmitted is 3, and RV in the PUSCH of the fourth resource 607 actually transmitted is 1. In this case, only the PUSCH having RV of 0 and RV of 3 has a value that is decoded by itself, and in the case of the first resource 604 and the third resource 606, the PUSCH is transmitted only in three symbols which are even less than an actually configured symbol length (14 symbols), and accordingly, a length 608, 610 of bit that is rate-matched is shorter than a bit length 609, 611 calculated by a configuration.

Figure 7:
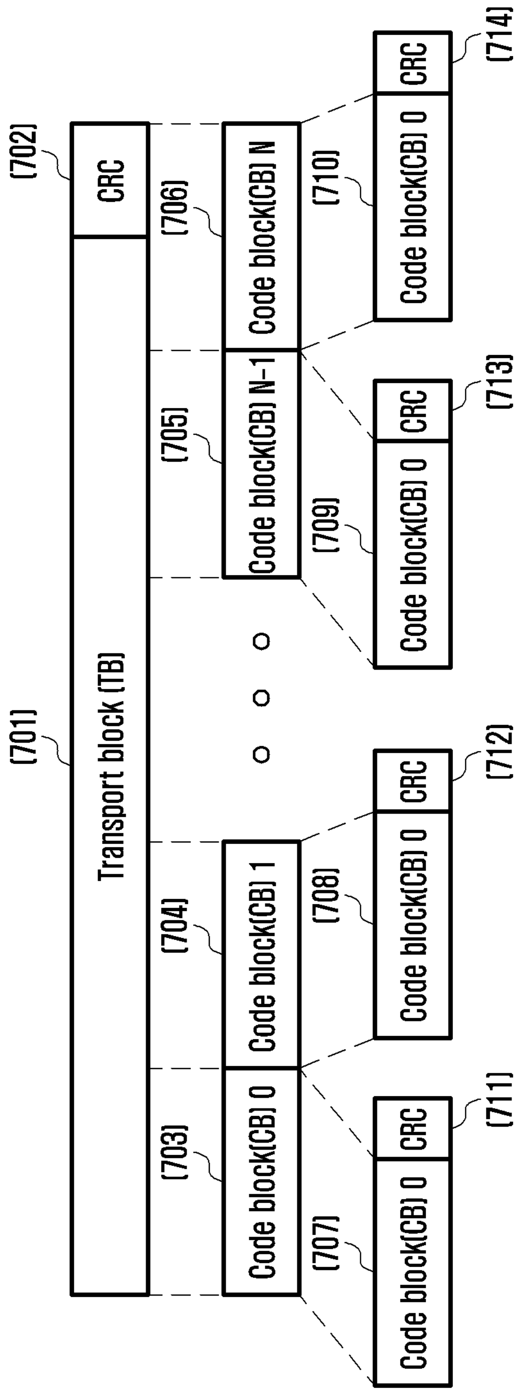
FIG. 7 is a diagram illustrating an example of a process in which a transport block (TB) is divided into multiple code blocks (CBs) and a CRC is added thereto in a 5G communication system.

FIG. 7 is a diagram illustrating an example of a process in which a transport block (TB) is divided into multiple code blocks (CBs) and a CRC is added thereto in a 5G communication system.

With reference to FIG. 7, a CRC 702 may be added to a tail or head portion of one transport block (TB) 701 to be transmitted in an uplink or a downlink. The CRC 702 may have 16 bits or 24 bits, or a pre-fixed number of bits, or may have a variable number of bits according to a channel condition, and may be used to determine whether channel coding succeeds. The block in which the CRC 702 is added to the TB 701 may be segmented into a plurality of code block (CBs) 703, 704, 705, 706. In this case, a maximum size of the CB may be pre-defined, and in this case, the last CB 706 may have a size smaller than the other CBs 703, 704, 705. However, this is merely an example, and according to another example, 0, a certain value, or 1 may be inserted into the last CB 706, such that the last CB 706 and the other CBs 703, 704, 705 have the same length. In addition, CRCs 711, 712, 713, 714 may be added to CBs 707, 708, 709, 710, respectively. The CRCs 711, 712, 713, 714 may have 16 bits or 24 bits or a pre-fixed number of bits, and may be used to determine whether channel coding succeeds. In order to generate the CRC 702, the TB 701 and a cyclic generator polynomial may be used. The cyclic generator polynomial may be defined in various methods. For example, on the assumption that a cyclic generator polynomial for a 24-bit CRC is gCRC24A(D)=D24+D23+D18+D18+D14+D11+D10+D7+D6+D5+D4+D3+D+1, if L=24, CRC p1, p2, . . . , pL−1 regarding TB data a0, a1, a2, a3, . . . , aA−1 may be determined to be a value that has the remainder of 0 when a0DA+23+a1DA+22+ . . . +aA−1 D24+p0D23+p1D22+ . . . +p22D1+p23 is divided by gCRC24A(D), that is, p1, p2, . . . , pL−1. In the above-described example, it is illustrated that the CRC length L is 24, but the CRC length L may be determined to be various lengths like 12, 16, 24, 32, 40, 48, 64, etc. After the CRC is added to the TB through this process, the TB+CRC may be segmented into N number of CBs 703, 704, 705, 706. CRCs 711, 712, 713, 714 may be added to the segmented CBs 703, 704, 705, 706, respectively. The CRC added to the CB may have a different length from that when the CRC added to the TB is generated, or may be generated based on other cyclic generator polynomials. In addition, the CRC 702 added to the TB and the CRCs 711, 712, 713, 714 added to the CBs may be omitted according to a type of a CB applied to the CB. For example, in case where a LDPC code other than a turbo code is applied to the CB, the CRCs 711, 712, 713, 714 to be added to every CB may be omitted. However, even in case where the LDPC is applied, the CRCs 711, 712, 713, 714 may be added to the CBs as they are. In addition, even in case where a polar code is used, the CRC may be added or may be omitted. As described with respect to FIG. 7, a maximum length of one CB of the TB to be transmitted may be determined according to a type of channel coding applied, and the TB and the CRC added to the TB may be segmented into CBs according to the maximum length of the CB. In a conventional LTE system, a CRC for a CB may be added to the segmented CB, and data bits and CRC of the CB may be encoded into a channel code, and accordingly, coded bits are determined, and the number of bits rate-matching the respective coded bits may be determined as predefined.

Hereinafter, a method for calculating a transport block size (TBS) in a 5G system will be described in detail.

The number of REs allocated to PUSCH mapping in one PRB within an allocated resource, $$N'_{RE},$$

is calculated.

$$N'_{RE}$$

may be calculated by $$N_{sc}^{RB} \times N_{symb}^{sh} - N_{DMRS}^{PRB} - N_{oh}^{PRB}.$$

Herein, $$N_{sc}^{RB}$$

may be 12 and $$N_{symb}^{sh}$$

may indicate the number of OFDM symbols allocated to a PUSCH.

$$N_{DMRS}^{PRB}$$

is the number of REs in one PRB occupied by a DMRS of the same CDM group.

$$N_{oh}^{PRB}$$

is the number of REs occupied by an overhead in one PRB configured by higher signaling, and may be configured to one of 0, 6, 12, 18. Thereafter, the number of REs allocated to the PUSCH, $N_{RE}$, may be calculated. $N_{RE}$ may be calculated by $$\min(166, N'_{RE}) \times n_{PRB},$$

and $n_{PRB}$ indicates the number of PRBs allocated to a terminal. The number of temporary information bits, $N_{info}$, may be calculated by $N_{RE} \times R \times Q_m \times v$. R is a code rate and $Q_m$ is a modulation order, and information of these values may be transmitted by using an MCS bit field of DCI and a predefined table. In addition, v is the number of allocated layers. If $N_{info} \leq 3824$, a TBS may be calculated through the following process. In addition, the TBS may be calculated through step 4.

$$N'_{info}$$

may be calculated through equations $$N_{info} = \max\left(24, 2^n \times \left\lfloor \frac{N_{info}}{2^n} \right\rfloor\right)$$

and $n=\max(3, \lfloor \log_2(N_{info}) \rfloor - 6)$. The TBS may be determined by a value that is closest to $$N'_{info}$$

among values that are not smaller than $$N'_{info}$$

in Table 9 below.

TABLE 9

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |

TABLE 9-continued

| Index | TBS |
|---|---|
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info}$>3824, $$N'_{info}$$

may be calculated by equations $$N'_{info} = \max\left(3840,\ 2^n \times \text{round}\left(\frac{N_{info}-24}{2^n}\right)\right)$$

and $n=\lfloor \log_2(N_{info}-24)\rfloor-5$. The TBS may be determined through $$N'_{info}$$

and [pseudo-code 1] below. In the following, C corresponds to the number of CBs included in one TB.

[Start Pseudo-code 1]
if R ≤ 1/4

$$TBS = 8*C*\left\lceil\frac{N'_{info}+24}{8*C}\right\rceil - 24,\ \text{where } C = \left\lceil\frac{N'_{info}+24}{3816}\right\rceil$$

-continued else if $N'_{info} > 8424$ $$TBS = 8*C*\left\lceil\frac{N'_{info}+24}{8*C}\right\rceil - 24,\ \text{where } C = \left\lceil\frac{N'_{info}+24}{8424}\right\rceil$$

else $$TBS = 8*\left\lceil\frac{N'_{info}+24}{8}\right\rceil - 24$$

end if
end if
[End Pseudo-code 1]

In the following, PUSCH transmission power in the 5G communication system is described. The following Equation 1 is the equation that determines PUSCH transmission power.

Equation 1

$$P_{PUSCH}(i, j, q_d, l) = \min\left\{\begin{array}{c} P_{CMAX,f,c}(i), \\ P_{O_{PUSCH},b,f,c}(j) + 10\log_{10}\left(2^{\mu}\cdot M^{PUSCH}_{RB,b,f,c}(i)\right) + \\ \alpha_{b,f,c}(j)\cdot PL_{b,f,c}(q_d) + \Delta_{TF,b,f,c}(i) + f_{b,f,c}(i, l) \end{array}\right\} \text{[dBm]}$$

In Equation 1, $P_{CMAX,f,c}(i)$ denotes maximum transmission power configured in the terminal fo $P_{O_{PUSCH}b,f,c}(j)$ r a carrier of a serving cell c at a PUSCH transmission time point i. denotes a reference configuration transmission power configuration value according to an activated uplink bandwidth part (BWP) b of the carrier f of the serving cell c, and has different values according to various transmission type j. Further, the values may be various according to a case in which PUSCH transmission is a message 3 PUSCH for random access, or a case in which a PUSCH is a configured grant PUSCH, or a scheduled PUSCH.

$$M^{PUSCH}_{RB,b,f,c}(i)$$

denotes the size of a frequency to which the PUSCH is allocated. $\alpha_{b,f,c}(j)$ denotes a compensation rate degree value for path loss of UL BWP b of the carrier f of the serving cell c, and may be configured by a higher-layer signal and may have different values according to j. $PL_{b,f,c}(q_d)$ denotes a downlink path loss estimation value of the UL BWP b of the carrier f of the serving c and may use a value measured through a reference signal in an activated downlink BWP section. The reference signal may be an SS/PBCH block or a CSI-RS. Meanwhile, the terminal may measure reference signal received power (RSRP) from a path attenuation estimation signal transmitted by the base station and estimate a downlink path attenuation value as shown in Equation 2. Further, an uplink transmission power value for transmitting the random access preamble and message 3 may be configured on the basis of the estimated path attenuation value.

Downlink path attenuation=transmission power of signal of a base station—RSRP measured by a terminal Equation 2

In Equation 2, transmission power of the signal of the base station is transmission power of a downlink path attenuation estimation signal transmitted by the base station. The downlink path attenuation estimation signal transmitted by the base station may be a cell-specific reference signal (CRS) or a synchronization signal block (SSB). In case where the path attenuation estimation signal is a cell-specific reference signal (CRS), the transmission power of the base station signal refers to the transmission power of the CRS, and may be transmitted to the terminal through the referenceSignalPower parameter of system information. In case where the path attenuation estimation signal is synchronization signal block (SSB), the transmission power of the signal of the base station refers to the transmission power of a secondary synchronization signal (SSS) and DeModulation reference signal (DMRS) transmitted through the PBCH, and may be transmitted to the terminal through the ss-PBCH-BlockPower parameter of the system information. As described above in Equation 2, the downlink path loss may be calculated. Alternatively, $PL_{b,f,c}(q_d)$ denotes a downlink path attenuation value and corresponds to path attenuation calculated by the terminal as shown in Equation 2. The terminal calculates path attenuation on the basis of reference signal resources associated with the SS/PBCH block or the CSI-RS according to whether a higher-layer signal is configured. As described above, for the reference signal resources, one of a plurality of reference signal resource sets may be selected by a higher-layer signal or an L1 signal, and the terminal calculates path attenuation on the basis of the reference signal resources.

$$\Delta_{TF,b,f,c}(i) = 10\log_{10}\left(\left(2^{BPRE\cdot K_s} - 1\right)\cdot \beta_{offset}^{PUSCH}\right)$$

denotes a value determined by a modulation and coding scheme (MCS) value of the PUSCH at the PUSCH transmission time point i of the UL BWP b of the carrier f of the serving cell c. $f_{b,f,c}(i,l)$ denotes a power control adaption value and may dynamically control a power value by a transmission power control (TPC) command. The TPC command is divided into an accumulated mode and an absolute mode, and one of the two modes is determined by a higher-layer signal. In the accumulated mode, the currently determined power control adaption value is accumulated on a value indicated by the TPC command and may increase or decrease according to the TPC command, and has the relation of $f_{b,f,c}(i,l)=f_{b,f,c}(i-i_0,l)+\Sigma\delta_{PUSCH,b,f,c}$. $\delta_{PUSCH,b,f,c}$ is a value indicated by the TPC command. In the absolute mode, the value is determined by the TPC command regardless of the currently determined power control adaption value, and has the relation of $f_{b,f,c}(i,l)=\delta_{PUSCH,b,f,c}$. Table 10 below shows values which can be indicated by the TPC commands.

TABLE 10

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

In this case, the TPC command may be transmitted to the terminal through UE-specific DCI or group common DCI. Therefore, the base station can dynamically control the transmission power of the terminal through the TPC command.

Hereinafter, a method for determining an uplink available slot for single or multiple PUSCH transmission in a 5G system will be described in detail. In this case, in order to determine an available slot, in case where at least one symbol configured to TDRA for PUSCH in a slot for PUSCH transmission overlaps with a symbol for purposes other than uplink transmission, a corresponding slot is determined as an unavailable slot. In addition, the available slot may be considered as a resource for PUSCH repetitive transmission and PUSCH transmission in TB processing over multi-slot (TBoMS) and an uplink resource for determining TBS.

Figure 8:
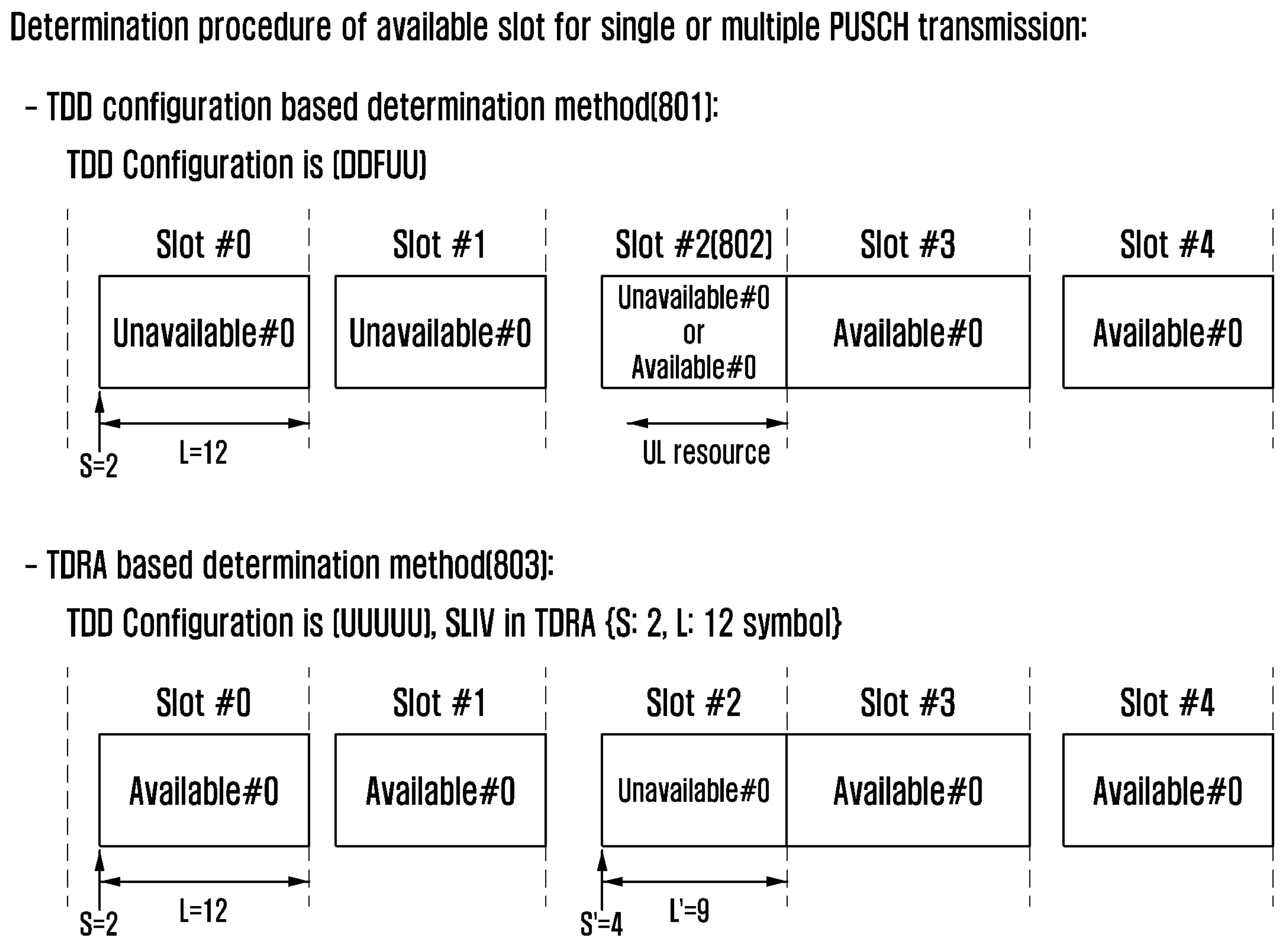
FIG. 8 is a diagram illustrating a method for determining an available slot in a 5G system.

FIG. 8 is a diagram illustrating a method for determining an available slot in a 5G system.

When the base station configures an uplink resource through higher layer signaling (tdd-UL-DL-Configuration-Common or tdd-UL-DL-ConfigurationDedicated) or L1 signaling (dynamic slot format indicator), for the configured uplink resource, the base station and the terminal may determine an available slot through 1. a method for determining an available slot based on TDD configuration or 2. a method for determining an available slot considering TDD configuration and time domain resource allocation (TDRA), CG configuration or activation DCI.

As an example of a method for determining an available slots based on TDD configuration, in FIG. 8, in case where the TDD configuration is configured to 'DDFUU' through higher layer signaling, the base station and the terminal may determine slot #3, slot #4 configured to uplink 'U' as an available slot, based on the TDD configuration (801). In this case, slot #2 (802), which is configured to a flexible slot 'F' based on the TDD configuration, may be determined as an unavailable slot or an available slot, and may be predefined through base station configuration, for example.

As an example of a method for determining an available slot considering TDD configuration and time domain resource allocation(TDRA), CG configuration or activation DCI, in FIG. 8, in case where TDD configuration is configured to 'UUUUU' through higher layer signaling, and the SLIV of PUSCH transmission is configured to {S: 2, L: 12 symbol} through L1 signaling, the base station and the terminal may determine slot #0, slot #1, slot #3, slot #4, which satisfy the SLIV of PUSCH for the above configured uplink slot 'U', as available slots. In this case, the base station and the terminal may determine slot #2 ('L=9'≤SLIV 'L=12'), which does not satisfy SLIV, the TDRA condition for PUSCH transmission, as an unavailable slot (803). This is merely an example and is not limited to PUSCH transmission and may be applied to PUCCH transmission, PUSCH/PUCCH repetitive transmission, nominal repetition of PUSCH repetition type B, and TBoMS.

Figure 9A:
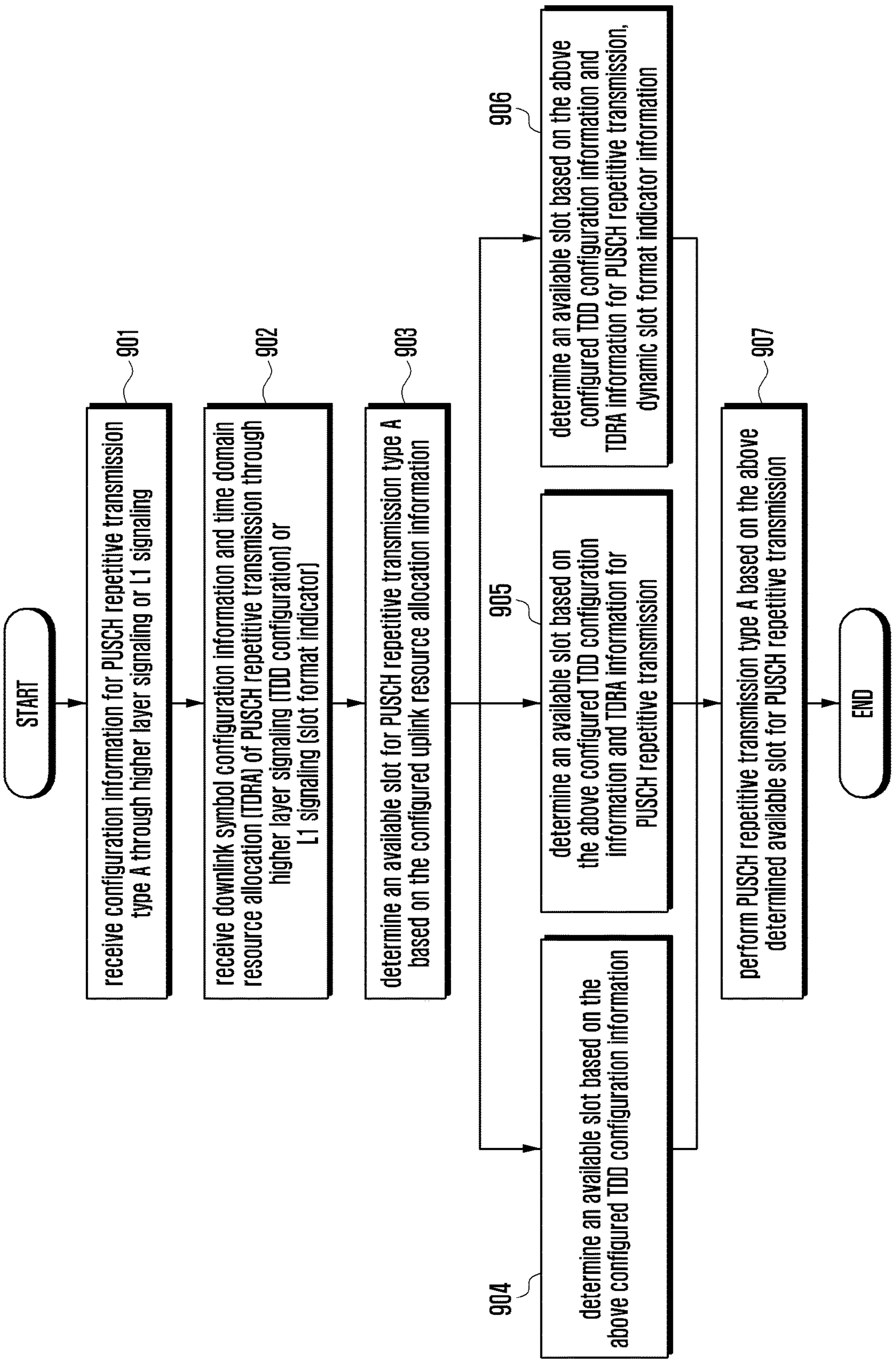
FIG. 9A is a flowchart illustrating an operation of a terminal for PUSCH repetitive transmission type A in a 5G system.
Figure 9B:
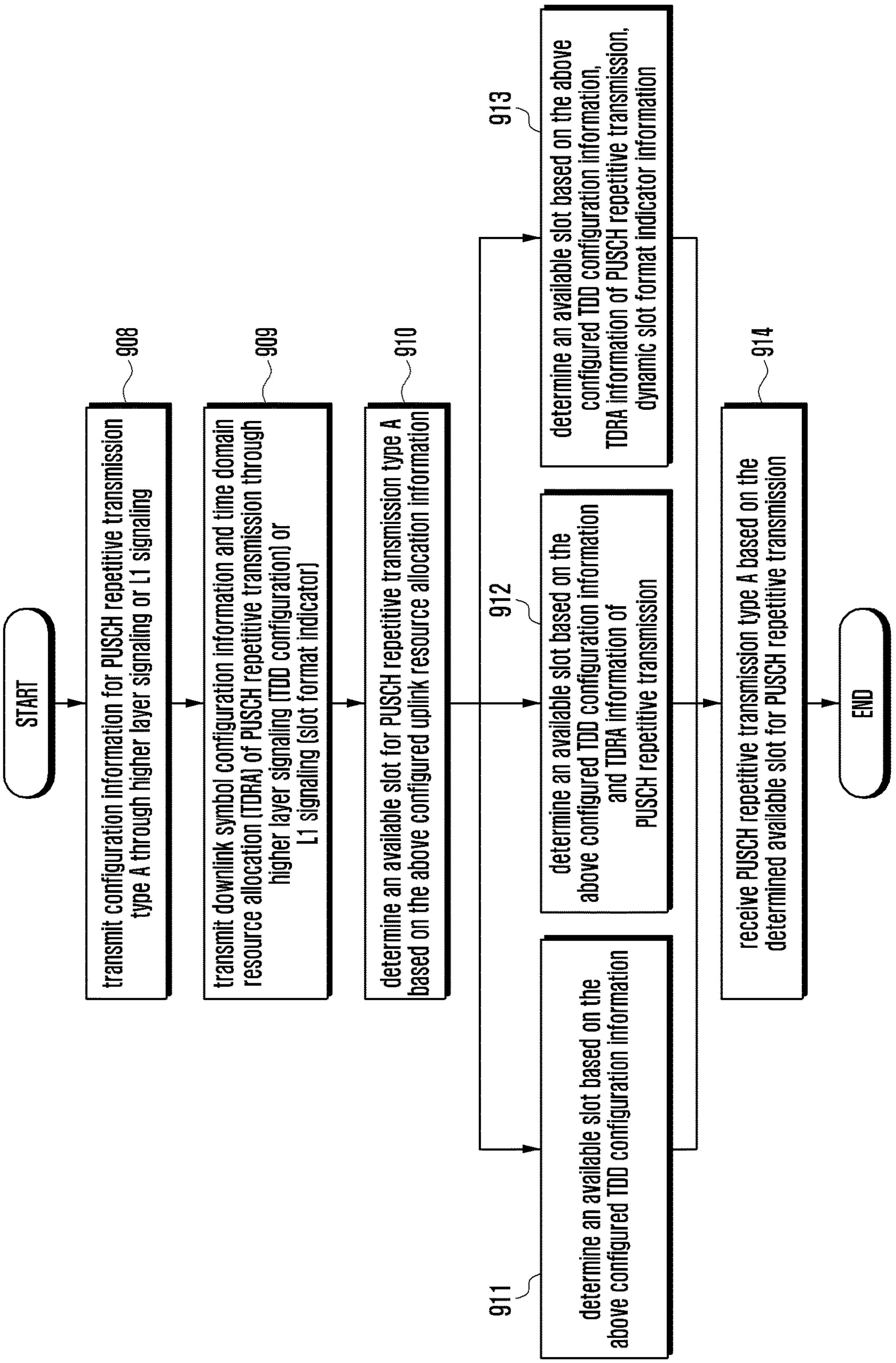
FIG. 9B is a flowchart illustrating an operation of a base station for PUSCH repetitive transmission type A in a 5G system.

FIGS. 9A and 9B are flowcharts illustrating operations of a terminal and base station for PUSCH repetitive transmission type A in a 5G system.

In FIG. 9A, an operation of a terminal for PUSCH repetitive transmission type A is described. The terminal may receive, from a base station, configuration information for PUSCH repetitive transmission type A through higher layer signaling or L1 signaling (901). In addition, the terminal may receive downlink symbol configuration information and time domain resource allocation (TDRA) of PUSCH repetitive transmission through higher layer signaling (TDD configuration; tdd-UL-DL-ConfigurationCommon or tdd-UL-DL-ConfigurationDedicated) or L1 signaling (sloformat indicator) (902). Thereafter, based on the uplink resource allocation information configured by the base station, the terminal may determine an available slot for PUSCH repetitive transmission type A (903). At this time, the terminal can determine the available slot using any one or a combination of one or more of the three methods 904, 905, and 906. In this case, the terminal may determine the available slot using any one or a combination of one or more of three methods 904, 905, and 906. In the first method, the terminal may determine an available slot only for the slot configured as uplink based on the above configured TDD configuration information (904). In the second method, the terminal may determine an available slot by considering the above configured TDD configuration information and TDRA information for PUSCH transmission, CG-configuration, and activation DCI (905). Lastly, the terminal may determine an available slot based on the above configured TDD configuration information and TDRA information for PUSCH transmission, CG-configuration, activation DCI information, and dynamic slot format indicator (SFI) (906). In this case, the method used to determine an available slot may be predefined/promised between the base station and the terminal, or may be configured and indicated semi-statically or dynamically through signaling between the base station and the terminal. Thereafter, the terminal may perform repetitive transmission type A for the base station through the determined available slot (907).

In FIG. 9B, an operation of the base station to configure PUSCH repetitive transmission type A to the terminal will be described. The base station may transmit, to the terminal, configuration information for PUSCH repetitive transmission type A through higher layer signaling or L1 signaling (908). In addition, the base station may configure and transmit downlink symbol configuration information and time domain resource allocation (TDRA) of PUSCH repetitive transmission through higher layer signaling (TDD configuration; tdd-UL-DL-ConfigurationCommon or tdd-UL-DL-ConfigurationDedicated) or L1 signaling (slot format indicator) (909). Thereafter, the base station may determine an available slot for PUSCH repetitive transmission type A for the terminal based on the above configured uplink resource allocation information (910). In this case, the base station may determine an available slot using any one or a combination of one or more of three methods 911, 912, and 913. In the first method, the base station may determine an available slot only for the slot configured as uplink based on the above configured TDD configuration information (911). In the second method, the base station may determine an available slot by considering the above configured TDD configuration information and TDRA information for PUSCH transmission, CG-configuration, and activation DCI (912). Lastly, the base station may determine an available slot based on the above configured TDD configuration information and TDRA information for PUSCH transmission, CG-configuration, activation DCI information, and dynamic slot format indicator (SFI) (913). In this case, the method used to determine an available slot may be predefined/promised between the base station and the terminal, or may be configured and indicated semi-statically or dynamically through signaling between the base station and the terminal. Thereafter, the base station may receive, from the terminal, repetitive transmission type A through the determined available slot (914). This is merely an example and is not limited to PUSCH transmission and may be applied to PUCCH transmission, PUSCH/PUCCH repetitive transmission, nominal repetition of PUSCH repetition type B, and TBoMS.

The disclosure proposes a method for improving coverage performance of a 5G communication system. More specifically, the disclosure proposes a method for utilizing an additional uplink resource (an unavailable slot) for PUSCH repetitive transmission and multiple PUSCH transmission including one TB in a 5G system, and a configuration method for performing simultaneous channel estimation for multiple PUSCH transmission including different TBs. According to an embodiment of the disclosure, a method for utilizing an additional uplink resource (an unavailable slot) for PUSCH repetitive transmission and multiple PUSCH transmission including one TB and a method for performing simultaneous channel estimation for multiple PUSCH transmission including different TBs may be applied. In this case, uplink coverage can be improved through optimized resource utilization and improved channel estimation performance between multiple PUSCHs.

According to an embodiment of the disclosure, an operating method of a terminal for transmitting a physical uplink shared channel (PUSCH) by determining an available slot for PUSCH repetitive transmission and PUSCH transmission in TB processing over multi-slot (TBoMS) and additionally using an unavailable slot based on PUSCH repetitive transmission and information on PUSCH transmission in TB processing over multi-slot (TBoMS) may include receiving, from a base station, configuration information for PUSCH repetitive transmission and PUSCH transmission in TB processing over multi-slot (TBoMS); determining, from the base station, an available slot for PUSCH repetitive transmission and PUSCH transmission in TB processing over multi-slot (TBoMS) based on an uplink resource configured through higher layer signaling and L1 signaling; determining whether to transmit PUSCH using an uplink resources of an unavailable slot other than the configured available slot; performing, for the base station, PUSCH repetitive transmission and PUSCH transmission in TB processing over multi-slot (TBoMS) using the available slot and the unavailable slot, based on the configured PUSCH repetitive transmission and the information on the PUSCH transmission in TB processing over multi-slot (TBoMS).

According to an embodiment of the disclosure, an operating method of a base station for transmitting a physical uplink shared channel (PUSCH) by determining an available slot for PUSCH repetitive transmission and PUSCH transmission in TB processing over multi-slot (TBoMS) and additionally using an unavailable slot based on PUSCH repetitive transmission and information on PUSCH transmission in TB processing over multi-slot (TBoMS) may include transmitting, to a terminal, configuration information for PUSCH repetitive transmission and PUSCH transmission in TB processing over multi-slot (TBoMS); determining, to the terminal, an available slot for PUSCH repetitive transmission and PUSCH transmission in TB processing over multi-slot (TBoMS) based on an uplink resource configured through higher layer signaling and L1 signaling; determining whether to transmit PUSCH using an uplink resources of an unavailable slot other than the configured available slot; receiving, from the terminal, the transmitted PUSCH repetitive transmission and PUSCH transmission in TB processing over multi-slot (TBoMS), using the available slot and the unavailable slot, based on the configured PUSCH repetitive transmission and the information on the PUSCH transmission in TB processing over multi-slot (TBoMS).

According to an embodiment of the disclosure, an operating method of a terminal for performing simultaneous channel estimation for multiple PUSCH transmissions including different TBs based on transmission information of multiple physical uplink shared channel (PUSCH) including different TBs may include receiving, from a base station, transmission configuration information of multiple PUSCH including different TBs; receiving, from the base station, configuration information for PUSCH transmission with the same PUSCH transmission power and continuous phase to perform simultaneous channel estimation through higher layer signaling and L1 signaling; and transmitting multiple PUSCH including different TBs based on the configured PUSCH transmission power and continuous phase.

According to an embodiment of the disclosure, an operating method of a base station for performing simultaneous channel estimation for multiple PUSCH transmissions including different TBs based on transmission information of multiple physical uplink shared channel (PUSCH) including different TBs may include transmitting, to a terminal, transmission configuration information of multiple PUSCH including different TBs; configuring the terminal with the same PUSCH transmission power and continuous phase to perform simultaneous channel estimation through higher layer signaling and L1 signaling; receiving multiple PUSCH including different TBs transmitted based on the configured PUSCH transmission power and continuous phase; and performing simultaneous channel estimation and decoding on the received multiple PUSCH transmissions including different TBs.

According to the disclosure, a method for utilizing an additional uplink resource (an unavailable slot) for PUSCH repetitive transmission and multiple PUSCH transmission including one TB and a method for performing simultaneous channel estimation for multiple PUSCH transmission including different TB will be explained through embodiments.

In the embodiment, a method for utilizing an additional uplink resource (an unavailable slot) for PUSCH repetitive transmission and multiple PUSCH transmission including one TB in a 5G system and a method for performing simultaneous channel estimation for multiple PUSCH transmission including different TBs are provided. In this case, the embodiment of the disclosure has been described for PUSCH repetitive transmission type A and TBoMS with TDRA such as PUSCH repetitive transmission type A, but this is merely an example and does not limit the scope of the disclosure and may be applied to PUCCH repetitive transmission type B and TBoMS transmission with TDRA such as PUSCH repetitive transmission type B. In addition, the method of the disclosure may be applied to the slot configured with different numbers of PRBs for a resource configured as uplink, based on a start symbol, a symbol length, the number of PRBs, and the number of REs. In addition, in embodiment of the disclosure, the simultaneous channel estimation of multiple PUSCHs including different TBs has been described for a PUSCH transmission method based on simultaneous channel estimation of PUSCH repetitive transmissions of multiple PUSCH repetitive transmission types A/B. However, this is merely an example and does not limit the scope of the disclosure, and the simultaneous channel estimation may be performed in continuous or discontinuous PUSCH transmission, TBoMS-PUSCH transmission, and TBoMS-TBoMS transmission in which consistency of PUSCH transmission power and phase continuity are maintained.

In the embodiment of the disclosure, uplink coverage can be improved by providing the method for utilizing an additional uplink resource (an unavailable slot) for PUSCH repetitive transmission and multiple PUSCH transmission including one TB and the configuration method for performing simultaneous channel estimation for multiple PUSCH transmission including different TBs and by utilization of an optimized uplink resource and improvement of channel estimation performance. Hereinafter, although overall embodiments of the disclosure have been described for PUSCH repetitive transmission and TBoMS transmission as examples, these are merely examples for illustrative purposes only and do not limit the scope of the disclosure and are predefined/configured or the embodiment of the disclosure may be applied to a case of PUSCH/PUCCH/PDSCH/PDCCH/physical sidelink shared channel (PSSCH)/physical sidelink control channel (PSCCH) transmission through signaling between a base station and a terminal. In addition, according to the embodiment of the disclosure, a method for utilizing an additional uplink resource (an unavailable slot) for PUSCH repetitive transmission and multiple PUSCH transmission including one TB and a configuration method for performing simultaneous channel estimation for multiple PUSCH transmission including different TBs may be predefined/configured, or may be configured through signaling between a base station and a terminal. In this case, any value included in the configuration information may be configured as one or a combination of symbol/slot length, continuity of PUSCH transmission and an interval between PUSCH transmissions, the number of PUSCH transmissions, transmission occasion, the total number of REs, the total number of PRBs, and the like.

First Embodiment

The first embodiment of the disclosure provides a method for performing PUSCH repetitive transmission by determining an available slot for PUSCH repetitive transmission type A and additionally utilizing an unavailable slot. In the disclosure, the description is focused on PUSCH, but the method described in the disclosure may also be applied to PDSCH/PSSCH transmission. In addition, the content of the disclosure may also be applied to PUSCH repetitive transmission type B based on nominal repetition/actual repetition.

Figure 10A:
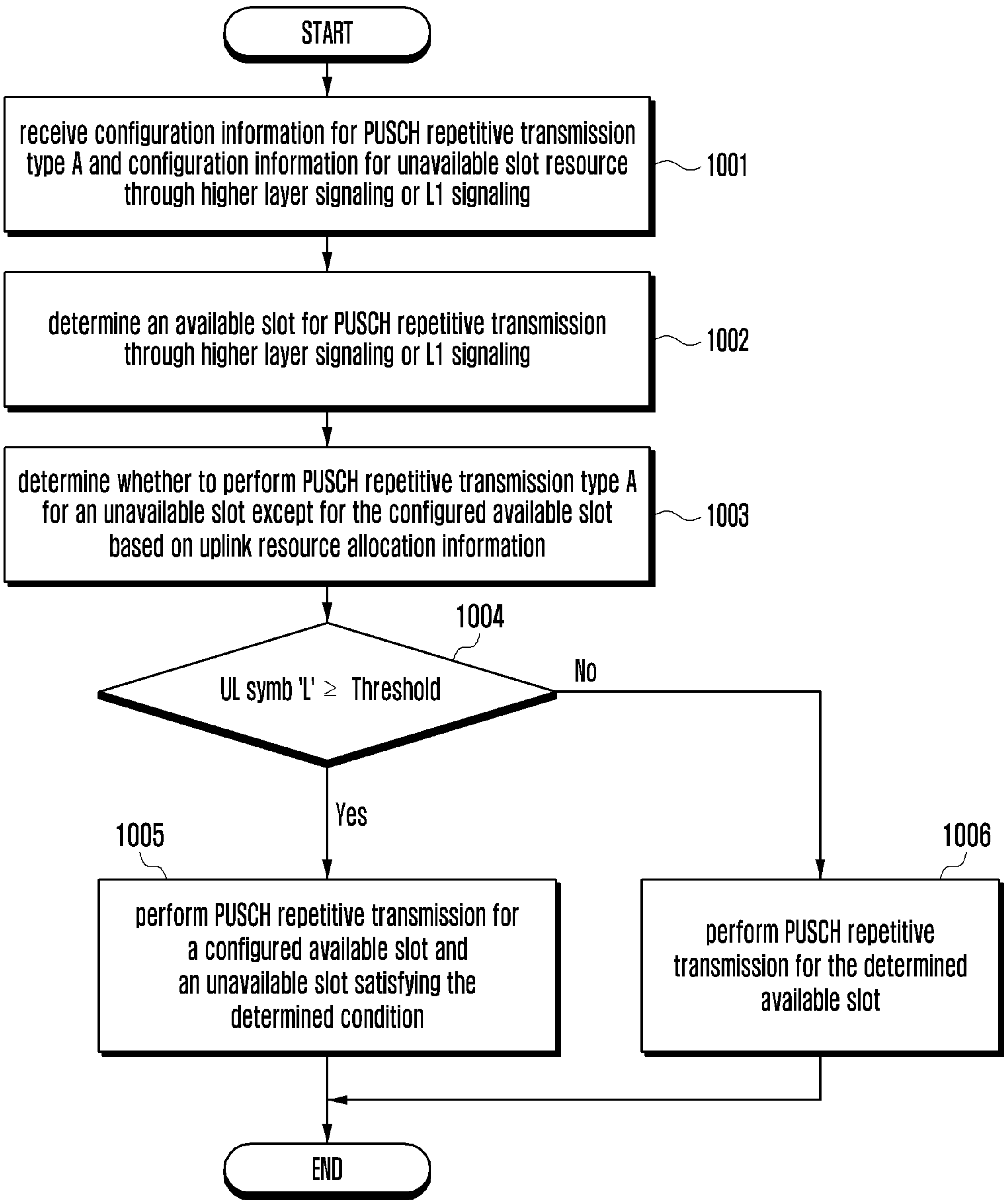
FIG. 10A is a flowchart illustrating an operation of a terminal that determines an available slot for PUSCH repetitive transmission type A and determine an additionally transmittable unavailable slot to perform PUSCH repetitive transmission type A in a 5G system.
Figure 10B:
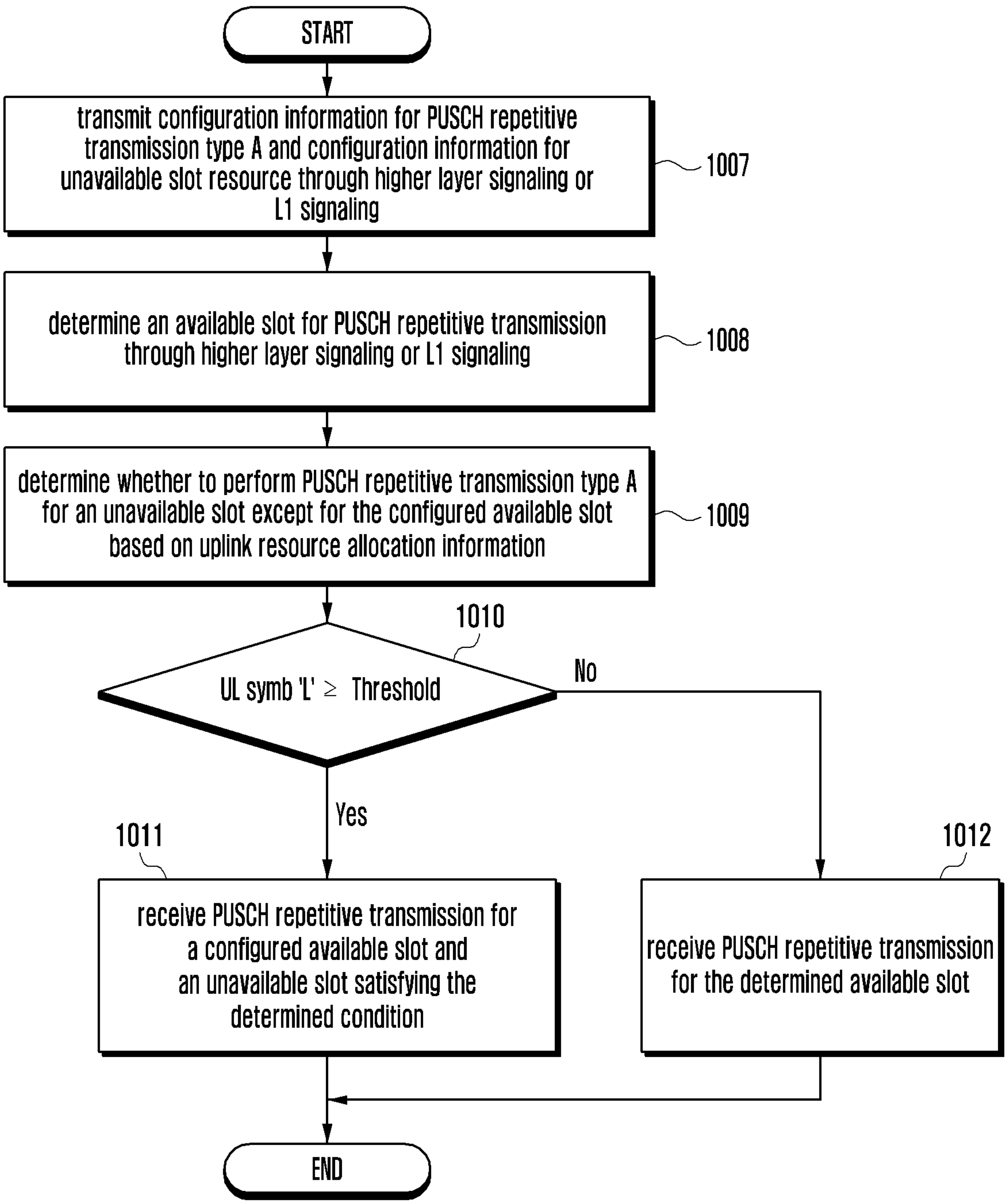
FIG. 10B is a flowchart illustrating an operation of a base station that determines an available slot for PUSCH repetitive transmission type A and determines an additionally transmittable unavailable slot to receive PUSCH repetitive transmission type A in a 5G system.

FIGS. 10A and 10B are flowcharts illustrating operations of a terminal and base station that determine an available slot for PUSCH repetitive transmission type A and determine an additionally transmittable slot among unavailable slots to perform PUSCH repetitive transmission type in a 5G system.

With reference to FIG. 10A, a terminal may receive configuration information for PUSCH repetitive transmission type A and configuration information for determining an additionally transmissible unavailable slot through higher layer signaling or L1 signaling (1001). In this case, the terminal may determine an available slot for the uplink resource configured through higher layer signaling and L1 signaling using the procedure mentioned with respect to FIG. 9A (1002). Thereafter, the terminal may determine an unavailable slot capable of PUSCH repetitive transmission type A based on the resource allocated to an uplink for an unavailable slot excluding the determined available slot (1003). In order to determine whether to perform additional transmission in the determined unavailable slot, the terminal may compare the length 'L' of an uplink symbol inside the unavailable slot with the length 'T' of an arbitrary threshold symbol that can be configured through higher layer signaling and L1 signaling (1004). If the length 'L' of the symbol configured for the uplink of the unavailable slot is greater than the length 'T' of the configured threshold symbol (length 'L' of UL symbol>length 'T' of configured arbitrary threshold symbol), the terminal may determine that PUSCH transmission may be performed for the unavailable slot and may perform PUSCH repetitive transmission for the available slot and the unavailable slot determined to be capable of transmitting PUSCH (1005). Conversely, if the length 'L' of the symbol configured for the uplink of the unavailable slot is less than the length 'T' of the configured arbitrary threshold symbol (length 'L' of UL symbol≤length 'T' of configured threshold symbol), the terminal may determine that PUSCH transmission may not be performed for the unavailable slot and may perform PUSCH repetitive transmission only for the available slot (1006).

With reference to FIG. 10B, a base station may transmit configuration information for PUSCH repetitive transmission type A and configuration information for determining an additionally transmissible unavailable slot through higher layer signaling or L1 signaling (1007). In this case, the base station may determine an available slot for the uplink resource configured through higher layer signaling and L1 signaling using the procedure mentioned with respect to FIG. 9B (1008). Thereafter, the base station may determine an unavailable slot capable of PUSCH repetitive transmission type A based on the resource allocated to an uplink for an unavailable slot excluding the determined available slot (1009). In order to determine whether to perform additional transmission in the determined unavailable slot, the base station may compare the length 'L' of an uplink symbol inside the unavailable slot with the length 'T' of an arbitrary threshold symbol that is configured through higher layer signaling and L1 signaling (1010). If the length 'L' of the symbol configured for the uplink of the unavailable slot is greater than the length 'T' of the above configured arbitrary threshold symbol (length 'L' of UL symbol >length 'T' of configured threshold symbol), the base station may determine that PUSCH transmission may be performed for the unavailable slot and may receive PUSCH repetitive transmission from the terminal (1011). Conversely, if the length 'L' of the symbol configured for the uplink of the unavailable slot is less than the length 'T' of the configured threshold symbol (length 'L' of UL symbol≤length 'T' of configured threshold symbol), the base station may determine that PUSCH transmission may not be performed for the unavailable slot and may receive, from the terminal, PUSCH repetitive transmission only for the available slot (1012).

Figure 11:
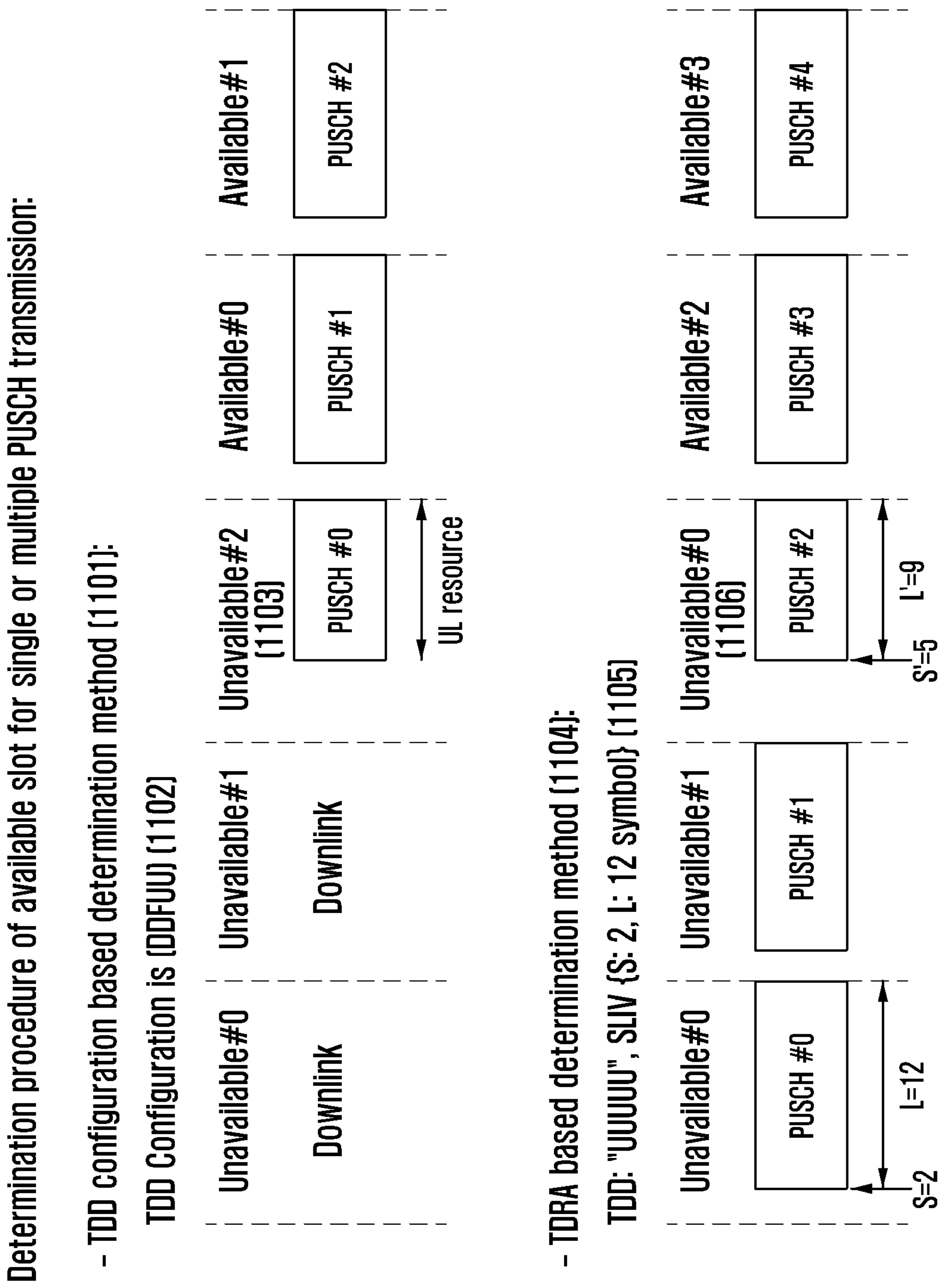
FIG. 11 is a diagram illustrating a PUSCH repetitive transmission method using an unavailable slot in a 5G system.

FIG. 11 is a diagram illustrating a PUSCH repetitive transmission method using an unavailable slot in a 5G system.

FIG. 11 illustrates a method for determining an available slot for PUSCH repetitive transmission and an additionally transmittable unavailable slot when the terminal receives uplink resource configuration information and configuration for PUSCH repetitive transmission type A from the base station through higher layer signaling and L1 signaling. The terminal may receive downlink symbol configuration information and time domain resource allocation (TDRA) information of PUSCH repetitive transmission through higher layer signaling (TDD configuration: tdd-UL-DL-ConfigurationCommon or tdd-UL-DL-ConfigurationDedicated) or L1 signaling (slot format indicator). In addition, the terminal may receive configuration information for PUSCH repetitive transmission type A through higher layer signaling or L1 signaling. Thereafter, the terminal may determine an available slot for PUSCH repetitive transmission Type A based on the uplink resource allocation information configured by the base station. The terminal may determine the available slot and unavailable slot for PUSCH transmission based on the method described with respect to FIGS. 9A and 9B above.

Method 1

Method 1 describes a PUSCH transmission method in an unavailable slot in case where the terminal determines an available slot for PUSCH repetitive transmission type A based only on TDD configuration.

With reference to FIG. 11, when receiving the TDD configuration "DDFUU" (1102) through higher layer signaling, the terminal may determine the slot configured to uplink 'U' as an available slot based on the TDD configuration (1101). Herein, in the case of 'F' indicating a flexible slot, it may be determined as an available slot or unavailable slot in a predefined way through higher layer signaling and L1 signaling (1103). Herein, in case where the terminal determines only 'U' of the TDD configuration configured through higher layer signaling as an available slot, the terminal may determine whether to perform additional transmission for the unavailable slot including an uplink symbol. When the terminal receives the length 'T' of an arbitrary threshold symbol through higher layer signaling and L1 signaling to determine whether to perform transmission in an unavailable slot, the terminal may determine whether to perform the additional transmission in an unavailable slot by comparing the lengths of the threshold and number of uplink symbols in the unavailable slot. For example, if the length 'L' of the uplink symbol of unavailable slot #2 (1103) is greater than the length 'T' of the above configured arbitrary threshold symbol, the terminal may perform PUSCH repetitive transmission in unavailable slot #2 (1103).

Method 2

Method 2 describes a PUSCH transmission method in an unavailable slot in case where the terminal determines an available slot for PUSCH repetitive transmission type A based on TDD configuration and TDRA.

With reference to FIG. 11, in case where the TDD configuration is configured to "UUUUU" through higher layer signaling and TDRA is configured to SLIV: {start symbol 'S': 2, length 'L' of symbol: 12 symbol} (1105) through L1 signaling, the terminal may determine the slot satisfying the configured TDD configuration 'U' and SLIV of TDRA as an available slot (1104). In this case, a slot that does not satisfy the SLIV configured as TDRA may be determined as an unavailable slot (1106). Thereafter, the terminal may determine whether to perform additional transmission for the unavailable slot including an uplink symbol. When receiving the length 'T=8' of an arbitrary threshold symbol through higher layer signaling and L1 signaling to determine whether to perform transmission of the unavailable slot, the terminal may determine whether to perform transmission by comparing the lengths of threshold and number of uplink symbols in the unavailable slot. In the illustration of FIG. 11, the unavailable slot (1106) in which the uplink symbol has the length of 'L'=9' was determined as an unavailable slot because it did not satisfy the symbol length 'L=12' of the SLIV configured as TDRA, but the terminal may perform PUSCH repetitive transmission additionally through uplink resource of the unavailable slot because the unavailable slot is greater than the length 'T=8' of the configured threshold symbol.

In the case of unavailable slot transmission through Method 1 and Method 2, the unavailable slot may be considered as an available slot before initial PUSCH repetitive transmission and may be counted as the number of repetitive transmissions as in the available slot. On the other hand, in the case of unavailable slot transmission, for simple uplink resource utilization, PUSCH repetitive transmission is performed by applying only rate matching, and the number of repetitive transmissions may not be counted.

Based on Method 1 and Method 2 of the above embodiment, the terminal may determine an available slot for PUSCH repetitive transmission type A and additionally perform PUSCH repetitive transmission using an unavailable slot, thereby making efficient and optimized resource utilization. Through this, energy gain can be obtained to improve uplink coverage.

Second Embodiment

The second embodiment of the disclosure provides a method for performing TBoMS transmission by determining an available slot for TBoMS transmission and additionally utilizing an unavailable slot.

Figure 12:
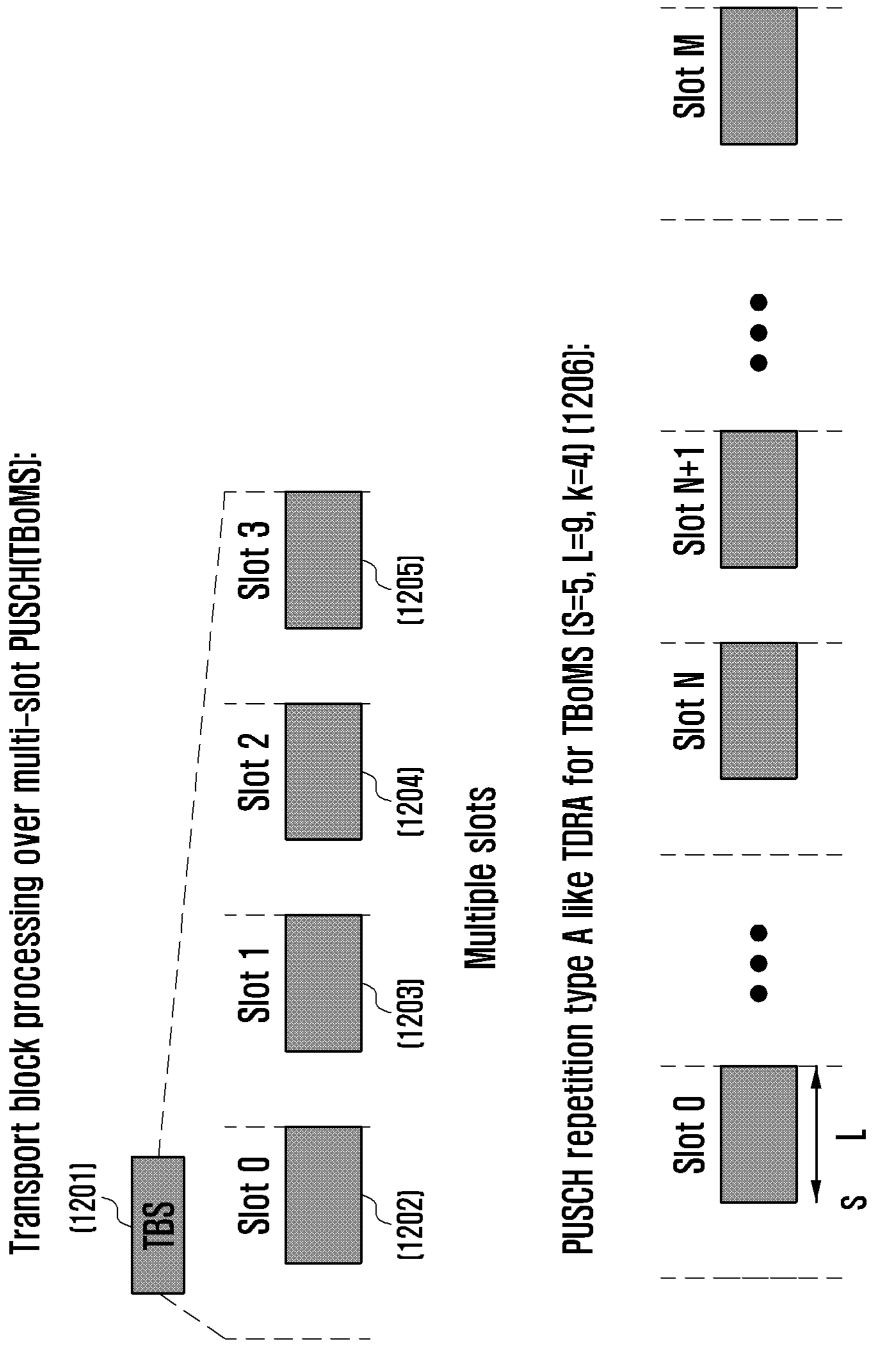
FIG. 12 is a diagram illustrating TB processing over multi-slot (TBoMS) PUSCH transmission in a 5G system.

FIG. 12 is a diagram illustrating TB processing over multi-slot (TBoMS) PUSCH transmission in a 5G system. In TBoMS PUSCH transmission, one TB 1201 may be allocated to multiple slots 1202, 1203, 1204, and 1205 to be transmitted. In this case, instead of allocating multiple small TBs to the resources of multiple slots 1202, 1203, 1204, 1205, allocating one TB may reduce a ratio of CRC, obtain a low code rate, obtain a channel coding gain, and improve channel coverage. Also, with reference to FIG. 12, a method (1206) for allocating a time domain resource like PUSCH repetitive transmission type A may be applied as a time domain resource allocation method for TBoMS PUSCH transmission. In case where a resource is allocated to PUSCH for TBoMS, such as PUSCH repetitive transmission type A, the PUSCH may be transmitted in multiple slots with the same symbol resource for each slot. In this case, the terminal and the base station may determine multiple slots with the same symbol resource as an available slot.

Figure 13A:
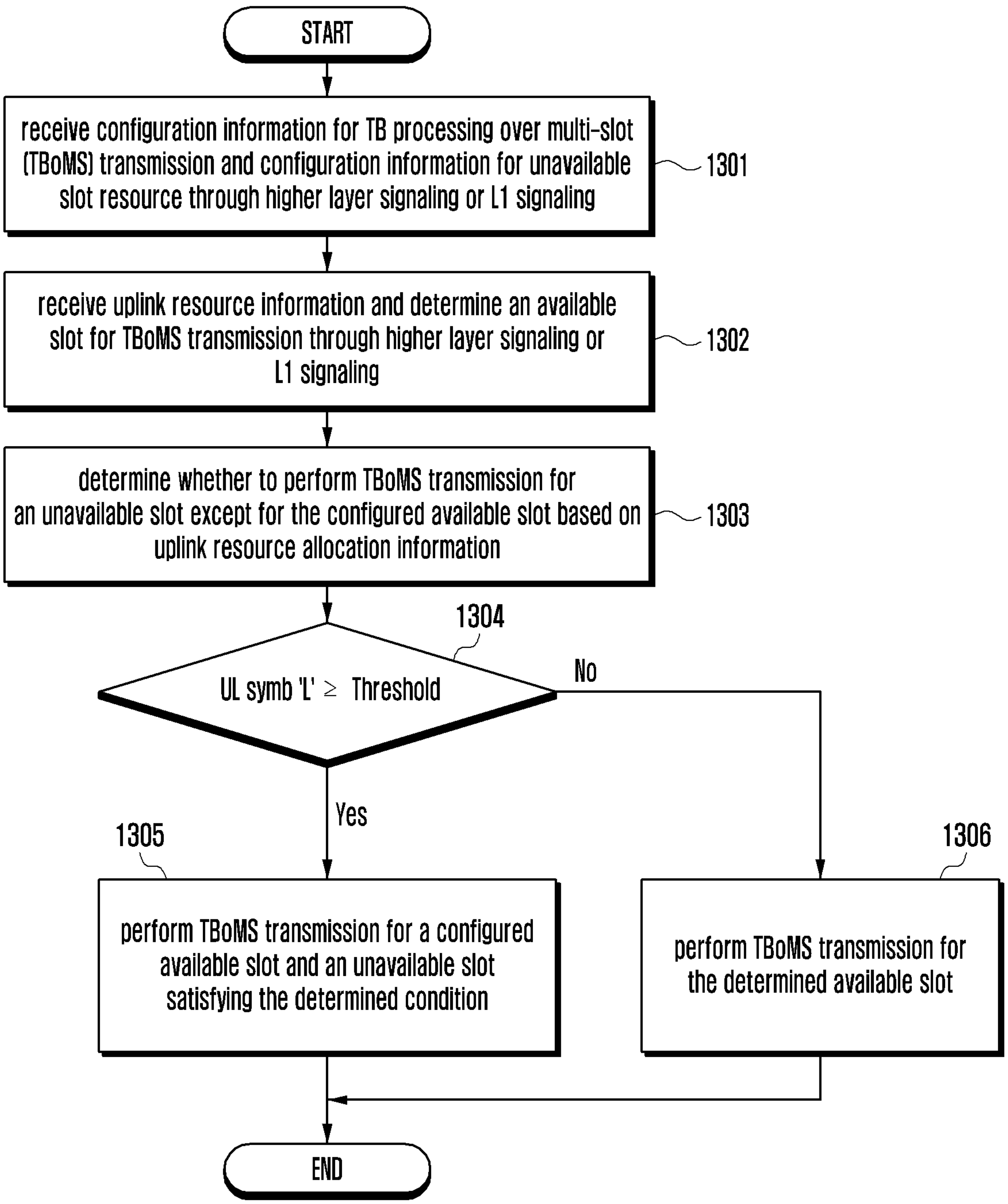
FIG. 13A is a flowchart illustrating an operation of a terminal that determines an available slot for TBoMS transmission and determine an additionally transmittable unavailable slot to perform TBoMS transmission in a 5G system.
Figure 13B:
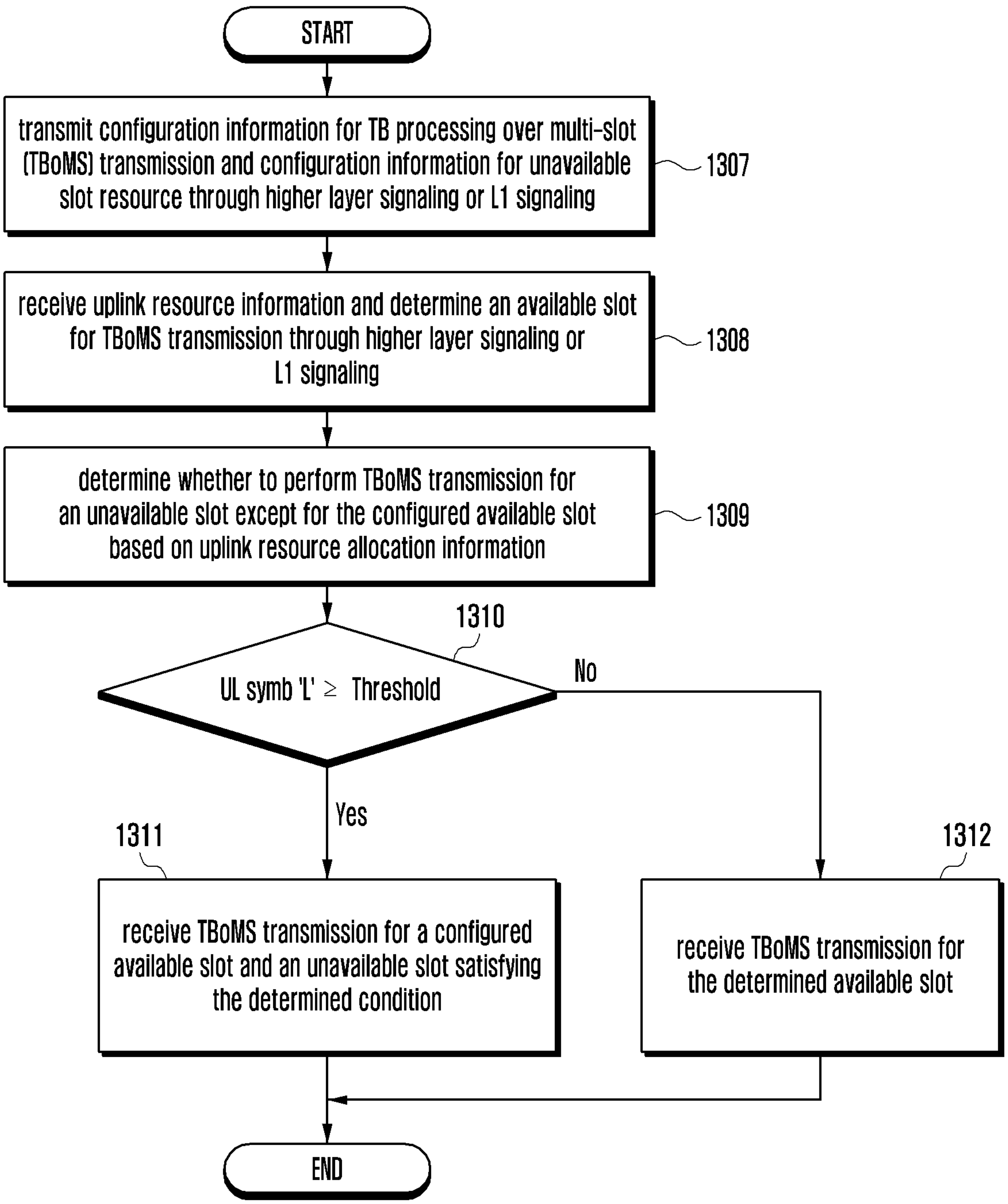
FIG. 13B is a flowchart illustrating an operation of a base station that determines an available slot for TBoMS transmission and determines an additionally transmittable unavailable slot to receive TBoMS transmission in a 5G system.

FIGS. 13A and 13B are flowcharts illustrating operations of a terminal and base station that determine an available slot for TBoMS transmission and determine an additionally transmittable slot among unavailable slots to perform TBoMS in a 5G system.

With reference to FIG. 13A, a terminal may receive, from a base station, configuration information for TB processing over multi-slot(TBoMS) transmission and configuration information for determining an additionally transmissible unavailable slot through higher layer signaling or L1 signaling (1301). In this case, the terminal may determine an available slot for the uplink resource configured through higher layer signaling and L1 signaling using the procedure mentioned with respect to FIG. 9A (1302). The terminal may determine TBS based on the determined available slot. Thereafter, the terminal may determine an unavailable slot capable of TBoMS transmission based on the resource allocated to an uplink for an unavailable slot excluding the determined available slot (1303). In order to determine whether to perform additional transmission in the determined unavailable slot, the terminal may compare the length 'L' of an uplink symbol inside the unavailable slot with the length 'T' of an arbitrary threshold symbol configured through higher layer signaling and L1 signaling (1304). If the length 'L' of the symbol configured for the uplink of the unavailable slot is greater than the length 'T' of the configured arbitrary threshold symbol (length 'L' of UL symbol>length 'T' of configured arbitrary threshold symbol), the terminal may determine that PUSCH transmission may be performed for the unavailable slot and may perform TBoMS transmission for the available slot and the unavailable slot determined to be capable of transmitting PUSCH (1305). Conversely, if the length 'L' of the symbol configured for the uplink of the unavailable slot is less than the length 'T' of the configured arbitrary threshold symbol (length 'L' of UL symbol≤length 'T' of configured threshold symbol), the terminal may determine that PUSCH transmission may not be performed for the unavailable slot and may perform TBoMS transmission only for the available slot (1306).

With reference to FIG. 13B, a base station may transmit configuration information for TBoMS transmission and configuration information for determining an additionally transmissible unavailable slot through higher layer signaling or L1 signaling (1307). In this case, the base station may determine an available slot for the uplink resource configured through higher layer signaling and L1 signaling using the procedure mentioned with respect to FIG. 9B (1308). The base station may determine TBS based on the above configured available slot. Thereafter, the base station may determine an unavailable slot capable of TBoMS transmission based on the resource allocated to an uplink for an unavailable slot excluding the determined available slot (1309). In order to determine whether to perform additional transmission in the determined unavailable slot, the base station may compare the length 'L' of an uplink symbol inside the unavailable slot with the length 'T' of an arbitrary threshold symbol configured through higher layer signaling and L1 signaling (1310). If the length 'L' of the symbol configured for the uplink of the unavailable slot is greater than the length 'T' of the above configured arbitrary threshold symbol (length 'L' of UL symbol≥length 'T' of configured threshold symbol), the base station may determine that PUSCH transmission may be performed for the unavailable slot and may receive TBoMS transmission in the available slot and the unavailable slot determined to be capable of PUSCH transmission (1311). Conversely, if the length 'L' of the symbol configured for the uplink of the unavailable slot is less than the length 'T' of the above configured threshold symbol (length 'L' of UL symbol≤length 'T' of configured threshold symbol), the base station may determine that PUSCH transmission may not be performed for the unavailable slot and may receive TBoMS only for the available slot (1312).

Figure 14:
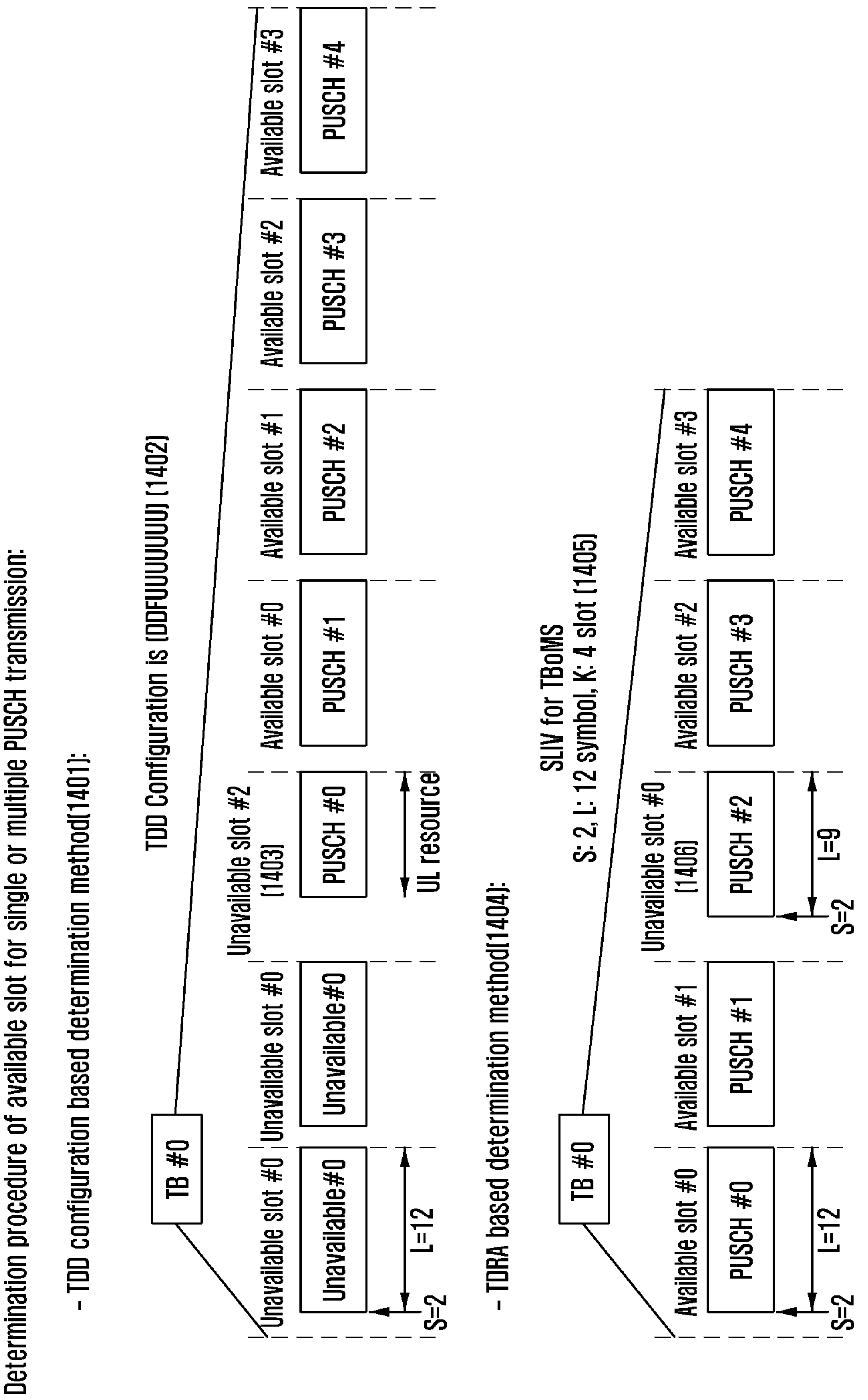
FIG. 14 is a diagram illustrating a TBoMS transmission method using an unavailable slot in a 5G system.

FIG. 14 is a diagram illustrating a TBoMS transmission method using an unavailable slot in a 5G system.

FIG. 14 illustrates a method for determining an available slot for TBoMS and an additionally transmittable unavailable slot when the terminal receives uplink resource configuration information and configuration for PUSCH transmission in TB processing over multi-slot (TBoMS) from the base station through higher layer signaling and L1 signaling. The terminal may receive downlink symbol configuration information and time domain resource allocation (TDRA)

information of PUSCH repetitive transmission through higher layer signaling (TDD configuration: tdd-UL-DL-ConfigurationCommon or tdd-UL-DL-ConfigurationDedicated) or L1 signaling (slot format indicator). In addition, the terminal may receive configuration information for TBoMS transmission through higher layer signaling or L1 signaling. Thereafter, the terminal may determine an available slot for TBoMS transmission based on the uplink resource allocation information configured by the base station. The terminal may determine the available slot and unavailable slot for PUSCH transmission based on the method described with respect to FIGS. 9A and 9B above.

Method 1

Method 1 describes a PUSCH transmission method in an unavailable slot in case where the terminal determines an available slot for TBoMS transmission based only on TDD configuration.

With reference to FIG. 14, in case where the terminal receives the configuration of ‘4 slot’ as the number of PUSCH transmissions in multi-slot for TBoMS transmission and the TDD configuration “DDFUUUUUUU” (1402) through higher layer signaling, the terminal may determine the slot configured to uplink ‘U’ as available slot #0 to #3 based on the TDD configuration (1401). Herein, in the case of ‘F’ indicating a flexible slot, it may be determined as an available slot or unavailable slot in a predefined way through higher layer signaling and L1 signaling (1403). Herein, in case where the terminal determines only ‘U’ of the TDD configuration configured through higher layer signaling as an available slot, the terminal may determine whether to perform additional transmission for the unavailable slot including an uplink symbol. When the terminal receives the length ‘T’ of an arbitrary threshold symbol through higher layer signaling or L1 signaling to determine whether to perform transmission in an unavailable slot, the terminal may determine whether to perform the additional transmission in an unavailable slot by comparing the lengths of the threshold and number of uplink symbols in the unavailable slot. For example, in case of unavailable slot #2 (1403), in case where the length of the uplink symbol resource is greater than or equal to the length ‘T’ of the above configured arbitrary threshold symbol, the PUSCH for TBoMS may be transmitted in unavailable slot #2 (1403).

Method 2

Method 2 describes a TBoMS transmission method in an unavailable slot in case where the terminal determines an available slot for TBoMS transmission based on TDD configuration and TDRA.

With reference to FIG. 14, if the terminal receives a configuration of ‘K=4 slot’ as the number of PUSCH transmissions in multi-slot for TBoMS through higher layer signaling and L1 signaling, and receive the TDD configuration “UUUUU”, SLIV: {start symbol ‘S’: 2, length ‘L’ of symbol: 12 symbol} (1405) as TDRA, the terminal may determine the slot satisfying the configured TDD configuration ‘U’ and SLIV of TDRA as an available slot (1404). In this case, a slot that does not satisfy the SLIV configured as TDRA may be determined as an unavailable slot (1406). Thereafter, the terminal may determine whether to perform additional transmission for the unavailable slot including an uplink symbol. When receiving the length ‘T=8’ of an arbitrary threshold symbol through higher layer signaling and L1 signaling to determine whether to perform transmission of the unavailable slot, the terminal may determine whether to perform transmission of TBoMS PUSCH by comparing the lengths of threshold and number of uplink symbols in the unavailable slot. In the illustration of FIG. 14, the unavailable slot #0 (1406) in which the uplink symbol has the length of ‘L’=9' was determined as an unavailable slot because it did not satisfy the symbol length ‘L=12’ of the SLIV configured as TDRA, but the terminal may perform TBoMS transmission additionally through uplink resource of the unavailable slot because the unavailable slot is greater than the length ‘T=8’ of the configured threshold symbol.

In the case of unavailable slot transmission through Method 1 and Method 2 above, the unavailable slot may be considered as an available slot before initial PUSCH repetitive transmission and may be counted as the number of multiple PUSCH transmissions of TBoMS as in the available slot. On the other hand, in the case of unavailable slot transmission, for simple uplink resource utilization, TBoMS PUSCH transmission is performed by applying only rate matching, and the number of multiple PUSCH transmissions of TBoMS may not be counted.

Based on Method 1 and Method 2 of the above embodiment, the terminal may determine an available slot for TBoMS transmission and additionally perform PUSCH repetitive transmission using an unavailable slot, thereby making efficient and optimized resource utilization. Through this, energy gain can be obtained to improve uplink coverage.

Third Embodiment

The third embodiment of the disclosure provides a configuration method for performing simultaneous channel estimation for PUSCH transmission transmitting different TBs.

As described above, in order to perform simultaneous channel estimation, transmission power consistency and phase continuity should be maintained. In order to maintain transmission power consistency and phase continuity, the same precoder, the same transmission power configuration, the same RB configuration, and the same MCS configuration are required, and DL transmission, reception, and monitoring should not occur between PUSCH/PUCCH where simultaneous channel estimation is performed. Accordingly, through the configuration satisfying the above condition, simultaneous channel estimation using DMRS of multiple PUSCHs may be performed when transmission power consistency and phase continuity are maintained. Therefore, the terminal may maintain power consistency and phase continuity of each PUSCH transmission transmitting different TBs based on higher layer signaling and L1 signaling.

In this case, in order to control the PUSCH transmission power due to different MCS configurations, in case where the terminal is configured to perform simultaneous channel estimation through higher layer signaling and L1 signaling, for $$\Delta_{TF,b,f,c}(i) = 10\log_{10}\left(\left(2^{BPRE\cdot K_s} - 1\right)\cdot \beta_{offset}^{PUSCH}\right), \text{ in } \Delta_{TF,b,f,c}(i),$$

the power may be fixed to ‘0’, through which changes in transmission power due to MCS may be ignored.

Figure 15:
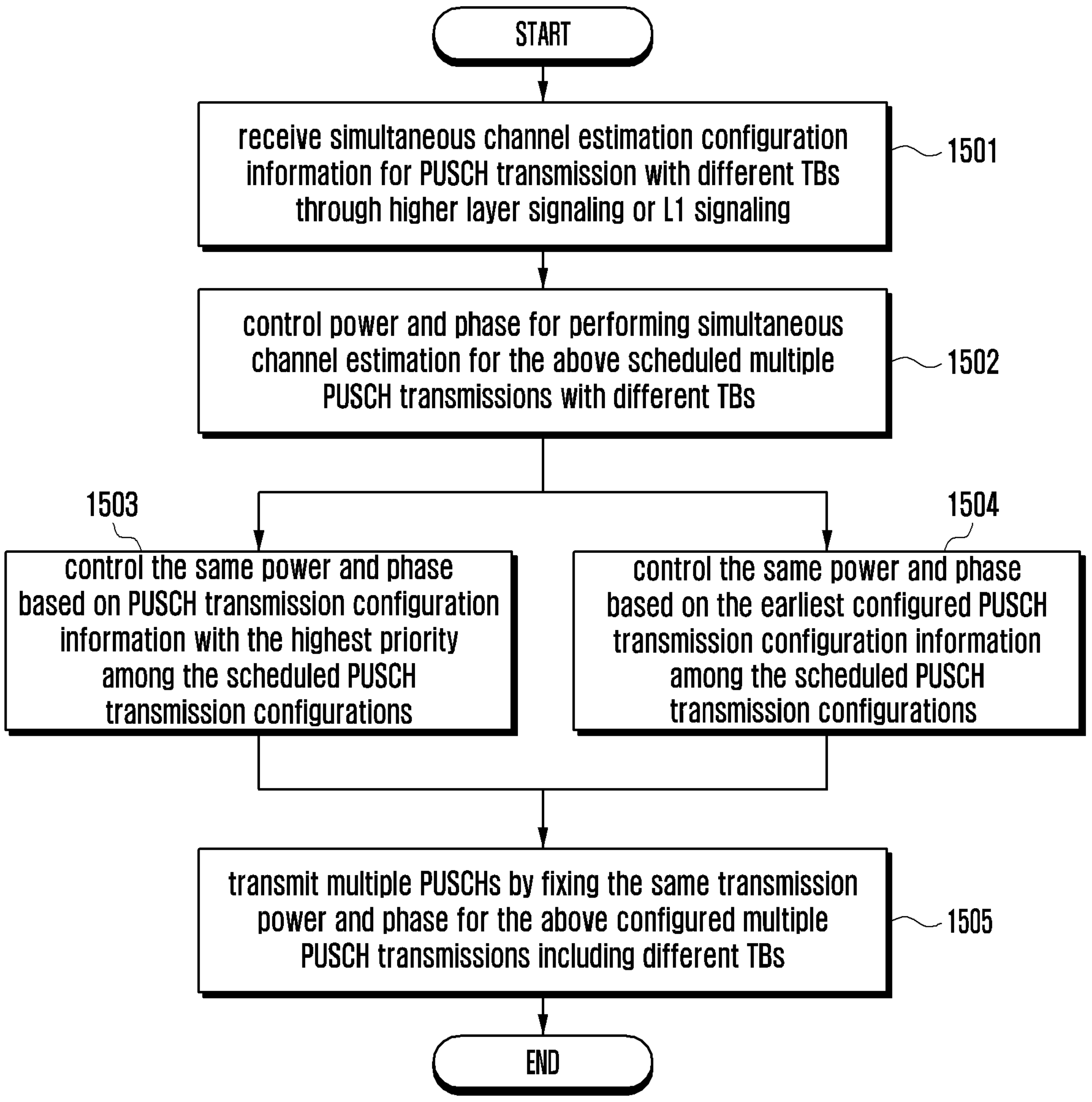
FIG. 15 is a flowchart illustrating an operation of a terminal that performs simultaneous channel estimation for multiple PUSCHs transmitting different TBs in a 5G system.

FIG. 15 is a flowchart illustrating an operation of a terminal that performs simultaneous channel estimation for multiple PUSCHs transmitting different TBs in a 5G system.

With reference to FIG. 15, the terminal may receive configuration information for PUSCH transmission with different TBs and configuration information for performing simultaneous channel estimation through higher layer signaling and L1 signaling (1501). The terminal may control the transmission power and phase of different PUSCHs in order to perform simultaneous channel estimation for the multiple PUSCH transmissions with different TBs configured above (1502). In this case, the terminal may control power and phase according to any one or a combination of one or more of the two methods (1503 and 1504) below. In the first method, the terminal may be configured and indicated for multiple PUSCHs to perform simultaneous channel estimation, based on the MCS, number of RBs, precoder, and transmission power configuration information of the PUSCH configured to the highest priority, among the above configured multiple PUSCHs transmitting different TBs (1503). In the second method, the terminal may be configured and indicated for multiple PUSCHs to perform simultaneous channel estimation, based on the MCS, number of RBs, precoder, and transmission power configuration information of the earliest configured PUSCH, among the above configured multiple PUSCHs transmitting different TBs (1504). Thereafter, the terminal may transmit multiple PUSCHs including different TBs to perform simultaneous channel estimation based on the above configured information (1505).

Figure 16:
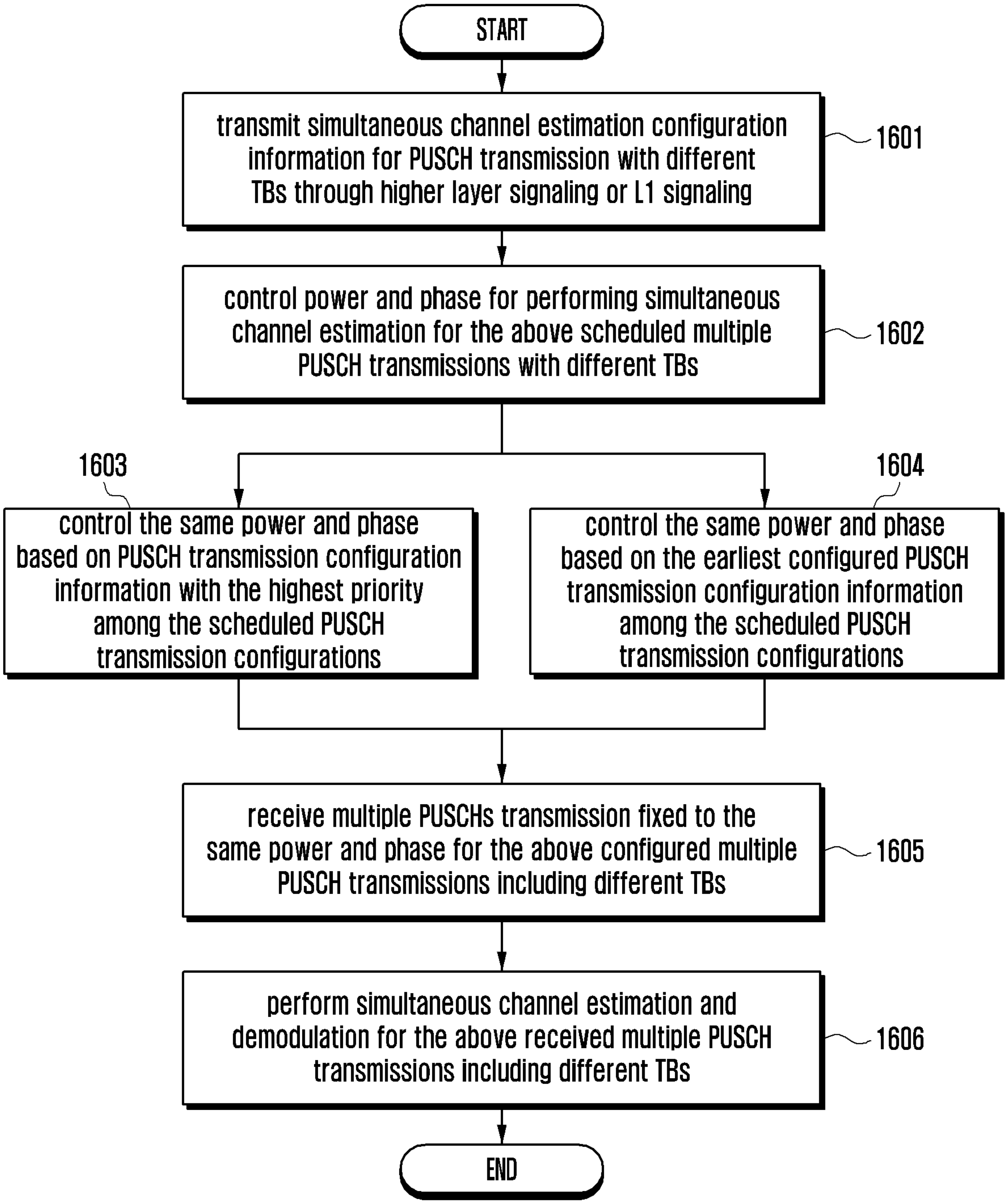
FIG. 16 is a flowchart illustrating an operation of a base station that performs simultaneous channel estimation for multiple PUSCHs transmitting different TBs in a 5G system.

FIG. 16 is a flowchart illustrating an operation of a base station that performs simultaneous channel estimation for multiple PUSCHs transmitting different TBs in a 5G system.

With reference to FIG. 16, the base station may transmit, to the terminal, configuration information for PUSCH transmission with different TBs and configuration information for performing simultaneous channel estimation through higher layer signaling and L1 signaling (1601). The base station may configure and control the transmission power and phase of different PUSCHs in order to perform simultaneous channel estimation for the multiple PUSCH transmissions with different TBs configured above (1602). In this case, the base station may configure and control power and phase according to any one or a combination of one or more of the two methods (1603 and 1604) below. In the first method, the base station may configure and indicate multiple PUSCHs to perform simultaneous channel estimation, based on the MCS, number of RBs, precoder, and transmission power configuration information of the PUSCH configured to the highest priority, among the above configured multiple PUSCHs transmitting different TBs (1603). In the second method, the base station may configure and indicate multiple PUSCHs to perform simultaneous channel estimation, based on the MCS, number of RBs, precoder, and transmission power configuration information of the earliest configured PUSCH, among the above configured multiple PUSCHs transmitting different TBs (1604). Thereafter, the base station may receive, from the terminal, multiple PUSCHs including different TBs to perform simultaneous channel estimation based on the above configured information (1605). Thereafter, the base station may simultaneously estimate and decode channels for the received multiple PUSCHs (1606).

Figure 17:
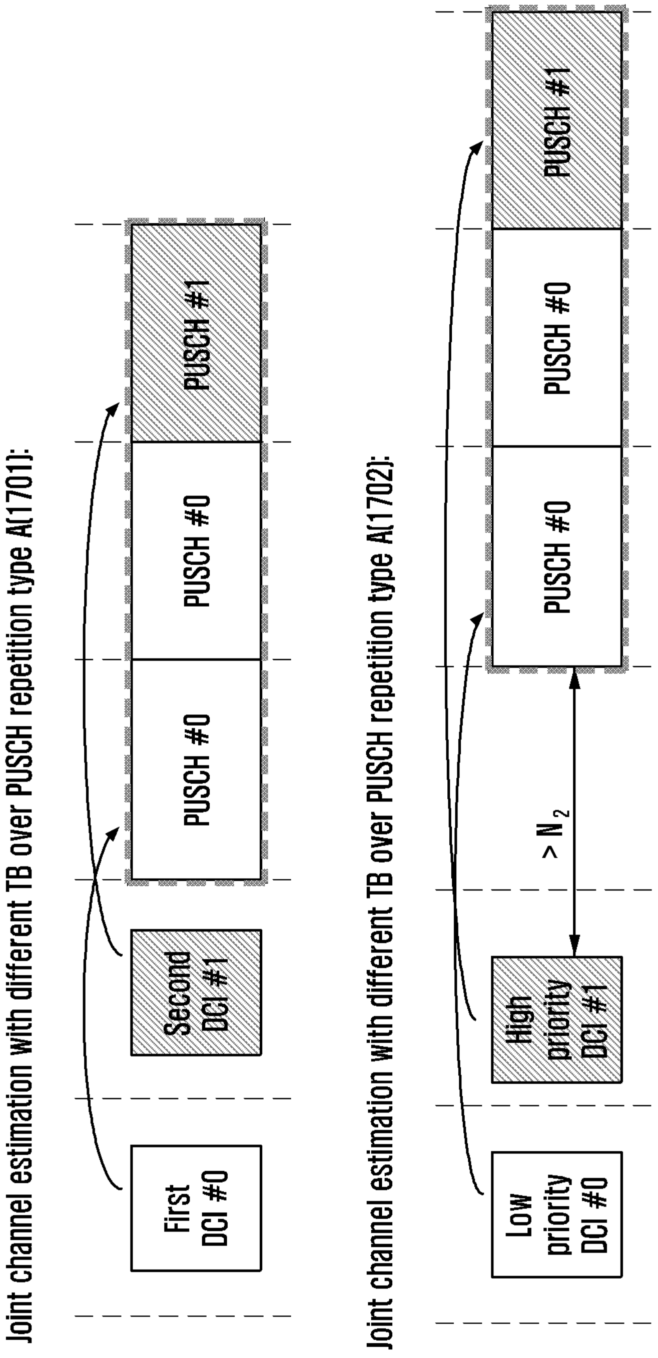
FIG. 17 is a diagram illustrating a simultaneous channel estimation method for PUSCH repetitive transmission including different TBs in a 5G system.

FIG. 17 is a diagram illustrating a simultaneous channel estimation method for PUSCH repetitive transmission including different TBs in a 5G system.

With reference to FIG. 17, the terminal may be configured to perform simultaneous channel estimation for repetitive transmission type A PUSCH #0 and PUSCH #1 transmitting different TBs, which are scheduled to DCI #0 and DCI #1 through higher layer signaling and L1 signaling. In this case, the terminal may control the transmission power consistency and phase continuity for simultaneous channel estimation by applying the same precoder, transmission power configuration, MCS, and RB number configuration of PUSCH #0 to be transmitted using DCI #0, which is received first among DCI #0 and DCI #1, according to higher configuration, to PUSCH #1, and transmitting PUSCH #0 and PUSCH #1 (1701). Alternatively, the terminal may control the transmission power consistency and phase continuity for simultaneous channel estimation by configuring the precoders, transmission power configurations, MCS, and RB number configurations of PUSCH #0 and PUSCH #1 the same using DCI #1 of PUSCH #1, which has high priority among multiple PUSCH transmissions performing simultaneous channel estimation (1702). In this case, the terminal should receive DCI #1, which schedules PUSCH #1 with high priority, through L1 signaling, before the processing time 'N2' required to decode.

The embodiment of the disclosure is for illustrative purposes only and does not limit the scope of the disclosure, and may be applied to PUCCH/TBoMS/TBoMS repetitive transmission, which is predefined/configured, or through signaling between the base station and the terminal. In addition, the maximum period for maintaining transmission power consistency and phase continuity for simultaneous channel estimation may be signaled to the base station through a capability of the terminal. The base station may perform simultaneous channel estimation for two or more multiple PUSCH transmissions within a period in which the signaled terminal can maintain maximum transmission power consistency and phase continuity. Through the method of the disclosure, uplink coverage can be improved through more accurate channel estimation by performing simultaneous channels for multiple PUSCH transmissions transmitting different TBs.

Fourth Embodiment

The fourth embodiment of the disclosure provides a method for determining an available slot for PUSCH transmission in an XDD system and additionally utilizing an unavailable slot to perform PUSCH repetitive transmission or TBoMS transmission.

For a 5G mobile communication service, additional coverage extension technology was introduced compared to an LTE communication service, but the coverage of the 5G mobile communication service may generally use a time division duplex (TDD) system suitable for a service with a high downlink traffic proportion. Also, as a center frequency is increased to increase a frequency band, the coverage of a base station and terminal is reduced, and thus, coverage enhancement is a core requirement of the 5G mobile communication service. In particular, because transmission power of a terminal is generally lower than transmission power of a base station, it is for supporting a service with a high downlink traffic proportion, and a ratio of downlink in a time domain is higher than that of uplink, coverage enhancement of an uplink channel is a core requirement of the 5G mobile communication service. As a method for physically enhancing the coverage of an uplink channel between a base station and a terminal, there may be a method for increasing a time resource of the uplink channel, a method for reducing a center frequency, or a method for increasing transmission power of the terminal. However, changing a frequency may have a limitation because a frequency band is determined for each network operator.

Also, increasing maximum transmission power of the terminal may have a limitation because a maximum value of transmission power of the terminal is determined by a regulation to reduce interference.

Accordingly, for coverage enhancement of the base station and terminal, uplink and downlink resources may be not only divided in a time domain according to traffic proportions of uplink and downlink as in a time division duplex (TDD) system but also divided in a frequency domain as in a frequency division duplex (FDD) system. As such, a system for flexibly dividing uplink and downlink resources in a time domain and a frequency domain may be referred to as a cross division duplex (XDD) system, a flexible TDD system, a hybrid TDD system, a TDD-FDD system, or a hybrid TDD-FDD system, and for convenience of explanation, is described as an XDD system in the disclosure. According to an embodiment, X in XDD may denote a time or a frequency.

Figure 18:
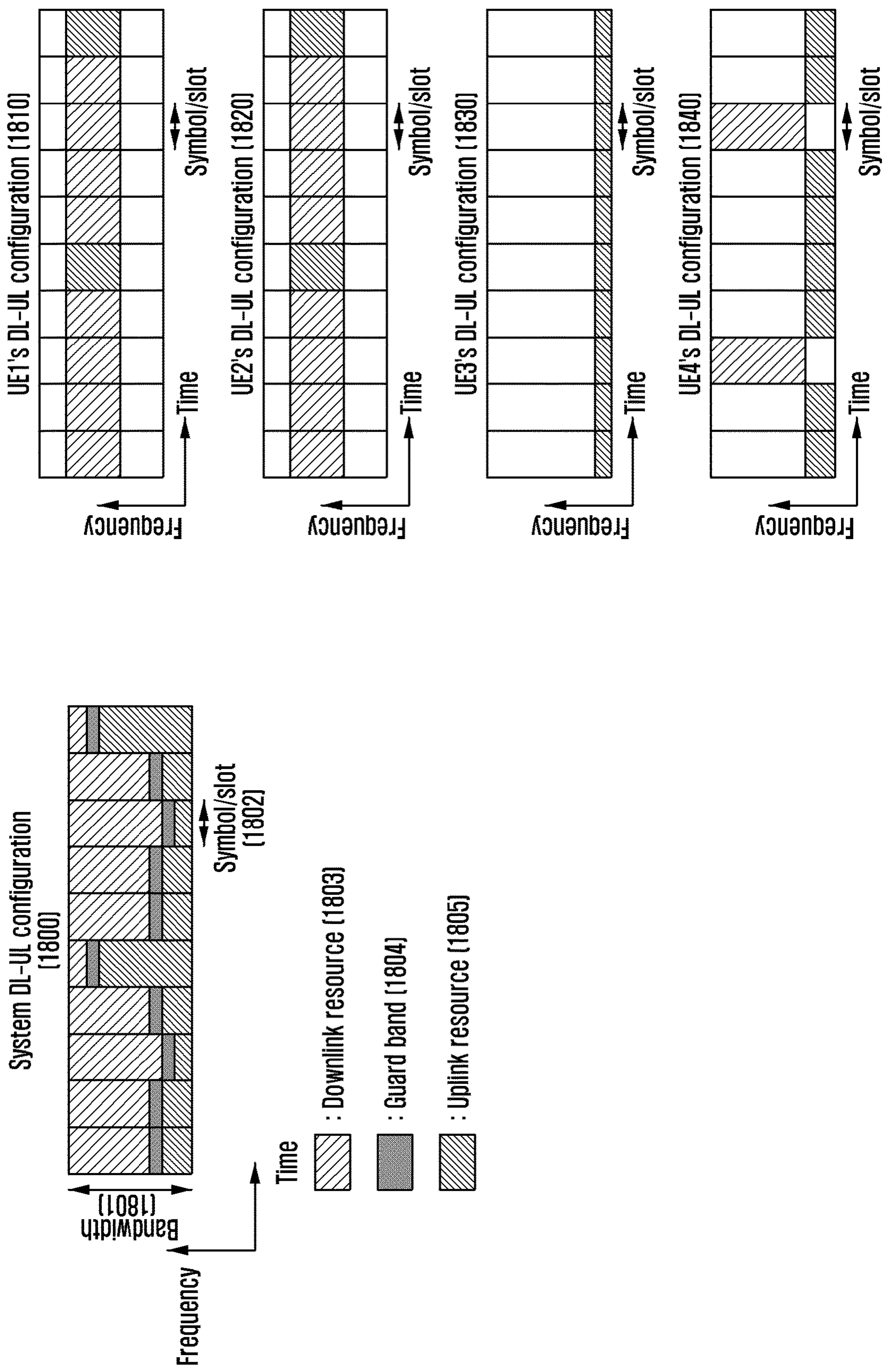
FIG. 18 is a diagram illustrating an UL-DL resource constitution of an XDD system.

FIG. 18 is a diagram illustrating an UL-DL resource constitution of an XDD system in which UL and DL resources are flexibly divided in time and frequency domains, according to an embodiment of the disclosure.

With reference to FIG. 18, from the viewpoint of a base station, in UL-DL constitution 1800 of an entire XDD system, in an entire frequency band 1801, resources may be flexibly allocated for each symbol or slot 1802, according to traffic proportions of UL and DL. In this case, a guard band 1804 may be allocated in a frequency band between a DL resource 1803 and an UL resource 1805. The guard band 1804 may be allocated to reduce interference in UL channel or signal reception due to out-of-band emission occurring when the base station transmits a DL channel or signal in the DL resource 1803. In this case, for example, a terminal 1 1810 and a terminal 2 1820 having more DL traffic than UL traffic may be allocated a DL and UL resource ratio of 4:1 in a time domain by a configuration of the base station. At the same time, a terminal 3 1830 operating at a cell edge and lacking UL coverage may be allocated with only an UL resource in a specific time interval by a configuration of the base station. In addition, a terminal 4 1840 operating at a cell edge and lacking UL coverage but having relatively large DL and UL traffic may be allocated with a lot of UL resources in a time domain and a lot of DL resources in a frequency band for UL coverage. As in the above described example, there are advantages in that more DL resources in a time domain may be allocated to the terminals that operate relatively at the cell center and have large DL traffic, and more UL resources in a time domain may be allocated to the terminals that operate relatively at a cell edge and lack UL coverage.

Figure 19:
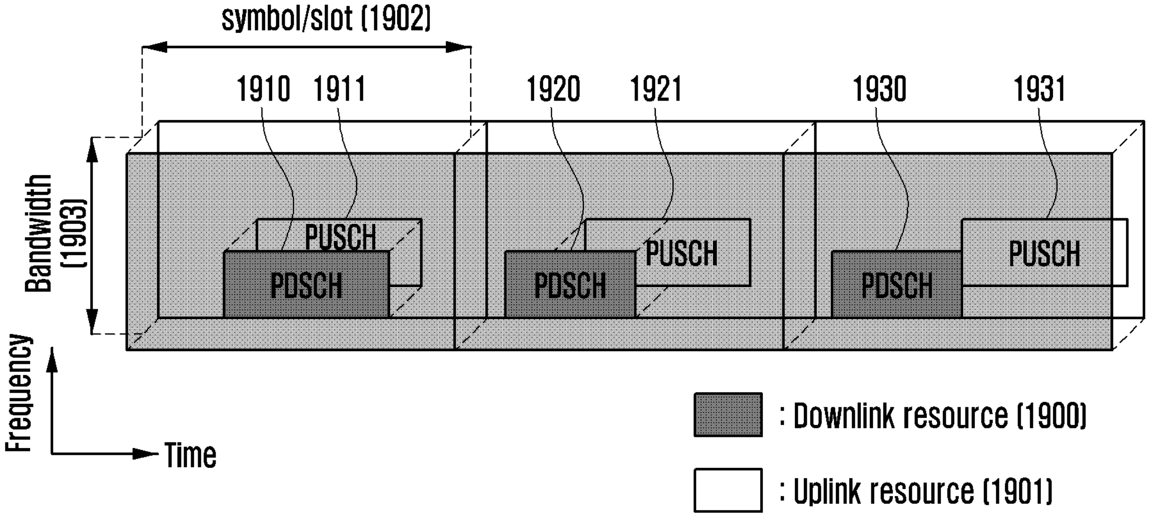
FIG. 19 is a diagram illustrating an UL-DL resource constitution of a full duplex communication system.

FIG. 19 is a diagram illustrating an example of an UL-DL resource constitution of a full duplex communication system in which UL and DL resources are flexibly divided in time and frequency domains, according to an embodiment of the disclosure.

According to an embodiment illustrated in FIG. 19, a DL resource 1900 and an UL resource 1901 may be configured to entirely or partially overlap each other in time and frequency domains. In an example of FIG. 19, a DL resource 1910 and an UL resource 1911 may be configured to entirely overlap each other in a time resource corresponding to a symbol or slot 1902 and a frequency resource corresponding to a bandwidth 1903. Alternatively, a DL resource 1920 and an UL resource 1921 may be configured to partially overlap each other in a time domain, or a DL resource 1930 and an UL resource 1931 may be configured to partially overlap each other in a frequency domain. In a region configured as DL resources 1900, 1910, 1920, 1930, DL transmission from the base station to the terminal may occur, and in a region configured as UL resources 1901, 1911, 1921, 1931, UL transmission from the terminal to the base station may be performed. In this case, because the DL resource 1900, 1910, 1920, 1930 and the UL resource 1901, 1911, 1921, 1931 overlap each other in time and frequency, DL and UL transmission and reception of the base station or terminal may be simultaneously performed in the same time and frequency resource.

In the following, a method and device for configuring a resource for UL or DL transmission and reception in time and frequency domains through cell-specific configuration information in an XDD system will be described. Through the method of resource configuration for UL or DL transmission and reception, a terminal may be configured with a resources in the same time domain but in different frequency domain for UL and DL transmissions and receptions. Accordingly, the time domain resource in which the terminal may perform UL transmission or DL reception may increase, and thus, the UL coverage of the terminal and base station may be enhanced as described above. Hereinafter, for convenience of description, a resource configuration for UL or DL transmission and reception is referred to as a UL-DL configuration.

Specifically, as described above, because the terminal may receive a resource for UL and DL transmission and reception in a divided manner not only in a time domain but also in a frequency domain in an XDD system, a resource configuration for UL or DL transmission and reception is configured not only in the time domain but also in both the time and frequency domains, as in the TDD system. The base station configures a guard band to the terminal as described above when configuring a resource for UL or DL transmission and reception in a time domain and a frequency domain, so that an interference effect due to an out-of-band (OOB) emission caused by a relative closeness between frequency bands of UL and DL resources, compared to FDD, may be controlled. In addition, even when a UL bandwidth part (BWP) has a same center frequency as a DL BWP through resource configuration for UL or DL transmission and reception in the time domain and the frequency domain, the terminal may determine in which frequency band the actual UL or DL is scheduled and can transmit and receive.

Accordingly, the disclosure provides a method for configuring UL or DL resource in the time domain and the frequency domain in the XDD system.

As a method of resource configuration for UL or DL transmission and reception in the time domain and the frequency domain in the XDD system, the following methods may be considered.

Method 1

For the resource configuration for UL or DL transmission or reception in the time domain and the frequency domain, the base station may indicate, to the terminal, a UL and DL configuration in the time domain for each frequency band by dividing the entire frequency band into n frequency bands. Each of the n frequency bands may include a group of consecutive resource blocks, and they may be called a resource block set (RBS) or a resource block group, but for convenience of description, they are herein described as RBS. In each of the frequency bands, the UL-DL configuration information may include UL-DL pattern information and subcarrier information which serves as a reference therefor. In the UL-DL pattern information, a pattern period in the time domain, the number of consecutive DL slots from a starting point of each pattern, the number of DL symbols of a next slot, the number of consecutive UL slots from an end of a pattern, and the number of UL symbols of a next slot may be indicated. In this case, slots and symbols that are not indicated as UL and DL may be determined as flexible slots/symbols.

Figure 20:
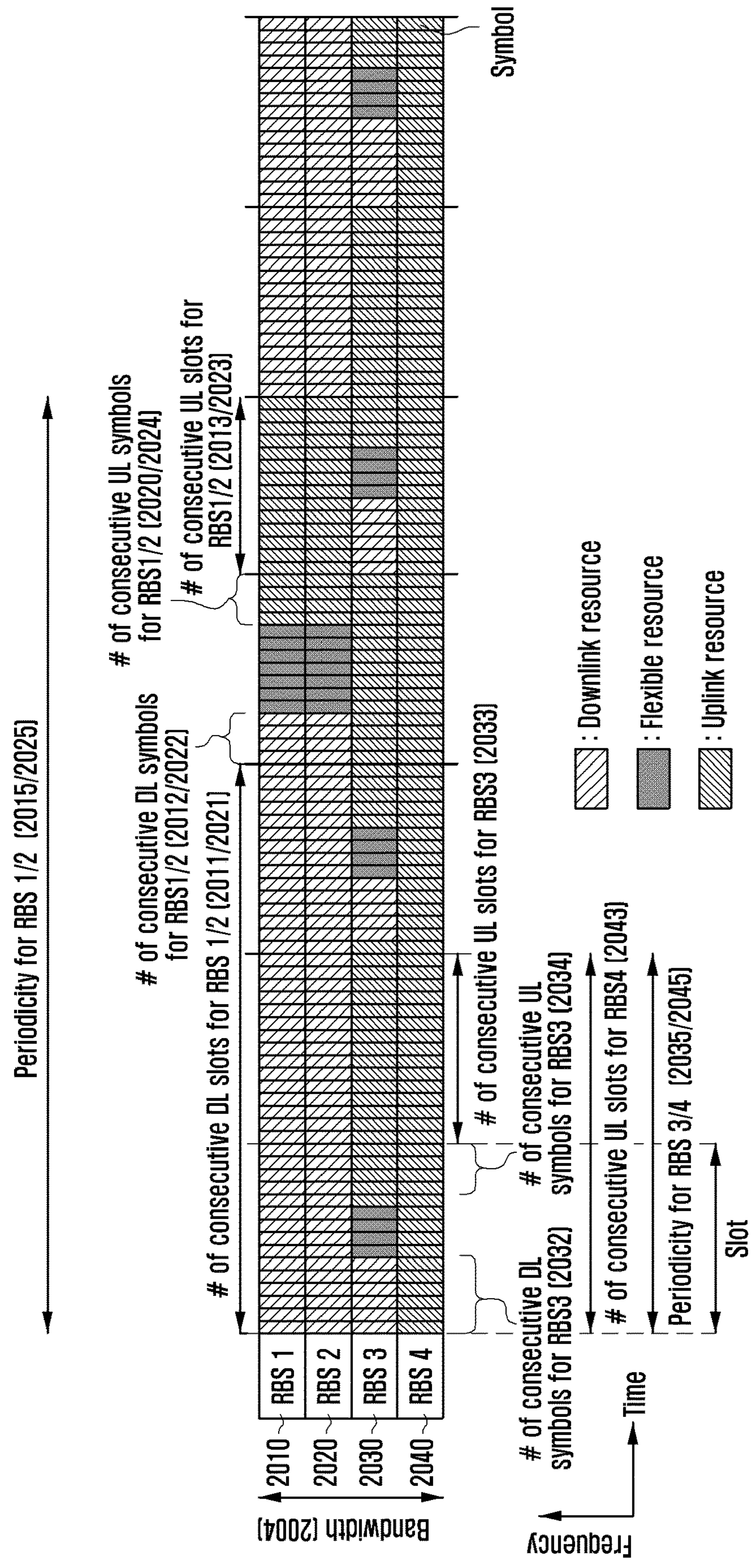
FIG. 20 is a diagram illustrating a UL-DL configuration of time and frequency in an XDD system.

FIG. 20 is a diagram illustrating a UL-DL configuration of time and frequency in an XDD system according to an embodiment of the disclosure.

With reference to FIG. 20, the entire frequency band is divided into RBS 2010, 2020, 2030, and 2040 (n=4), and UL-DL in each time domain may be configured for each RBS. For example, it may be configured that a pattern period of an RBS 1 (2010) is five slots (2015, or 5 ms when a subcarrier spacing is 15 kHz), the number of consecutive DL slots from the starting point of a pattern is three (2011), the number of DL symbols of a next slot is four (2012), the number of consecutive UL slots from the end of a pattern is one (2013), and the number of UL symbols of the next slot is three (2014). A UL-DL configuration of an RBS 2 (2020) may be the same as that of an RBS 1 (2010). That is, it may be configured that a pattern period of an RBS 2 (2020) is five slots (2025, or 5 ms when a subcarrier spacing is 15 kHz), the number of consecutive DL slots from the starting point of a pattern is three (2021), the number of DL symbols of a next slot is four (2022), the number of consecutive UL slots from the end of a pattern is one (2023), and the number of UL symbols of the next slot is three (2024). It may be configured that a UL-DL pattern period of an RBS 3 (2030) is two slots (2035, or 2 ms when a subcarrier spacing is 15 kHz), the number of consecutive DL slots from the starting point of the pattern is zero, the number of DL symbols of the next slot is six (2032), the number of consecutive UL slots from the end of a pattern is one (2033), and the number of UL symbols of the next slot is four (2034). Finally, it may be configured that a UL-DL pattern period of an RBS 4 (2040) is two slots (2045, or 2 ms when a subcarrier spacing is 15 kHz), the number of consecutive DL slots from the starting point of a pattern is zero, the number of DL symbols of a next slot is zero, the number of consecutive UL slots from the end of a pattern is two (2043), and the number of UL symbols of the next slot is zero.

For UL-DL configuration, UL-DL are configured for each RBS within a limited overhead and UL-DL, and thus, UL or DL resource may be configured relatively flexibly in the time domain.

Method 2

When UL-DL of the time domain and frequency domain are configured, the base station may indicate, to the terminal, a UL-DL configuration in the frequency domain by dividing the entire frequency into n frequency domains. In each of the patterns, the UL-DL configuration information may include UL-DL pattern information and subcarrier information which serves as a reference therefor. In the UL-DL pattern information, the number of slot(s)/symbol(s) of the time domain having the same pattern, the number of consecutive DL RBS from the starting point of the entire frequency domain, the number of DL RBs of a next RBS, the number of consecutive UL RBS from the end of the entire frequency domain, and the number of UL RBs of the next RBS may be indicated. In this case, RBS and RBs not indicated as UL and DL may be determined as flexible RB S/RB s.

Figure 21:
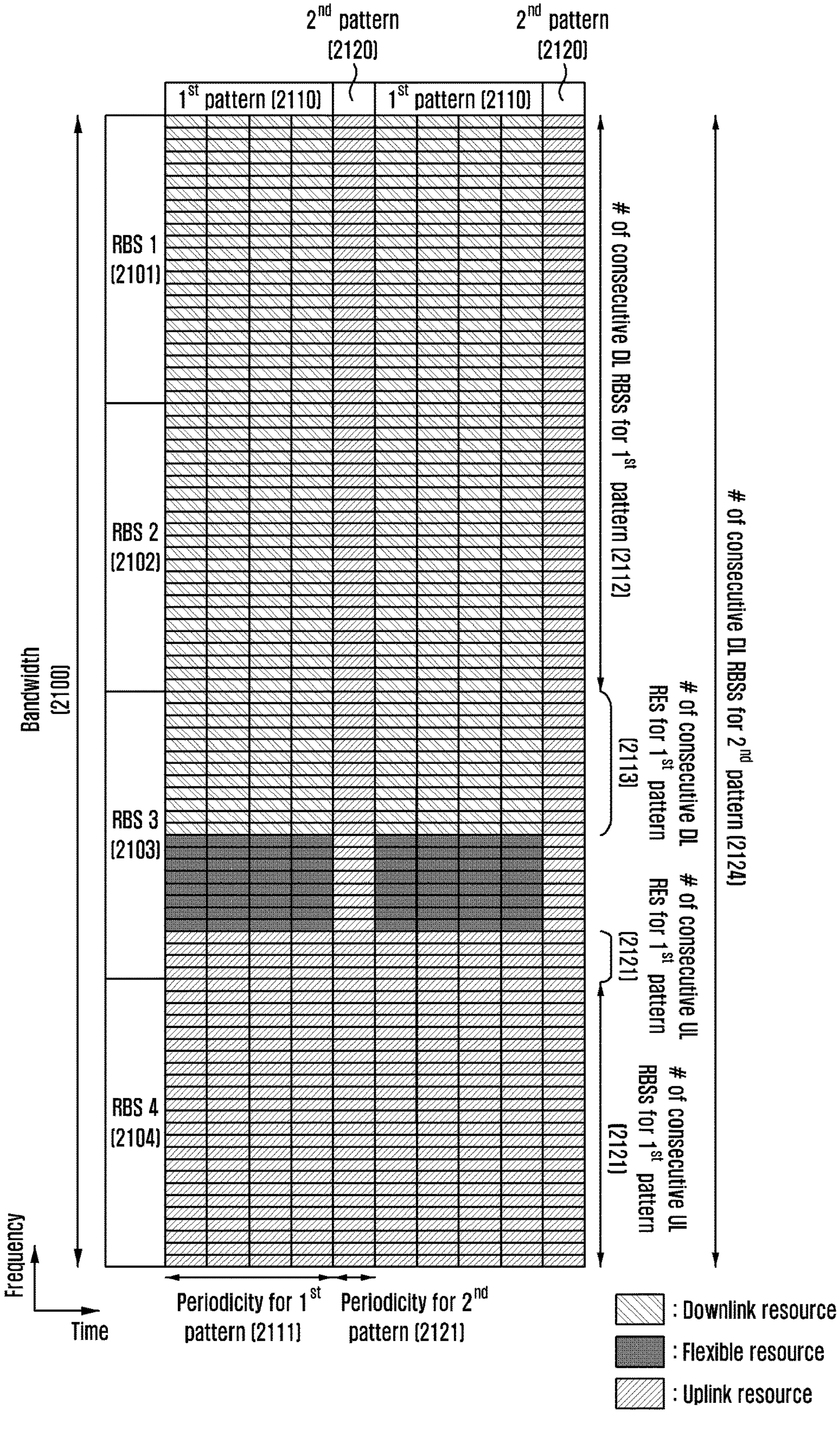
FIG. 21 is a diagram illustrating a UL-DL configuration of time and frequency in an XDD system.

FIG. 21 is a diagram illustrating a UL-DL configuration of time and frequency in an XDD system according to another embodiment of the disclosure.

With reference to FIG. 21, the entire frequency band 2100 may be divided into RBS 2101, 2102, 2203, and 2204 (n=4) so that each RBS includes 24 RBs and UL-DL of the frequency domain may be configured for each pattern. For example, it may be configured that a period of a first pattern 2210 is four slots (2111, or 4 ms when a subcarrier spacing is 15 kHz), the number of consecutive DL RBS from the starting point of the entire frequency band is two (2112), the number of DL RBs of the next RBS is twelve (2113), the number of consecutive UL RBS from the end of the entire frequency band is one (2114), and the number of UL RBs of the next RBS is four (2115). It may be configured that the period of a second pattern 2120 is one slot (2121, or 1 ms when a subcarrier spacing is 15 kHz), and the number of consecutive UL RBS from the end of the entire frequency band is four (2124).

For UL-DL configuration, each pattern has a period of time domain within a limited overhead and UL-DL is configured in the frequency domain, and thus, UL or DL may be configured relatively flexibly in the frequency domain. In this case, a guard band may be efficiently configured in the XDD system as a way to reduce interference of UL channel or signal reception due to out-of-band emission that occurs when the base station transmits a DL channel or signal in the DL resource.

In the terminal, UL and DL resources may be flexibly configured in the time and frequency domains. That is, an arbitrary time and frequency resource may be configured as UL or DL. In the following descriptions, configuration of an arbitrary time and frequency resource as UL or DL will be referred to as "UL-DL configuration (UL_DL_Configuration)". The UL-DL configuration may include a DL symbol, a UL symbol, a flexible symbol, or the like. In this case, the UL-DL configuration may be switched to static, semi-static, or dynamic. The base station may configure or indicate UL-DL configuration information to the terminal through higher layer signaling, L1 signaling, or a combination of higher layer signaling and L1 signaling. For example, the base station may perform UL-DL configuration on the terminal through higher layer signaling. Alternatively, the base station may perform one or more UL-DL configurations on the terminal through higher layer signaling and may activate one of the UL-DL configurations through higher layer signaling (e.g., an MAC CE) or L1 signaling. The terminal may be configured or indicated for the UL-DL configuration information from the base station, expect to receive a signal on a resource configured as DL, and expect to transmit a signal on a resource configured as UL.

In the disclosure, UL-DL configuration may be switched based on L1 signaling (e.g., DCI). More specifically, the base station may transmit, on a PDCCH, a DCI format including an indicator that switches from an arbitrary UL-DL configuration A to an arbitrary UL-DL configuration B. The terminal may receive a DCI format including an indicator that switches the UL-DL configuration from the base station and may switch from the arbitrary UL configuration A to the arbitrary UL configuration B based on the content indicated by the received DCI format.

In the disclosure, a table including a plurality of UL-DL configurations for switching the UL-DL configuration may be predefined, or configured for the terminal by the base station through via higher layer signaling. For example, a "UL-DL configuration table" including N UL-DL configurations {a UL-DL configuration #1, a UL-DL configuration

#2, a UL-DL configuration #3, . . . , a UL-DL configuration #N} may be predefined, or configured for the terminal by the base station through higher layer signaling. The base station may transmit an indicator that activates an arbitrary UL-DL configuration #X in the UL-DL configuration table to the terminal through L1 signaling (e.g., a DCI format). The terminal may activate the UL-DL configuration #X indicated by L1 signaling (e.g., the DCI format) received from the base station based on the predefined or preconfigured UL-DL configuration table.

According to the above described method, in case where the UL-DL configuration is switched, an additional switching delay time Tdelay may be considered. As described above, optimal parameter values of respective transmitter/receiver blocks for effectively handling interference between the DL and the UL may be different depending on UL/DL transmission resource patterns, and accordingly, a delay time Tdelay of a certain time for changing transmitter/receiver parameter values may occur according to the switching of the UL-DL configuration.

According to the above method, an UL/DL configuration switch indicator may be transmitted from the base station to the terminal by using at least one method of common DCI (or DCI format monitored in a common search space), group-common DCI (or DCI format monitored in a Type-3 common search space), UE-specific DCI (or DCI format monitored in a UE-specific search space), a DCI format including scheduling, or a DCI format not including scheduling.

According to the above method, an UL/DL configuration switch indicator may include UL/DL configuration information for one or multiple slots. That is, the base station may transmit a configuration switch indicator for indicating UL/DL configuration for one or multiple slots to the terminal, and the terminal may receive the configuration switch indicator for indicating UL/DL configuration for one or multiple slots from the base station.

In the fourth embodiment of the disclosure, a method in which an available slot is determined in PUSCH repetitive transmission type A based on the configuration information and method related to the XDD, and an additional PUSCH repetitive transmission is performed using an unavailable slot is proposed. The following description in the disclosure may be equally applied to TBoMS transmission.

Figure 22A:
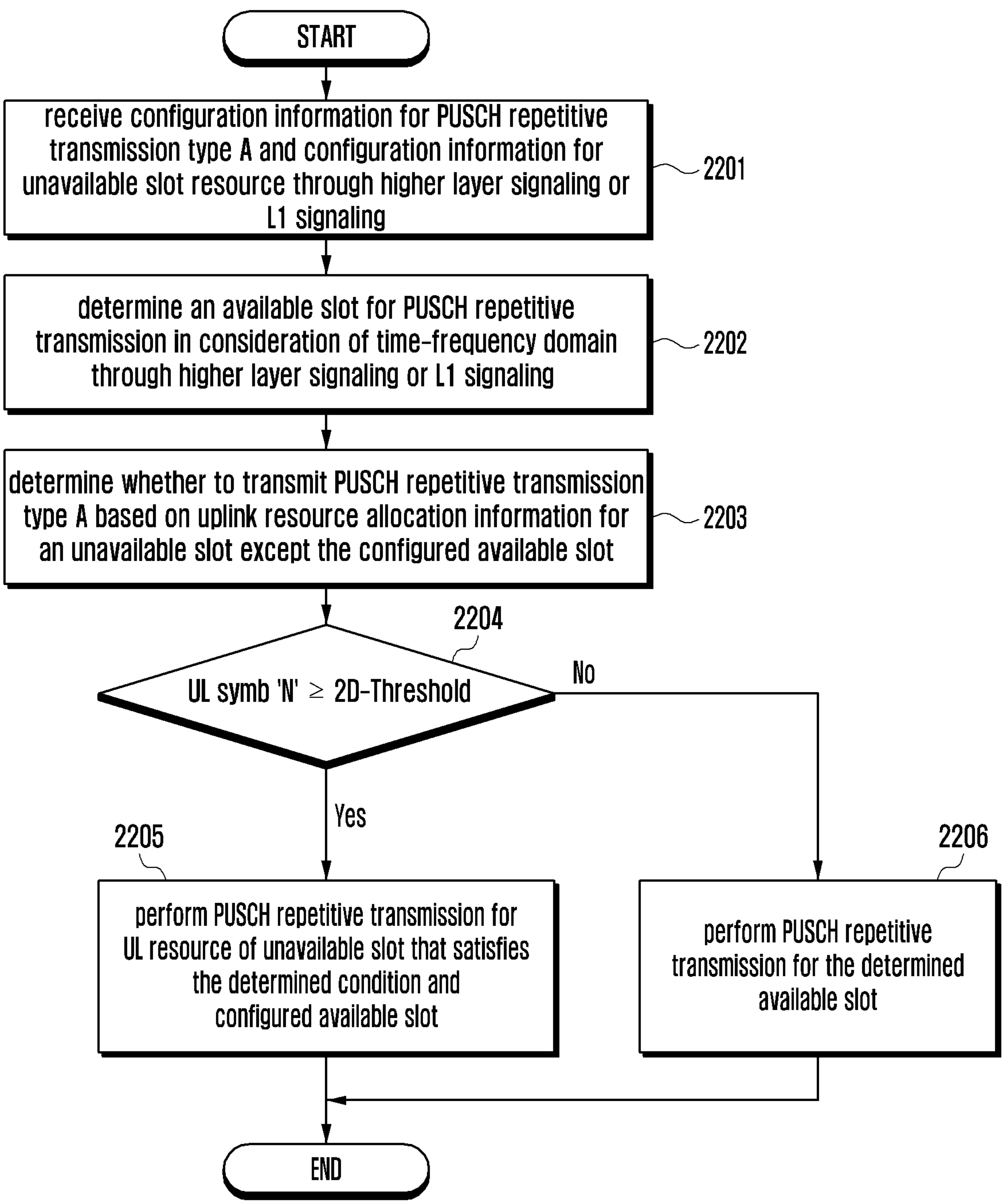
FIG. 22A is a flowchart illustrating an operation of a terminal for PUSCH repetitive transmission type A in an XDD system.
Figure 22B:
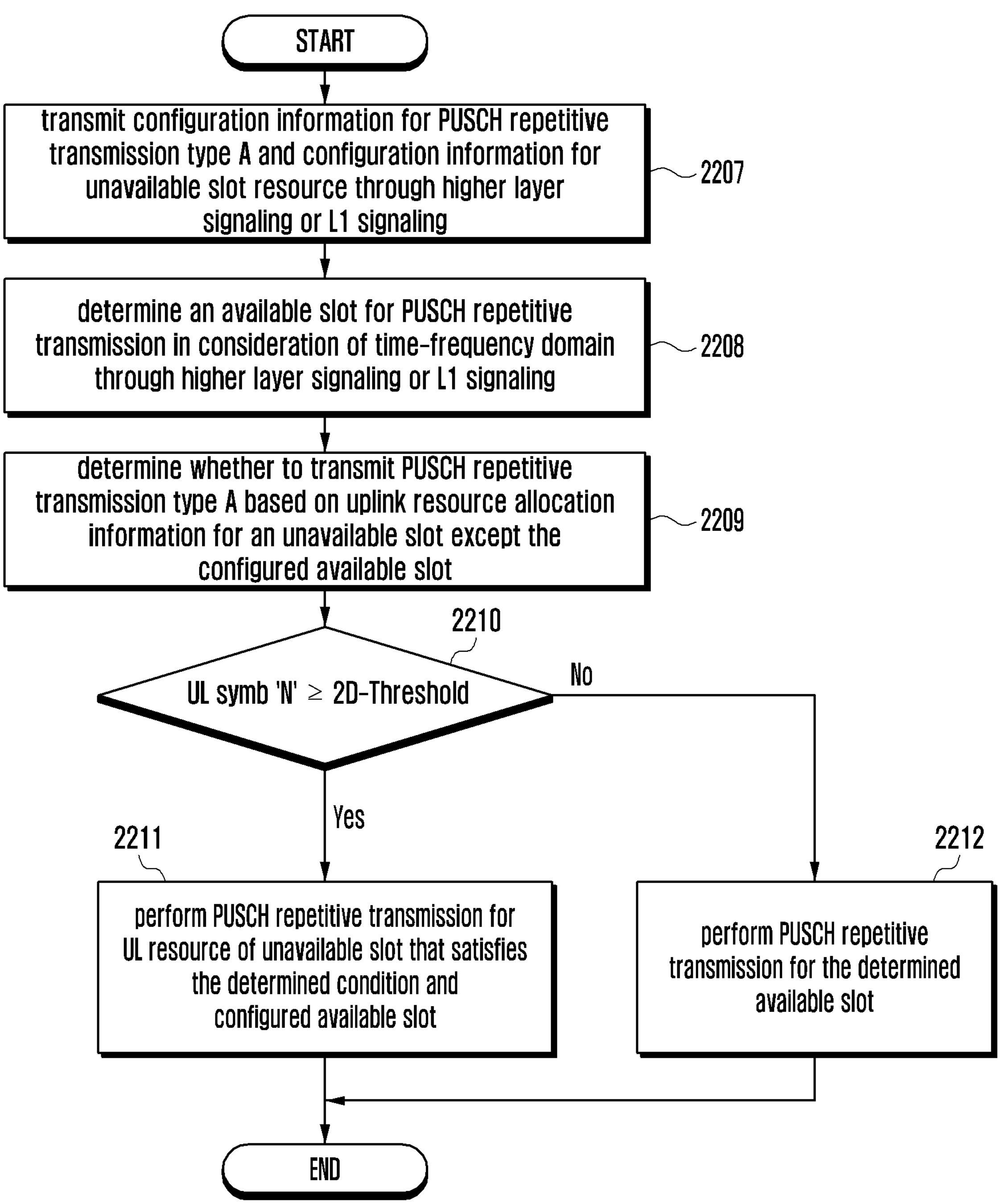
FIG. 22B is a flowchart illustrating an operation of a base station for PUSCH repetitive transmission type A in an XDD system.

FIGS. 22A and 22B are flowcharts illustrating operations of a terminal and base station for PUSCH repetitive transmission type A in an XDD system.

In FIG. 22A, an operation of a terminal for PUSCH repetitive transmission type A in an XDD system is described. With reference to FIG. 22A, a terminal may receive, from a base station, configuration information for PUSCH repetitive transmission type A and configuration information for determining an unavailable slot for additional transmission through higher layer signaling or L1 signaling (2201). Thereafter, the terminal may determine an available slot for PUSCH repetitive transmission type A based on the configured configuration information for PUSCH repetitive transmission Type A. More specifically, the terminal may determine an available slot for uplink slot, special slot by considering UL/DL resource configuration information (DL/UL configuration) configured through higher layer signaling to determine an available slot and TDRA information of DCI for scheduling PUSCH, CG configuration or activation DCI, etc. Herein, in case of the XDD system, an available slot may be determined according to UP resources in a frequency domain.

Method 1

The terminal may determine a slot that satisfies the number of RBs configured for PUSCH transmission as an available slot through higher layer signaling and L1 signaling. In case of Method 1 above, PUSCH repetitive transmission is performed for the same number of uplink resources as the configuration based on the configured configuration information for PUSCH transmission, thereby improving the reliability of uplink transmission performance.

Method 2

In another method, in the XDD system, even in case where the frequency resource configured for UL in a slot does not satisfy the number of RBs for PUSCH transmission configured through higher layer signaling and L1 signaling, the terminal may consider the slot as an available slot if the number of symbols configured as UL in the slot satisfies a certain condition according to the UL and DL resource configuration information. In this case, the PUSCH repetitive transmission for the terminal's available slot may be counted as the number of repetitive transmissions.

The terminal may determine an available slot for PUSCH repetitive transmission based on the method described above (2202). Unlike in the existing FDD or TDD system, where the terminal determines whether to transmit PUSCH based on an uplink symbol by considering only the time-domain corresponding to one dimension (1D) for PUSCH transmission, in the XDD system, the terminal may determine whether to transmit PUSCH based on uplink resources considering both the time-domain and frequency-domain corresponding to two dimension (2D). Thereafter, the terminal may determine whether to transmit additional PUSCH transmission type A for uplink resources of unavailable slots except the configured available slot (2203). In order to determine whether to perform additional transmission of the determined unavailable slot, the terminal may compare the number 'T' of arbitrary 2D-Threshold uplink resources REs that may be configured through higher layer signaling and L1 signaling, with the number 'N' of uplink resource REs within the unavailable slot (2204). If the number 'N' of uplink resource REs inside the unavailable slot is greater than the number 'T' of uplink resource REs in the arbitrary 2D-Threshold configured above (the number 'N' of UL resource All REs>the number of 'T' of the configured arbitrary 2D-Threshold REs), the terminal determines that PUSCH transmission can be performed for the unavailable slot and may perform PUSCH repetitive transmission in the available slot and the unavailable slot for which PUSCH transmission is determined to be possible (2205). Conversely, if the number 'N' of uplink resource REs inside the unavailable slot is less than the number 'T' of uplink resource REs in the arbitrary 2D-Threshold configured above (UL symbol length 'L'≤configured Threshold symbol length 'T'), the terminal determines that PUSCH transmission is impossible for the unavailable slot and may perform PUSCH repetitive transmission only for the available slot (2206). In this case, additional PUSCH repetitive transmissions transmitted in the unavailable slot may be performed without being counted.

With reference to FIG. 22B, the base station may transmit, to the terminal, configuration information for PUSCH repetitive transmission type A and configuration information for determining an unavailable slot capable of additional transmission, through higher layer signaling or L1 signaling (2207). Thereafter, the base station may determine an available slot for PUSCH repetitive transmission type A based on the configured configuration information for PUSCH repetitive transmission type A. More specifically, the base station may determine an available slot for uplink slot, special slot by considering UL/DL resource configuration information (DL/UL configuration) configured through higher layer signaling to determine an available slot and TDRA information of DCI for scheduling PUSCH, CG configuration or activation DCI, etc. Herein, in case of the XDD system, the available slot may be determined according to the uplink resources in the frequency domain.

Method 1

The base station may determine a slot that satisfies the number of RBs configured for PUSCH transmission as an available slot through higher layer signaling and L1 signaling. In case of Method 1 above, PUSCH repetitive transmission is performed for the same number of uplink resources as the configuration based on the configured configuration information for PUSCH transmission, thereby improving the reliability of uplink transmission performance.

Method 2

In another method, in the XDD system, even in case where the frequency resource configured for UL in a slot does not satisfy the number of RBs for PUSCH transmission configured through higher layer signaling and L1 signaling, the base station may consider the slot as an available slot if the number of symbols configured as UL in the slot satisfies a certain condition according to the UL and DL resource configuration information. In this case, the PUSCH repetitive transmission for the available slot may be counted as the number of repetitive transmissions.

The base station may determine an available slot for PUSCH repetitive transmission based on the method described above (2208). Unlike in the existing FDD or TDD system, where the base station determines whether to receive PUSCH based on an uplink symbol by considering only the time-domain corresponding to one dimension (1D) for PUSCH reception, in the XDD system, the base station may determine whether to receive PUSCH based on uplink resources considering both the time-domain and frequency-domain corresponding to two dimension (2D). Thereafter, the base station may determine whether to transmit additional PUSCH transmission type A for uplink resources of unavailable slots except the configured available slot (2209). In order to determine whether to perform additional transmission of the determined unavailable slot, the base station may compare the number 'T' of arbitrary 2D-Threshold uplink resources REs that may be configured through higher layer signaling and L1 signaling, with the number 'N' of uplink resource REs within the unavailable slot (2210). If the number 'N' of uplink resource REs inside the unavailable slot is greater than the number 'T' of uplink resource REs in the arbitrary 2D-Threshold configured above (the number 'N' of UL resource All REs>the number of 'T' of the configured arbitrary 2D-Threshold REs), the base station determines that PUSCH transmission can be performed for the unavailable slot and may perform PUSCH repetitive transmission in the available slot and the unavailable slot for which PUSCH transmission is determined to be possible (2211). Conversely, if the number 'N' of uplink resource REs inside the unavailable slot is less than the number 'T' of uplink resource REs in the arbitrary 2D-Threshold configured above (UL symbol length 'L'≤configured Threshold symbol length 'T'), the base station determines that PUSCH transmission is impossible for the unavailable slot and may receive PUSCH repetitive transmission only for the available slot (2212). In this case, additional PUSCH repetitive transmissions received in the unavailable slot may be performed without being counted.

Figure 23A:
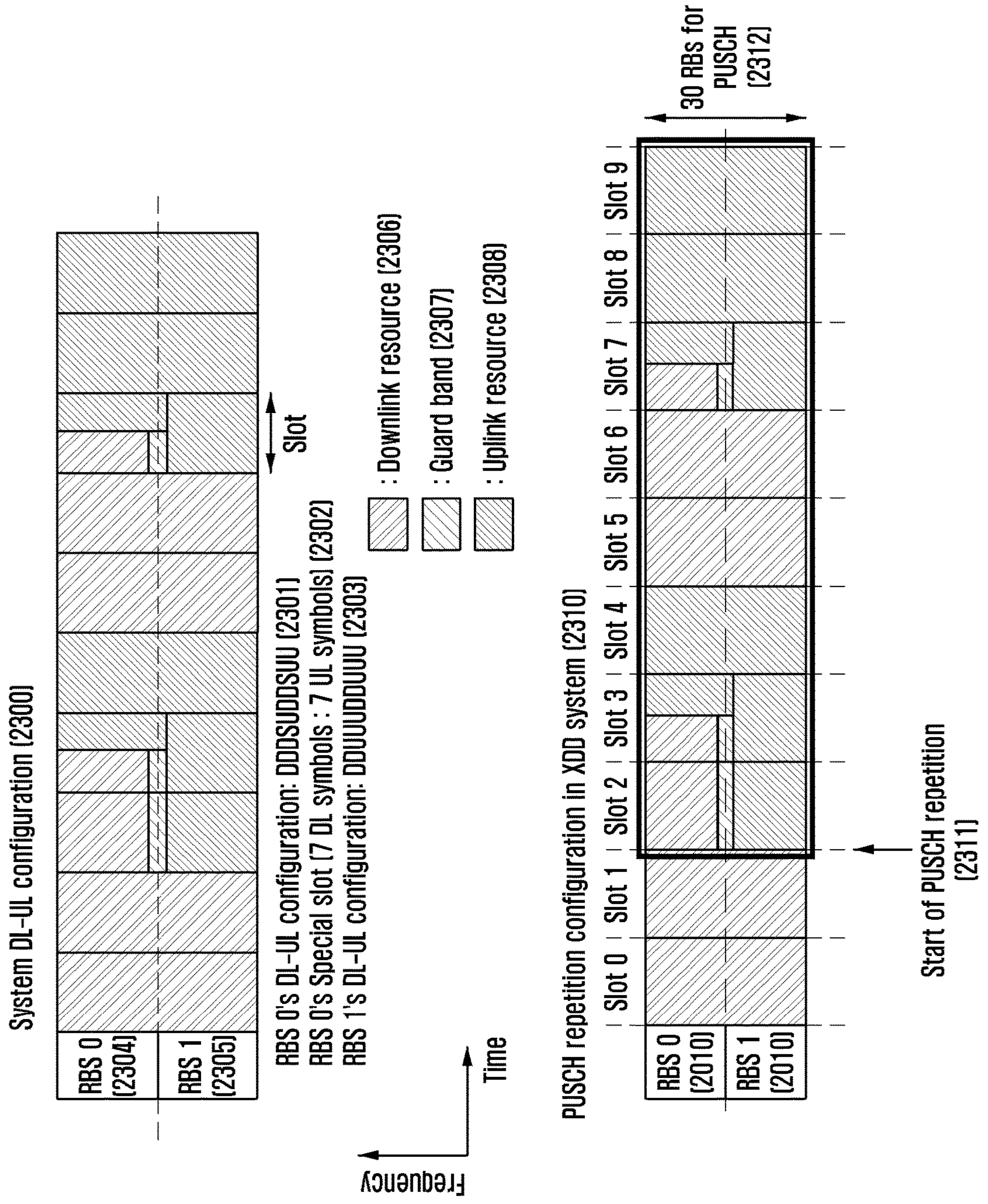
FIG. 23A is a diagram illustrating PUSCH repetitive transmission type A in an XDD system.
Figure 23B:
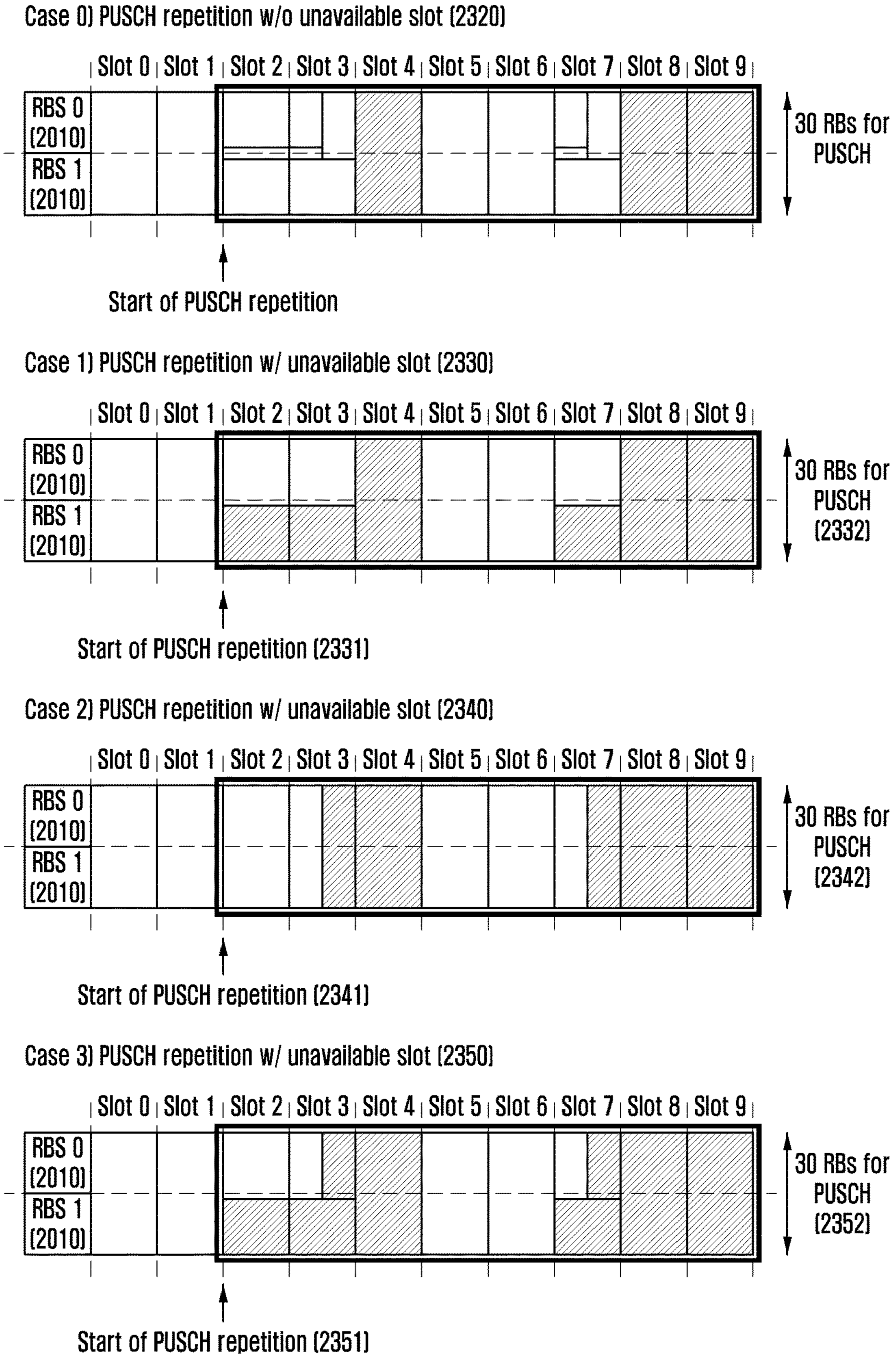
FIG. 23B is a diagram illustrating PUSCH repetitive transmission type A in an XDD system.

FIGS. 23A and 23B are diagrams illustrating PUSCH repetitive transmission type A in an XDD system.

The terminal may receive uplink and downlink resource information of the XDD system from the base station through higher layer signaling and L1 signaling (2300). For example, the terminal may receive, from the base station, the UL and DL resource configuration information of the XDD system including RBS 0 (DL/UL configuration: DDDSUDDSUU (2301), S: {7 DL: 7 UL} (2302)), RBS 1 (DL/UL configuration: DDUUUDDUUU(2303)) through higher layer signaling and L1 signaling. A guard band 2307 may be configured between a downlink resource 2306 and an uplink resource 2308 according to the configured RBS 0 and RBS 1 configurations. In this case, when the terminal receives PUSCH repetitive transmission type A (PRB: 30, SLIV L: 14 symbols) through higher layer signaling and L1 signaling, the terminal may perform PUSCH repetitive transmission in slot 2 (2311) for 30 RBs (2312) including both RBS 0 and RBS 1 and 14 UL symbols configured to SLIV, based on the configuration information for PUSCH repetitive transmission type A (2310). In this case, the terminal may determine an available slot and an unavailable slot for XDD up/downlink resources as described with respect to FIG. 22A. In this case, the terminal may determine slot 4, slot 8, and slot 9 as available slots based on the configuration information of PUSCH repetitive transmission type A (PRB: 30, SLIV L: 14 symbols). In this case, the terminal may perform PUSCH repetitive transmission through the available slot (2320). In another method, when the terminal receives the configuration for additional PUSCH repetitive transmission for an unavailable slot through higher layer signaling and L1 signaling, the terminal considers the unavailable slot as an available slot and performs transmission, or performs rate-matching through the UL resources of the unavailable slot and performs PUSCH repetitive transmission. In this case, PUSCH transmission in the slot determined by the terminal as an available slot can be counted as the number of PUSCH repetitive transmissions. One or a combination of the following methods may be applied to the PUSCH repetitive transmission type A in the unavailable slot of the terminal.

Method 1

In Method 1, when the terminal is configured with the configuration information (30 PRB (2332), K2, SLIV L: 14 symbol) for PUSCH repetitive transmission type A through higher layer signaling and L1 signaling, the terminal may consider the RBS entirely configured as uplink resource among multiple RBSs in a slot to be available based on each RBS, and perform PUSCH repetitive transmission according to the availability of the RBS (2330).

By applying another decision method, when the terminal receives the configuration information for PUSCH repetitive transmission type A (30 PRB (2332), K2, SLIV L: 14 symbol) and the number T of uplink resources for determining whether to perform additional transmission in an unavailable slot through higher layer signaling and L1 signaling, the terminal may determine available slots for PUSCH repetitive transmission type A: slot 4, slot 8, and slot 9 from slot 2 (2331), and determine the other slots as unavailable slots. In this case, the terminal may perform PUSCH repetitive transmission type A for RBS with more uplink resources than the configured 'T', based on the configured arbitrary 'T' (2330). Through the above method, the terminal may determine a slot including available RBS #x for PUSCH repetitive transmission type A, through which the terminal can support additional PUSCH transmission and obtain additional energy gain.

Method 2

In Method 2, when the terminal is configured with the configuration information (30 PRB (2342), K2, SLIV L: 14 symbol) for PUSCH repetitive transmission type A through higher layer signaling and L1 signaling, the terminal may consider the symbol entirely configured as uplink resource in a slot to be available based on each symbol, and perform PUSCH repetitive transmission.

By applying still another decision method, when the terminal receives the configuration information for PUSCH repetitive transmission type A (30 PRB (2342), K2, SLIV L: 14 symbol) and the number T of uplink resources for determining whether to perform additional transmission in an unavailable slot through higher layer signaling and L1 signaling, the terminal may determine available slots for PUSCH repetitive transmission type A: slot 4, slot 8, and slot 9 from slot 2 (2341), and determine the other slots as unavailable slots. In this case, the terminal may perform PUSCH repetitive transmission type A in a symbol where all frequency resources are configured to uplink for a slot with more uplink resources than the configured 'T', based on the configured arbitrary 'T' (2340). Through the above method, by supporting PUSCH transmission for the symbol entirely configured to uplink for PUSCH repetitive transmission type A, simultaneous channel estimation can be additionally applied, thereby improving the performance of channel estimation and obtaining additional energy gain.

Method 3

In Method 3, when the terminal is configured with the configuration information (30 PRB (2352), K2, SLIV L: 14 symbol) for PUSCH repetitive transmission type A and the number T of uplink resources for determining whether to perform additional transmission in an unavailable slot through higher layer signaling and L1 signaling, the terminal may determine available slots for PUSCH repetitive transmission type A: slot 4, slot 8, and slot 9 from slot 2 (2351), and determine other slots as unavailable slots. In this case, based on the configured arbitrary 'T', the terminal may perform PUSCH repetitive transmission type A by rate-matching all uplink resources for slots with more uplink resources than the configured 'T'. (2350). Through the above method, the uplink resources of the unavailable slot can be maximally utilized to perform PUSCH repetitive transmission, so that additional energy gain can be obtained and coverage of the uplink can be improved.

Through the four embodiment of the disclosure, the terminal may determine an available slot for PUSCH repetitive transmission type A in the XDD system, and a method for additionally supporting PUSCH repetitive transmission for an unavailable slot is proposed. Using the above method, the terminal can obtain maximum energy gain and improve uplink coverage through more optimized resource management. The method of the disclosure is for illustrative purposes only, and is not limited to PUSCH repetitive transmission type A, and may be applied to PUSCH repetitive transmission type B, TBoMS, and PDSCH/PDCCH/PUCCH repetitive transmission. In addition, the maximum value of the arbitrary Threshold 'T' used for the above description can be determined according to the symbol, RBS, and slot units, and can be applied to the number of REs, number of symbols, number of RBS, etc.

Fifth Embodiment

These are block diagrams of a terminal and base station according to the fifth embodiment of the disclosure.

Figure 24:
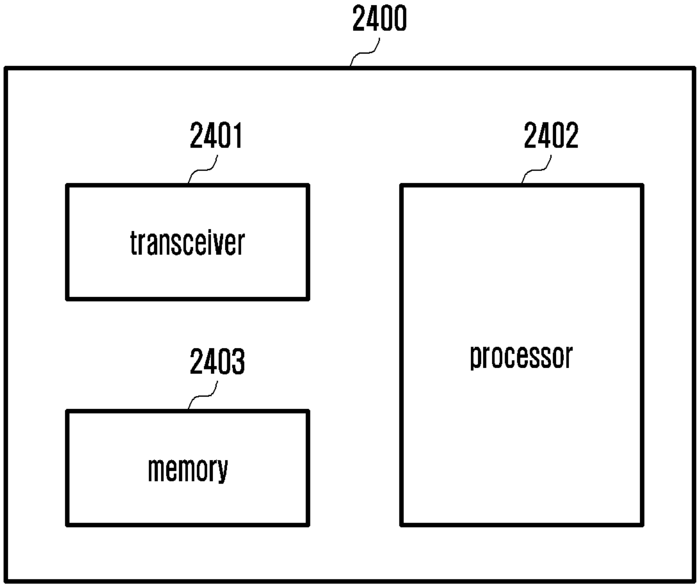
FIG. 24 is a block diagram illustrating a terminal according to an embodiment of the disclosure.

FIG. 24 is a block diagram illustrating a terminal according to an embodiment of the disclosure.

With reference to FIG. 24, a terminal 2400 may include a transceiver 2401, a controller (processor) 2402, and a storage (memory) 2403. According to an efficient channel and signal transmission and reception method in a 5G communication system corresponding to the above-described embodiment, the transceiver 2401, controller 2402, and storage 2403 of the terminal 2400 may operate. However, components of the terminal 2400 according to an embodiment are not limited to the above-described example. According to another embodiment, the terminal 2400 may include more components than the above-described components or may include fewer components. In addition, in a specific case, the transceiver 2401, the controller 2402, and the storage 2403 may be implemented in the form of a single chip.

The transceiver 2401 may include a transmitter and a receiver according to another embodiment. The transceiver 2401 may transmit/receive signals to/from a base station. The signals may include control information and data. To achieve this, the transceiver 2401 may include a radio frequency (RF) transmitter to up-convert and amplify a frequency of a transmitted signal, and an RF receiver to low-noise amplify a received signal and to down-convert a frequency. In addition, the transceiver 2401 may receive a signal through a radio channel and may output the signal to the controller 2402, and may transmit a signal outputted from the controller 2402 through the radio channel.

The controller 2402 may control a series of processes for operating the terminal 2400 according to the above-described embodiment of the disclosure. For example, the controller 2402 may perform a method of changing an OFDM symbol position of a DMRS by considering a method for estimating a channel by using DRMSs transmitted through a plurality of PUSCHs simultaneously. To achieve this, the controller 2402 may include at least one processor. For example, the controller 2402 may include a communication processor (CP) to perform control for communication, and an application processor (AP) to control a higher layer such as an application program.

The storage 2403 may store control information or data such as information related to channel estimation which uses DMRSs transmitted through a PUSCH included in a signal obtained by the terminal 2400, and may have an area for storing data necessary for control of the controller 2402 and data generated when the controller 2402 controls.

Figure 25:
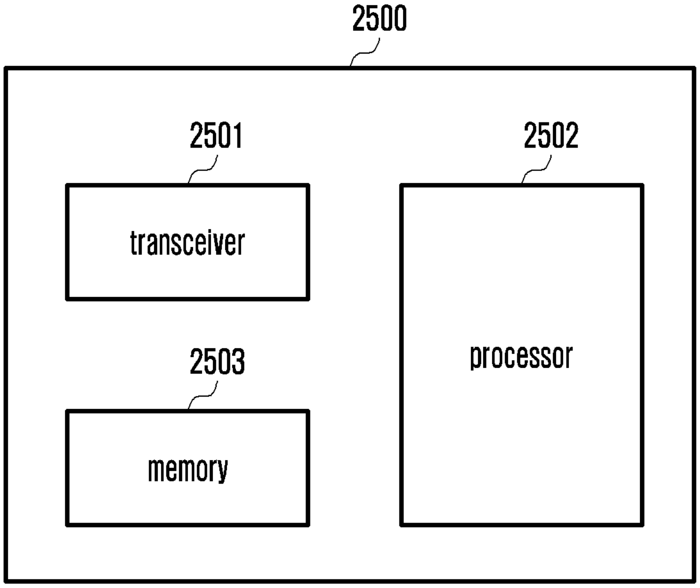
FIG. 25 is a block diagram illustrating a base station according to an embodiment of the disclosure.

FIG. 25 is a block diagram of a base station according to an embodiment of the disclosure.

With reference to FIG. 25, a base station 2500 may include a transceiver 2501, a controller (processor) 2502, and a storage (memory) 2503. According to an efficient channel and signal transmission and reception method in a 5G communication system corresponding to the above-described embodiment, the transceiver 2501, controller 2502, and storage 2503 of the base station 2500 may operate. However, components of the base station 2500 according to an embodiment are not limited to the above-described example. According to another embodiment, the base station 2500 may include more components than the above-described components or may include fewer components. In addition, in a specific case, the transceiver 2501, the controller 2502, and the storage 2503 may be implemented in the form of a single chip.

The transceiver 2501 may include a transmitter and a receiver according to another embodiment. The transceiver 2501 may transmit/receive signals to/from a terminal. The signals may include control information and data. To achieve this, the transceiver 2501 may include an RF transmitter to up-convert and amplify a frequency of a transmitted signal, and an RF receiver to low-noise amplify a received signal and to down-convert a frequency. In addition, the transceiver 2501 may receive a signal through a radio channel and may output the signal to the controller 2502, and may transmit a signal outputted from the controller 2502 through the radio channel.

The controller 2502 may control a series of processes for operating the base station 2500 according to the above-described embodiment of the disclosure. For example, the controller 2502 may perform a method of changing an OFDM symbol position of a DRMS by considering a method for estimating a channel by using DRMSs transmitted through a PUSCH. To achieve this, the controller 2502 may include at least one processor. For example, the controller 2502 may include a communication processor (CP) to perform control for communication, and an application processor (AP) to control a higher layer such as an application program.

The storage 2503 may store control information, data of information related to channel estimation or control information, data received from the terminal, by using DMRSs transmitted through the PUSCH determined by the base station 2500, and may have an area for storing data necessary for control of the controller 2502 and data generated when the controller 2502 controls.

Meanwhile, the embodiments of the disclosure disclosed in the specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the respective embodiments may be combined with each other as required to be operated.

The invention claimed is:

1. A method of a terminal in a communication system, the method comprising:

receiving uplink-downlink resource configuration information related to cross division duplex (XDD) from a base station;

receiving configuration information for physical uplink shared channel (PUSCH) repetitive transmission from the base station;

determining an available slot for the PUSCH repetitive transmission based on the uplink-downlink resource configuration information and the configuration information for the PUSCH repetitive transmission;

identifying a slot in which a number of uplink resource elements (RE) is greater than or equal to a first preconfigured number, among slots excluding the available slot for the PUSCH repetitive transmission; and transmitting the PUSCH repetitive transmission to the base station in the available slot and in the slot where the number of uplink REs is greater than or equal to the first preconfigured number.

2. The method of claim 1, wherein a slot in which a number of resource blocks configured for uplink is greater than or equal to a second preconfigured number is determined as the available slot for the PUSCH repetitive transmission, based on the uplink-downlink resource configuration information.

3. The method of claim 1, wherein a slot in which a number of symbols configured for uplink is greater than or equal to a third preconfigured number is determined as the available slot for the PUSCH repetitive transmission, based on the uplink-downlink resource configuration information.

4. The method of claim 1, wherein the PUSCH repetitive transmission is transmitted in a resource block set (RBS) in which all symbols are configured as uplink resources or in a symbol in which all RBS are configured as the uplink resources in the slot where the number of uplink REs is greater than or equal to the first preconfigured number.

5. A method of a base station in a communication system, the method comprising:

transmitting uplink-downlink resource configuration information related to cross division duplex (XDD) to a terminal;

transmitting configuration information for physical uplink shared channel (PUSCH) repetitive transmission to the terminal;

determining an available slot for the PUSCH repetitive transmission based on the uplink-downlink resource configuration information and the configuration information for the PUSCH repetitive transmission;

identifying a slot in which a number of uplink resource elements (RE) is greater than or equal to a first preconfigured number, among slots excluding the available slot for the PUSCH repetitive transmission; and receiving the PUSCH repetitive transmission from the terminal in the available slot and in the slot where the number of uplink REs is greater than or equal to the first preconfigured number.

6. The method of claim 5, wherein a slot in which a number of resource blocks configured for uplink is greater than or equal to a second preconfigured number is determined as the available slot for the PUSCH repetitive transmission, based on the uplink-downlink resource configuration information.

7. The method of claim 5, wherein a slot in which a number of symbols configured for uplink is greater than or equal to a third preconfigured number is determined as the available slot for the PUSCH repetitive transmission, based on the uplink-downlink resource configuration information.

8. The method of claim 5, wherein the PUSCH repetitive transmission is received in a resource block set (RBS) in which all symbols are configured as uplink resources or in a symbol in which all RBS are configured as the uplink resources in the slot where the number of uplink REs is greater than or equal to the first preconfigured number.

9. A terminal in a communication system, the terminal comprising:

a transceiver; and a controller configured to:

receive uplink-downlink resource configuration information related to cross division duplex (XDD) from a base station, receive configuration information for physical uplink shared channel (PUSCH) repetitive transmission from the base station, determine an available slot for the PUSCH repetitive transmission based on the uplink-downlink resource configuration information and the configuration information for the PUSCH repetitive transmission, identify a slot in which a number of uplink resource elements (RE) is greater than or equal to a first preconfigured number, among slots excluding the available slot for the PUSCH repetitive transmission, and transmit the PUSCH repetitive transmission to the base station in the available slot and in the slot where the number of uplink REs is greater than or equal to the first preconfigured number.

10. The terminal of claim 9, wherein a slot in which a number of resource blocks configured for uplink is greater than or equal to a second preconfigured number is determined as the available slot for the PUSCH repetitive transmission, based on the uplink-downlink resource configuration information.

11. The terminal of claim 9, wherein a slot in which a number of symbols configured for uplink is greater than or equal to a third preconfigured number is determined as the available slot for the PUSCH repetitive transmission, based on the uplink-downlink resource configuration information.

12. The terminal of claim 9, wherein the PUSCH repetitive transmission is transmitted in a resource block set (RBS) in which all symbols are configured as uplink resources or in a symbol in which all RBS are configured as the uplink resources in the slot where the number of uplink REs is greater than or equal to the first preconfigured number.

13. A base station in a communication system, the base station comprising:

a transceiver; and a controller configured to:

transmit uplink-downlink resource configuration information related to cross division duplex (XDD) to a terminal, transmit configuration information for physical uplink shared channel (PUSCH) repetitive transmission to the terminal, determine an available slot for the PUSCH repetitive transmission based on the uplink-downlink resource configuration information and the configuration information for the PUSCH repetitive transmission, identify a slot in which a number of uplink resource elements (RE) is greater than or equal to a first preconfigured number, among slots excluding the available slot for the PUSCH repetitive transmission, and receive the PUSCH repetitive transmission from the terminal in the available slot and in the slot where the number of uplink REs is greater than or identical to the first preconfigured number.

14. The base station of claim 13, wherein a slot in which a number of resource blocks configured for uplink is greater than or equal to a second preconfigured number is determined as the available slot for the PUSCH repetitive transmission, based on the uplink-downlink resource configuration information.

15. The base station of claim 13, wherein a slot in which a number of symbols configured for uplink is greater than or equal to a third preconfigured number is determined as the available slot for the PUSCH repetitive transmission, based on the uplink-downlink resource configuration information.

16. The base station of claim 13, wherein the PUSCH repetitive transmission is received in a resource block set (RBS) in which all symbols are configured as uplink resources or in a symbol in which all RBS are configured as the uplink resources in the slot where the number of uplink REs is greater than or equal to the first preconfigured number.

* * * * *